United States Patent
Fujiki et al.

(10) Patent No.: US 12,518,827 B2
(45) Date of Patent: Jan. 6, 2026

(54) MEMORY ARRAYS HAVING MULTIPLE STRINGS OF SERIES-CONNECTED MEMORY CELLS SELECTIVELY CONNECTED IN PARALLEL, THEIR FABRICATION, AND THEIR OPERATION

(71) Applicant: MICRON TECHNOLOGY, INC., Boise, ID (US)

(72) Inventors: Jun Fujiki, Tokyo (JP); Yoshiaki Fukuzumi, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 188 days.

(21) Appl. No.: 18/237,039

(22) Filed: Aug. 23, 2023

(65) Prior Publication Data
US 2024/0079058 A1   Mar. 7, 2024

Related U.S. Application Data

(60) Provisional application No. 63/402,098, filed on Aug. 30, 2022.

(51) Int. Cl.
*G11C 16/04* (2006.01)
*G11C 16/10* (2006.01)

(52) U.S. Cl.
CPC ........ *G11C 16/0483* (2013.01); *G11C 16/102* (2013.01)

(58) Field of Classification Search
CPC .... G11C 16/0483; G11C 16/102; G11C 16/10
USPC ........................................... 365/185.17
See application file for complete search history.

(56) References Cited

U.S. PATENT DOCUMENTS

| | | | |
|---|---|---|---|
| 10,014,061 B1* | 7/2018 | Yip | G11C 16/10 |
| 2012/0250420 A1* | 10/2012 | Shirakawa | G11C 16/3418 365/185.18 |
| 2023/0085034 A1 | 3/2023 | Fukuzumi et al. | |

* cited by examiner

*Primary Examiner* — Tha-O H Bui
(74) *Attorney, Agent, or Firm* — Dicke, Billig & Czaja, PLLC

(57) ABSTRACT

Arrays of memory cells including a data line, a common source, a conductive element between the data line and the common source, a first string of series-connected memory cells having a first segment of series-connected memory cells selectively connected to the conductive element and a second segment of series-connected memory cells selectively connected to the conductive element and selectively connected to its first segment of series-connected memory cells through the conductive element, and a second string of series-connected memory cells having a first segment of series-connected memory cells selectively connected to the conductive element and a second segment of series-connected memory cells selectively connected to the conductive element and selectively connected to its first segment of series-connected memory cells through the conductive element, as well as apparatus containing such arrays of memory cells and methods of their operation, and methods of their formation.

20 Claims, 55 Drawing Sheets

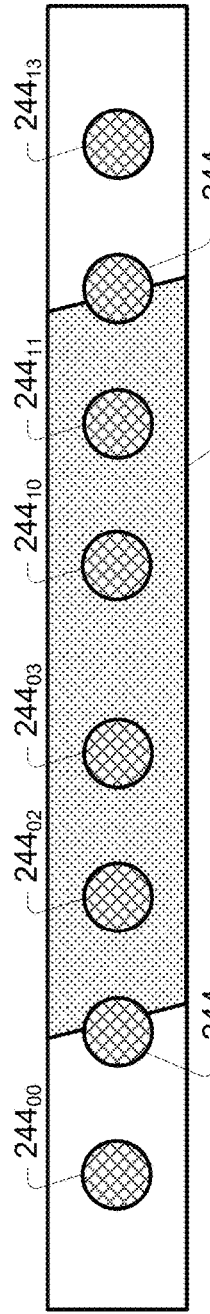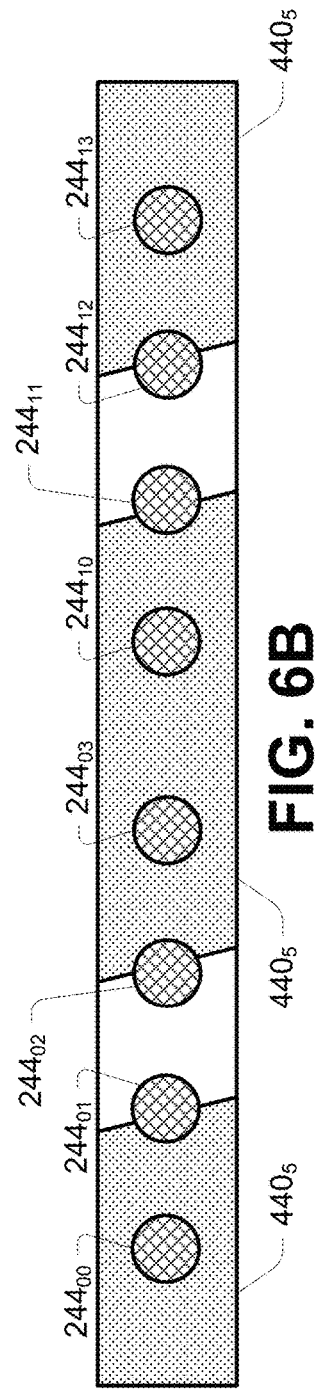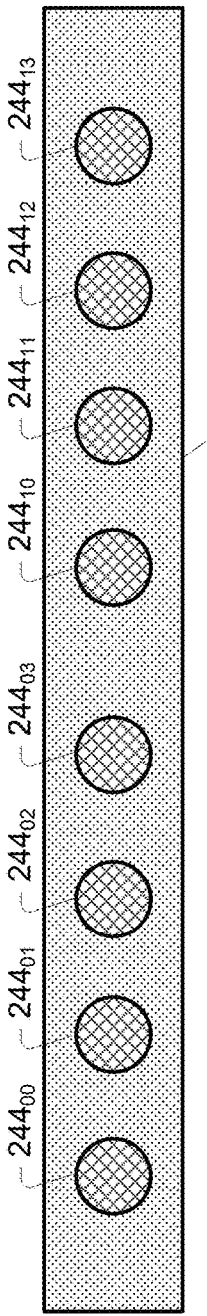

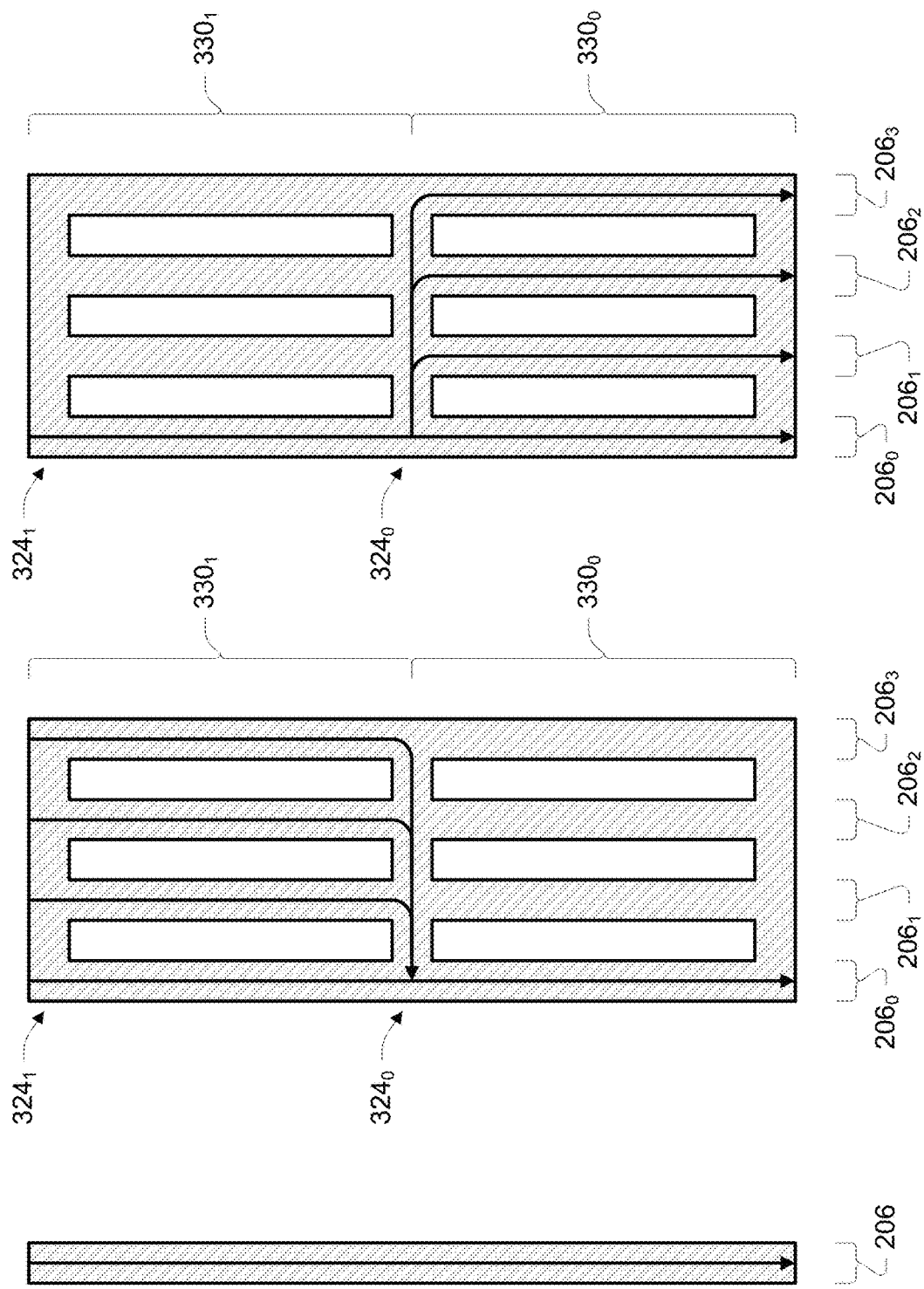

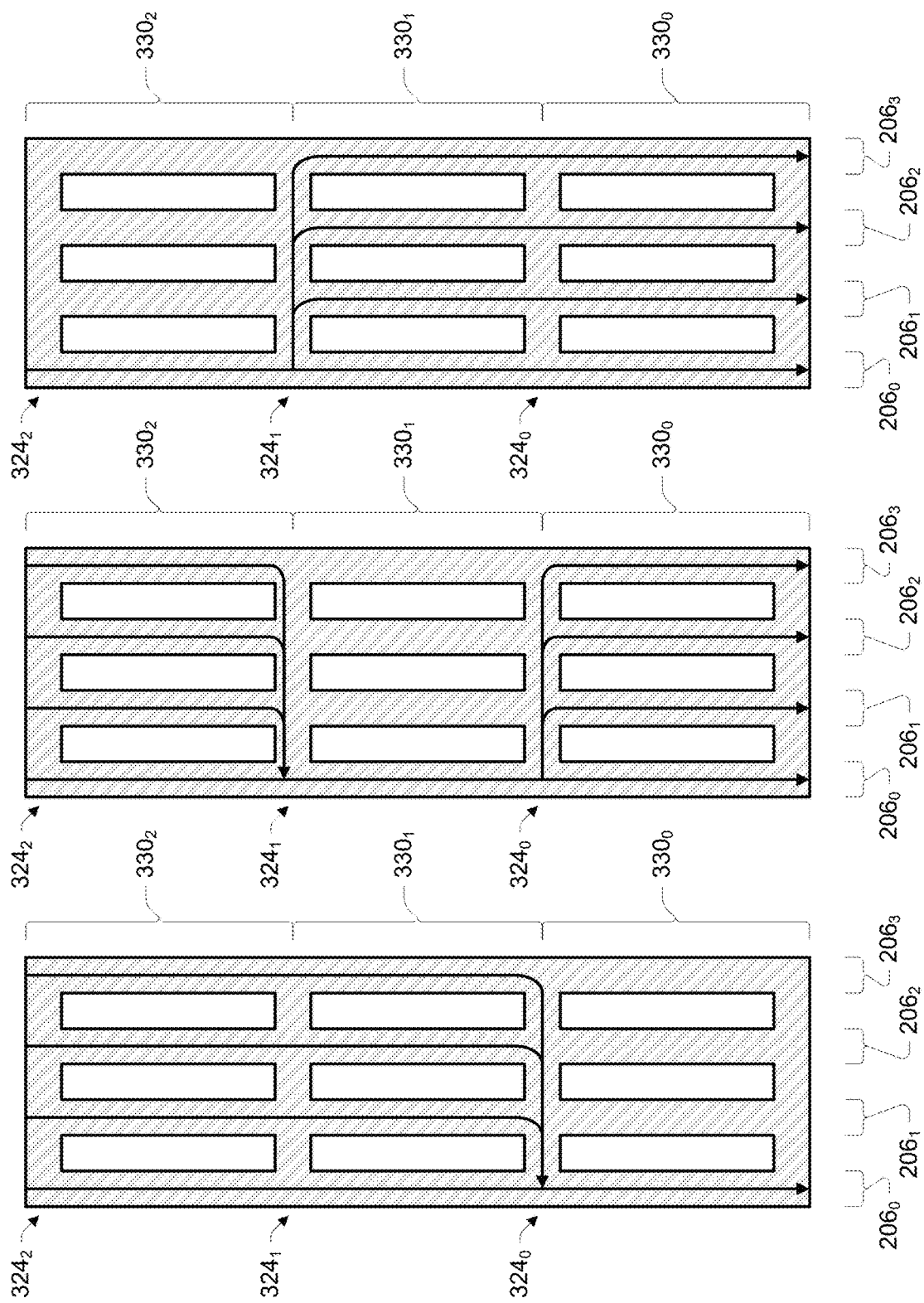

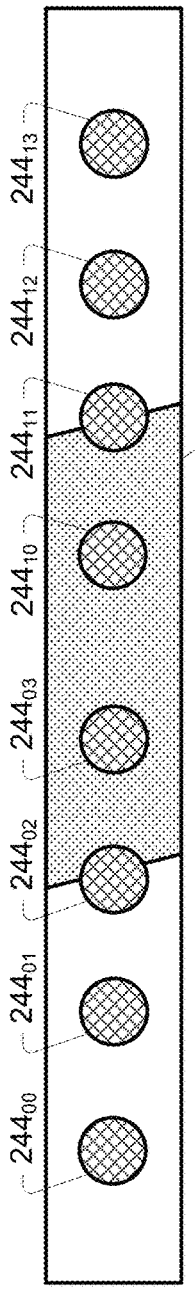
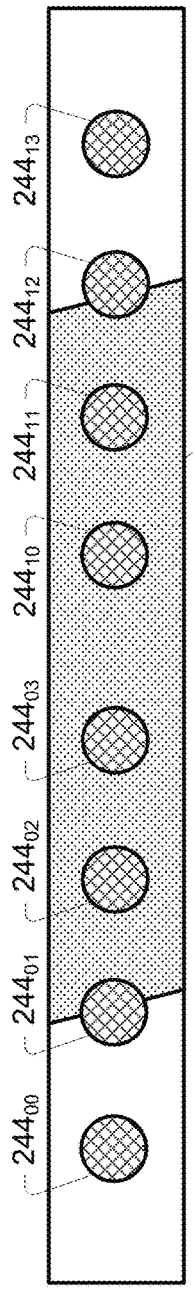
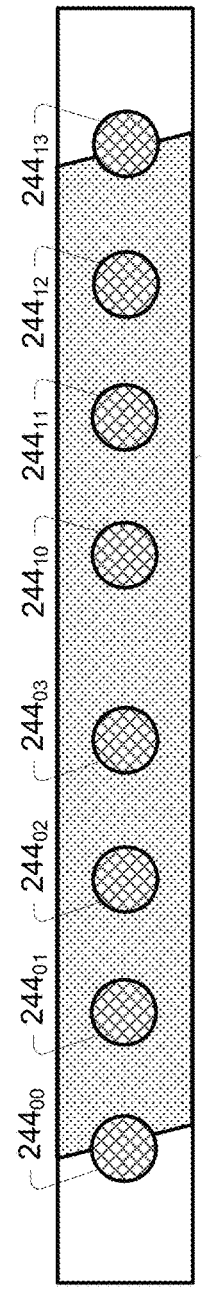
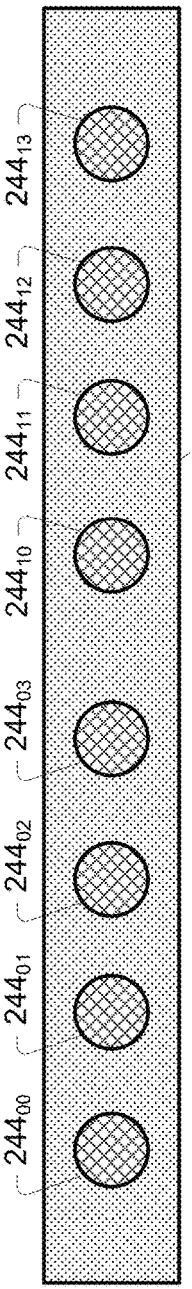
FIG. 19A
FIG. 19B
FIG. 19C
FIG. 19D

MEMORY ARRAYS HAVING MULTIPLE STRINGS OF SERIES-CONNECTED MEMORY CELLS SELECTIVELY CONNECTED IN PARALLEL, THEIR FABRICATION, AND THEIR OPERATION

RELATED APPLICATION

This application claims the benefit of U.S. Provisional Application No. 63/402,098, filed on Aug. 30, 2022, hereby incorporated herein in its entirety by reference.

TECHNICAL FIELD

The present disclosure relates generally to integrated circuits and integrated circuit operation, and, in particular, in one or more embodiments, the present disclosure relates to memory arrays having multiple strings of series-connected memory cells selectively connected in parallel, fabrication of such memory array structures, apparatus containing such memory array structures, and operation of such apparatus.

BACKGROUND

Integrated circuit devices traverse a broad range of electronic devices. One particular type include memory devices, oftentimes referred to simply as memory. Memory devices are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory is a common type of flash memory device, so called for the logical form in which the basic memory cell configuration is arranged. Typically, the array of memory cells for NAND flash memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor might be connected to a source, while each drain select transistor might be connected to a data line, such as column bit line. Variations using more than one select gate between a string of memory cells and the source, and/or between the string of memory cells and the data line, are known.

BRIEF DESCRIPTION OF THE DRAWINGS

FIGS. 6A-6C depict representations of top views of sections of the array structure depicted in FIG. 5.

FIG. 11 depicts a conceptualized current flow through a single string of series-connected memory cells of the related art.

FIGS. 12A-12B depict conceptualized current flows through bundled strings of series-connected memory cells in accordance with an embodiment.

FIGS. 13A-13C depict conceptualized current flows through bundled strings of series-connected memory cells in accordance with another embodiment.

FIGS. 19A-19D depict representations of top views of sections of the array structure depicted in FIG. 18.

DETAILED DESCRIPTION

Figure 1:
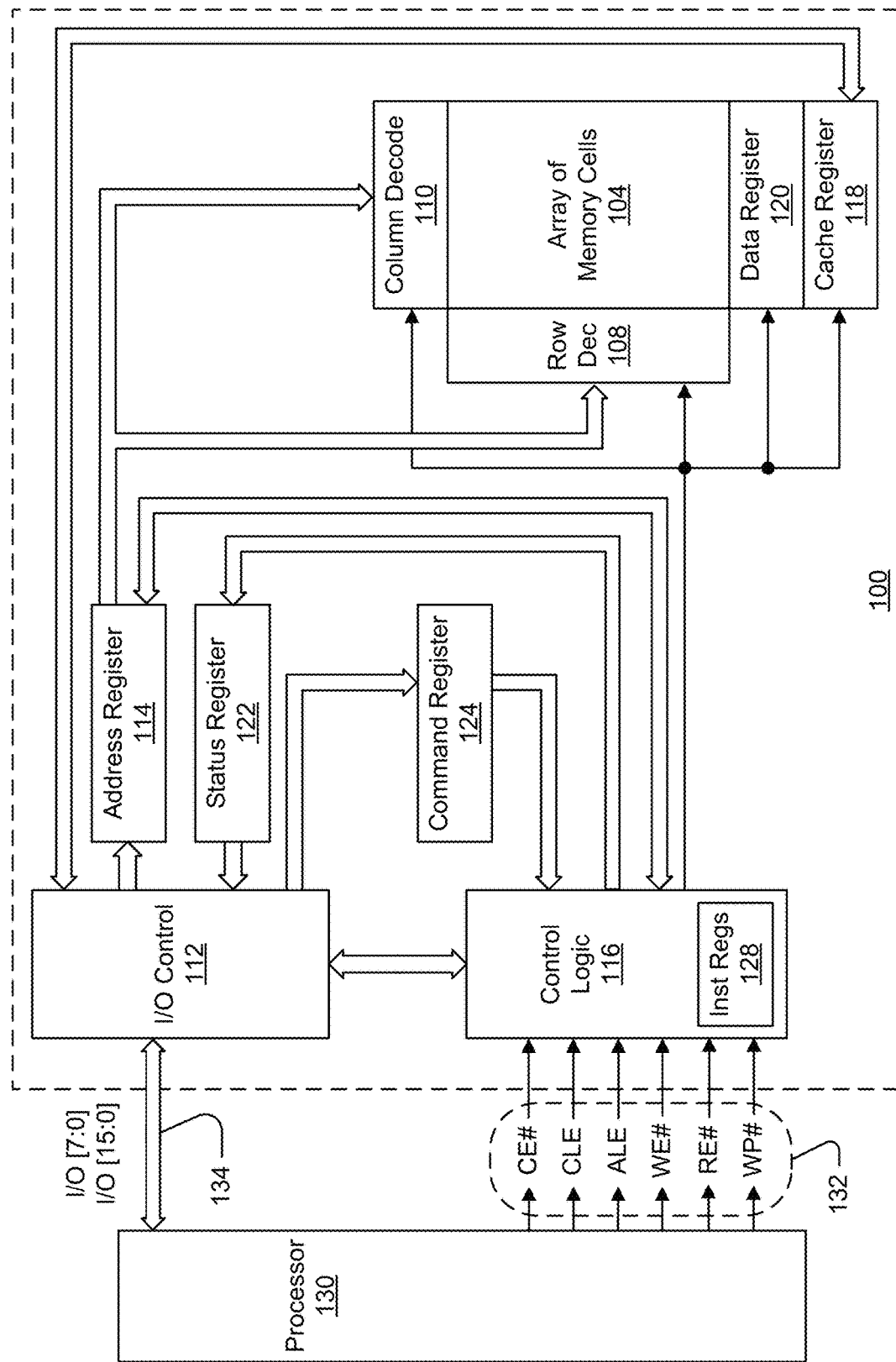
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments might be utilized and structural, logical and electrical changes might be made without departing from the scope of the present disclosure. The following detailed description is, therefore, not to be taken in a limiting sense.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting by a conductive path unless otherwise apparent from the context.

As used herein, multiple acts being performed concurrently will mean that each of these acts is performed for a respective time period, and each of these respective time periods overlaps, in part or in whole, with each of the remaining respective time periods. In other words, portions of each of those acts are simultaneously performed for at least some period of time.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. The array of memory cells 104 might contain array structures in accordance with one or more embodiments. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and might generate status information for the external processor 130, i.e., control logic 116 is configured to perform access operations (e.g., sensing operations [which might include read operations and verify operations], programming operations and/or erase operations) on the array of memory cells 104. The control logic 116 is in communication with row decode circuitry 108 and column decode circuitry 110 to control the row decode circuitry 108 and column decode circuitry 110 in response to the addresses. The control logic 116 might include instruction registers 128 which might represent computer-usable memory for storing computer-readable instructions. For some embodiments, the instruction registers 128 might represent firmware. Alternatively, the instruction registers 128 might represent a grouping of memory cells, e.g., reserved block(s) of memory cells, of the array of memory cells 104. The control logic 116 might be configured, e.g., in response to such computer-readable instructions, to cause the memory 100 to perform methods of one or more embodiments.

Control logic 116 might further be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104; then new data might be latched in the cache register 118 from the I/O control circuitry 112. During a read operation, data might be passed from the cache register 118 to the I/O control circuitry 112 for output to the external processor 130; then new data might be passed from the data register 120 to the cache register 118. The cache register 118 and/or the data register 120 might form (e.g., might form a portion of) a page buffer of the memory device 100. A page buffer might further include sensing devices (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

Memory device 100 receives control signals at control logic 116 from processor 130 over a control link 132. The control signals might include a chip enable CE #, a command latch enable CLE, an address latch enable ALE, a write enable WE #, a read enable RE #, and a write protect WP #. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. For another embodiment, cache register 118 might be omitted, and the data might be written directly into data register 120. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2:
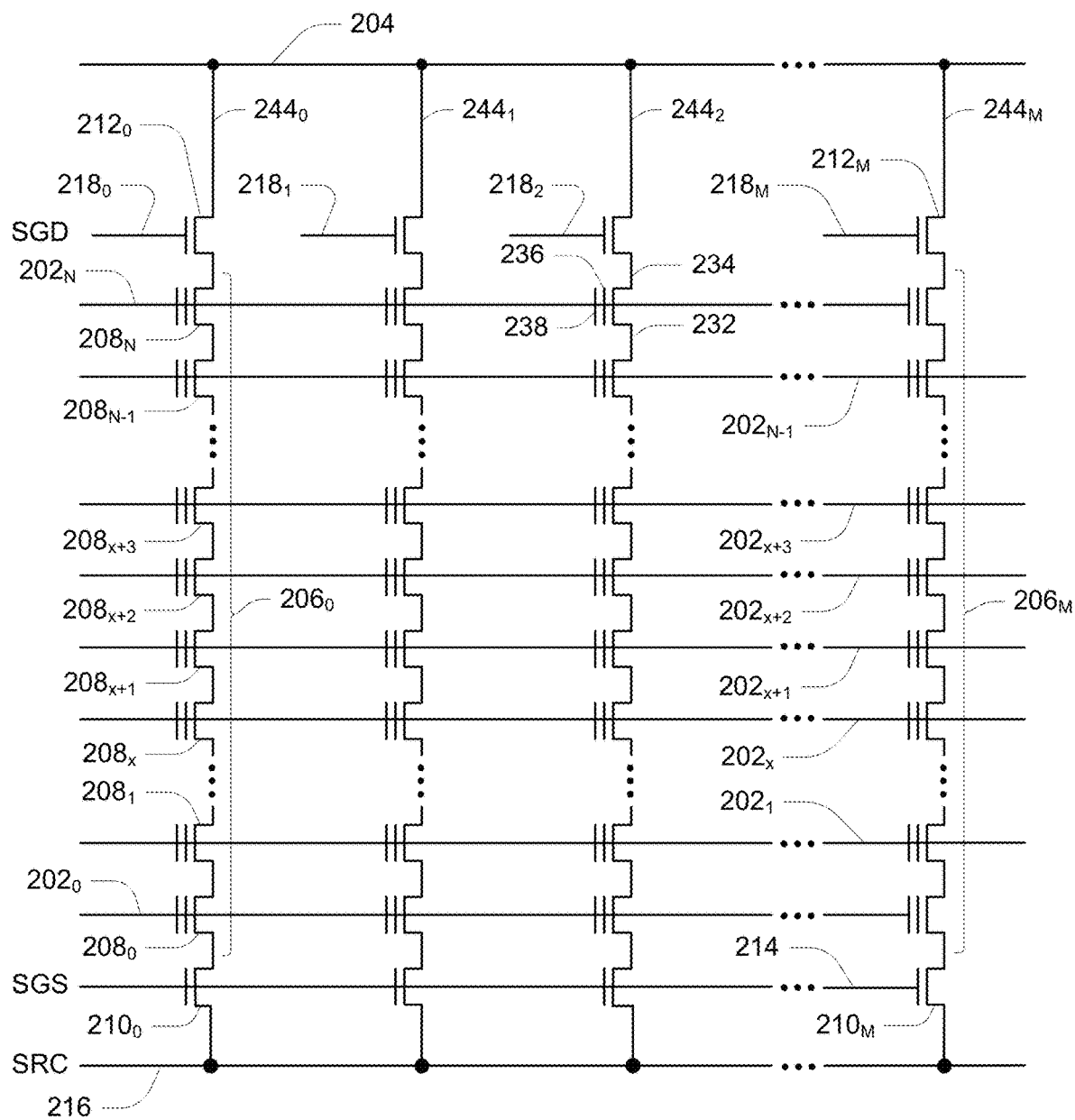
FIG. 2 is a schematic of a portion of an array of memory cells of the related art.

FIG. 2 is a schematic of a portion of an array of memory cells, such as a NAND memory array, of the related art. The array of memory cells includes access lines (e.g., word lines) $202_0$ to $202_N$, and a data line (e.g., bit line) 204. The array of memory cells might be arranged in rows (each corresponding to an access line 202) and columns (each corresponding to a data line 204). Each column might include a string of series-connected memory cells (e.g., non-volatile memory cells), such as one of NAND strings $206_0$ to $206_M$. Each NAND string 206 might be connected (e.g., selectively connected) to a common source (SRC) 216 and might include memory cells $208_0$ to $208_N$. The memory cells 208 might represent non-volatile memory cells for storage of data.

The memory cells 208 of each NAND string 206 might be connected in series between a select gate 210 (e.g., a field-effect transistor), such as one of the select gates $210_0$ to $210_M$, and a select gate 212 (e.g., a field-effect transistor), such as one of the select gates $212_0$ to $212_M$. Select gates $210_0$ to $210_M$ might be commonly connected to a select line 214, such as a source select line (SGS), and select gates $212_0$ to $212_M$ might be connected to different select lines 218, e.g., select lines $218_0$-$218_M$. A control gate of each select gate 210 might be connected to select line 214. A control gate of each select gate 212 might be connected to a respective select line 218. As used herein, a field-effect transistor, e.g., an integrated circuit device using an electric field to control the flow of current, might be alternatively referred to as a transistor.

A source of each select gate 210 might be connected to common source 216. The drain of each select gate 210 might be connected to a memory cell 208 of the corresponding NAND string 206. For example, the drain of select gate $210_0$ might be connected to the source of memory cell $208_0$ of the corresponding NAND string $206_0$. Therefore, each select gate 210 for a corresponding NAND string 206 might be configured to selectively connect that NAND string 206 to common source 216.

The drain of each select gate 212 might be connected to the data line 204. The source of each select gate 212 might be connected to a memory cell 208 of the corresponding NAND string 206. For example, the source of select gate $212_0$ might be connected to memory cell $208_N$ of the corresponding NAND string $206_0$. Therefore, each select gate 212 for a corresponding NAND string 206 might be configured to selectively connect that NAND string 206 to the data line 204.

The access lines 202 and select lines 214 and 218 might be formed around channel material structures 244. Each channel material structure 244 might contain a channel material forming a channel of the select gate 210, the select gate 212, and each memory cell 208 of its respective NAND string 206. For example, the channel material structure $244_0$ might form a channel for the select gate $210_0$, the select gate $212_0$, and each memory cell $208_0$-$208_N$ of the NAND string $206_0$.

Typical construction of memory cells 208 includes a data-storage structure 236 (e.g., a floating gate, charge trap, or other structure configured to store charge) that can determine a data state of the memory cell (e.g., through changes in threshold voltage), and a control gate 238, as shown in FIG. 2. The data-storage structure 236 might include conductive and/or dielectric structures while the control gate 238 is generally formed of one or more conductive materials. In some cases, memory cells 208 might further have a defined source/drain (e.g., source) 232 and a defined source/drain (e.g., drain) 234. Memory cells 208 have their control gates 238 connected to (and in some cases form) an access line 202.

Figure 3A:
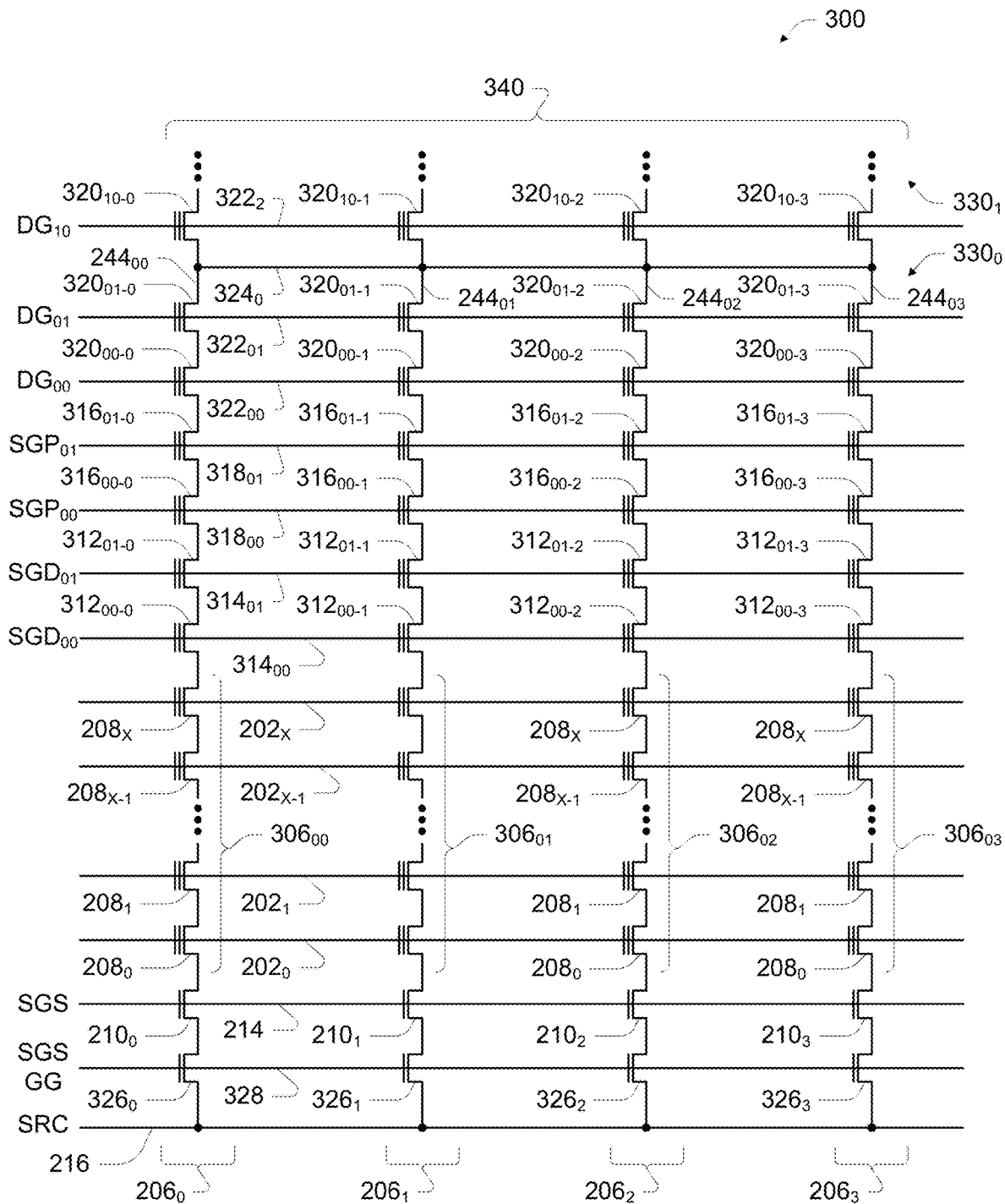
FIGS. 3A-3B are schematics of portions of an array of memory cells in accordance with an embodiment as could be used in a memory of the type described with reference to FIG. 1.
Figure 3B:
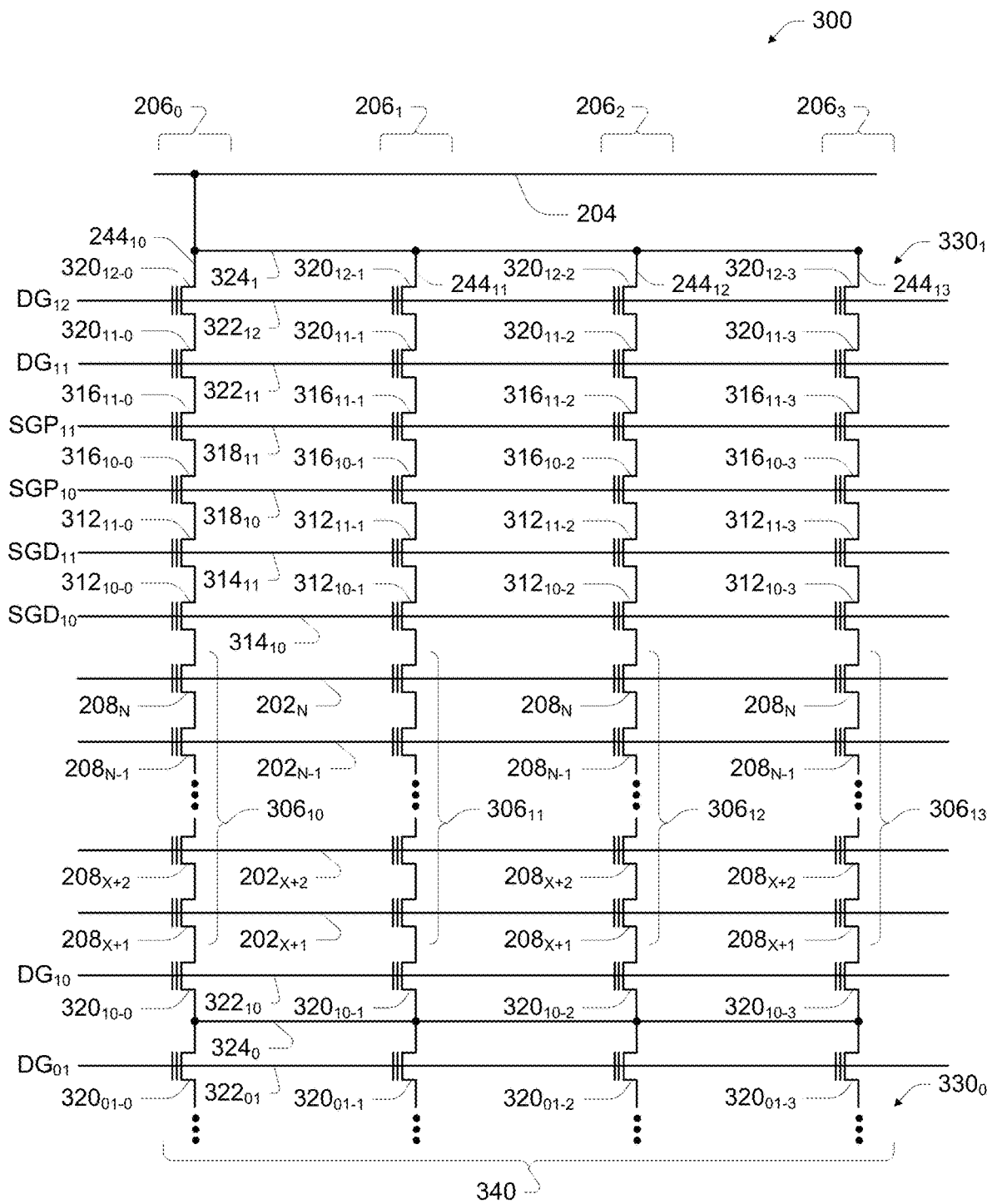

FIGS. 3A-3B are schematics of portions of an array of memory cells in accordance with an embodiment as could be used in a memory of the type described with reference to FIG. 1. Like numbered elements in FIGS. 3A-3B correspond to the description as provided with respect to FIG. 2.

FIGS. 3A and 3B are schematics of a portion of an array of memory cells 300, such as a NAND array of memory cells, as could be used in a memory of the type described with reference to FIG. 1, e.g., as a portion of array of memory cells 104. The array of memory cells 300 includes access lines (e.g., word lines) $202_0$ to $202_N$, and a data line (e.g., bit line) 204. The access lines 202 might be connected to global access lines (e.g., global word lines), not shown in FIGS. 3A-3B, in a many-to-one relationship. For some embodiments, the array of memory cells 300 might be formed over a semiconductor that, for example, might be conductively doped to have a conductivity type, such as a p-type conductivity, e.g., to form a p-well, or an n-type conductivity, e.g., to form an n-well.

The array of memory cells 300 might be arranged in rows (each corresponding to an access line 202) and columns (each corresponding to a data line 204). Each column might include a string of series-connected memory cells (e.g., non-volatile memory cells), such as NAND strings $206_0$ to $206_3$. Although four NAND strings 206 are depicted in the cluster of strings of series-connected memory cells 340 in FIGS. 3A-3B, the number of NAND strings 206 in a cluster of strings of series-connected memory cells 340 could be any integer value greater than or equal to two.

Each NAND string 206 might be connected (e.g., selectively connected) between a common source (SRC) 216 and a data line 204, and might each include memory cells $208_0$ to $208_N$. The memory cells 208 might represent non-volatile memory cells for storage of data. Some of the memory cells 208 might represent dummy memory cells, e.g., memory cells not intended to store user data. Dummy memory cells are typically not accessible to a user of the memory, and are typically incorporated into the NAND string 206 for operational advantages, as are well understood.

The array of memory cells 300 might further be arranged in two or more decks of memory cells 330, e.g., decks of memory cells $330_0$ and $330_1$, each corresponding to a respective conductive element 324, e.g., conductive elements $324_0$ and $324_1$, respectively. Each deck of memory cells 330 might include a respective segment of series-connected memory cells 306 for each NAND string 206, and associated gates (e.g., gates 210, 220, 312, 316 and/or 320) to selectively connect each segment of series-connected memory cells 306 to its corresponding conductive element 324, and to either a corresponding conductive element of an adjacent deck of memory cells 330 (e.g., for the deck of memory cells $330_1$) or the common source 216 (e.g., for the deck of memory cells $330_0$). The channel material structures 244 of a deck of memory cells might each be connected to their corresponding conductive element 324, and further might each be connected to the corresponding conductive element 324 of any adjacent deck of memory cells 330. In this manner, each segment of series-connected memory cells 306 might be selectively connected to each remaining segment of series-connected memory cells 306, thus facilitating parallel current paths through the array structure. For some embodiments, the data line 204 and the corresponding conductive element 325 for a deck of memory cells 330 might be a same conductive structure, e.g., with a data line 204 connected directly to the channel material structures 244 of a deck of memory cells 330.

The respective segments of series-connected memory cells 306 for a NAND string 206 for each deck of memory cells might collectively define that NAND string 206. For example, the NAND string $206_0$ might include a first segment of series-connected memory cells $306_{00}$ in the first deck of memory cells $330_0$ that is connected in series with a second segment of series-connected memory cells $306_{10}$ in the second deck of memory cells $330_1$, the NAND string $206_1$ might include a first segment of series-connected memory cells $306_{01}$ in the first deck of memory cells $330_0$ that is connected in series with a second segment of series-connected memory cells $306_{11}$ in the second deck of memory cells $330_1$, the NAND string $206_2$ might include a first segment of series-connected memory cells $306_{02}$ in the first deck of memory cells $330_0$ that is connected in series with a second segment of series-connected memory cells $306_{12}$ in the second deck of memory cells $330_1$, and the NAND string $206_3$ might include a first segment of series-connected memory cells $306_{03}$ in the first deck of memory cells $330_0$ that is connected in series with a second segment of series-connected memory cells $306_{13}$ in the second deck of memory cells $330_1$. Although only two decks of memory cells 330 are depicted in FIGS. 3A-3B, and, thus, two segments of series-connected memory cells 306 in each NAND string 206, additional decks of memory cells 330 could be utilized with each containing an additional segment of series-connected memory cells 306 for each NAND string 206.

For example, one or more additional decks of memory cells 330 could be inserted between the deck of memory cells $330_1$ and the deck of memory cells $330_0$, with each additional deck of memory cells 330 repeating a structure similar to that depicted in FIG. 3B. For example, the channel material structures of an additional deck of memory cells could be connected between the conductive element $324_0$ and the corresponding conductive element of the additional deck of memory cells, and the channel material structures $244_{10}$-$244_{13}$ of the deck of memory cells $330_1$ could be connected to the corresponding conductive element of the additional deck of memory cells instead of the conductive element $324_0$.

The memory cells 208 of each segment of series-connected memory cells 306 of the deck of memory cells $330_0$ might be connected in series between a select gate 210 (e.g., a transistor), such as one of the select gates $210_0$ to $210_3$ (e.g., that might be source select transistors, commonly referred to as select gate source), and one or more select gates 312 (e.g., transistors), such as a corresponding one of the select gates $312_{00\text{-}0}$ to $312_{00\text{-}3}$, and a corresponding one of the select gates $312_{01\text{-}0}$-$312_{01\text{-}3}$ (e.g., that might each be drain select transistors, commonly referred to as select gate drain). Select gates $210_0$ to $210_3$ might be commonly connected to a select line 214, such as a source select line (SGS). Select gates $312_{00\text{-}0}$ to $312_{00\text{-}3}$ might be commonly connected to a select line $314_{00}$, such as a drain select line (SGD$_{00}$). Select gates $311_{01\text{-}0}$-$312_{01\text{-}3}$ might be commonly connected to a select line $314_{01}$, such as a drain select line (SGD$_{01}$). The select gates 312 might utilize a structure similar to (e.g., the same as) the memory cells 208. Although depicted as traditional transistors, the select gates 210 might also utilize a structure similar to (e.g., the same as) the memory cells 208. The select gates 210 might represent a plurality of select gates connected in series, with each select gate in series configured to receive a same or independent control signal. A control gate of each select gate 210 might be connected to select line 214. A control gate of each select gate 312 might be connected to a respective select line 314.

The select gates 210 for each NAND string 206 might be connected in series between its memory cells 208 and an optional GIDL (gate-induced drain leakage) generator gate 326 (e.g., a transistor), such as one of the GIDL generator (GG) gates 3260 to 3263. The GG gates 3260 to 3263 might be referred to as source GG gates. The source GG gates 3260 to 3263 might each be connected (e.g., directly connected) to the source 216, and selectively connected to their respective NAND strings $206_0$ to $206_3$. Alternatively, a select gate 210 and its GG gate 326 might represent a single gate, e.g., connected (e.g., directly connected) to the source 216, and connected (e.g., directly connected) to a respective NAND string 206.

The select gates 312 of each segment of series-connected memory cells 306 of the deck of memory cells $330_0$ might be connected in series between its memory cells 208 and one or more pre-configured select gates 316, such as a corresponding one of the pre-configured select gates $316_{00\text{-}0}$ to $316_{00\text{-}3}$, and a corresponding one of the pre-configured select gates $316_{01\text{-}0}$-$316_{01\text{-}3}$. Pre-configured select gates $316_{00\text{-}0}$ to $316_{00\text{-}3}$ might be commonly associated with a select line $318_{00}$, such as select line $SGP_{00}$. Pre-configured select gates $316_{01\text{-}0}$-$316_{01\text{-}3}$ might be commonly associated with a select line $318_{01}$, such as select line $SGP_{01}$. A pre-configured select gate 316 is associated with a select line 318 if it is formed at a same level as the select line 318.

Some of the pre-configured select gates 316 might utilize a structure similar to (e.g., the same as) the memory cells 208. However, as will be described in more detail infra, one or more of the pre-configured select gates 316 might lack a functional control gate. Although lacking a functional control gate, such pre-configured select gates 316 will still be deemed to be transistors herein, albeit having a control gate, e.g., its associated select line 318, that is separated from its channel by too great a distance to effectively alter the conductivity of that transistor. In addition, fewer or more select gates 312 might be utilized in series and fewer or more pre-configured select gates 316 might be utilized in series. For example, where two select gates 312 in series might be sufficient for embodiments where the cluster of strings of series-connected memory cells 340 contains four or fewer NAND strings 206, additional select gates 312 in series might be utilized for embodiments containing more than four NAND strings 206. Similarly, where two pre-configured select gates 316 in series might be sufficient for embodiments where the cluster of strings of series-connected memory cells 340 contains four or fewer NAND strings 206, additional pre-configured select gates 316 in series might be utilized for embodiments containing more than four NAND strings 206. Conversely, one select gate 312 and one pre-configured select gate 316 for each channel material structure 244 might be sufficient for an embodiment where the cluster of strings of series-connected memory cells 340 contains two NAND strings 206.

The pre-configured select gates 316 of each segment of series-connected memory cells 306 of the deck of memory cells $330_0$ might be connected in series between its memory cells 208 and one or more optional select gates 320 such as corresponding one of the optional select gates $320_{00\text{-}0}$ to $320_{00\text{-}3}$, and a corresponding one of the optional select gates $320_{01\text{-}0}$-$320_{01\text{-}3}$. The optional select gates $320_{00\text{-}0}$ to $320_{00\text{-}3}$ might be commonly connected to a select line $322_{00}$, such as select line $DG_{00}$. The optional select gates $320_{01\text{-}0}$-$320_{01\text{-}3}$ might be commonly connected to a select line $322_{01}$, such as select line $DG_{01}$. The optional select gates 320 might utilize a structure similar to (e.g., the same as) the memory cells 208. In addition, fewer or more optional select gates 320 might be utilized in series. The optional select gates $320_{01\text{-}0}$-$320_{01\text{-}3}$ might be provided to improve conductivity of the conductive element $324_0$. The optional select gates $320_{00\text{-}0}$-$320_{00\text{-}3}$ might be provided to support a fringing field resulting from pre-configured select gates 316 that are not in contact with, or are only partially in contact with, their associated select line 318.

The memory cells 208 of each segment of series-connected memory cells 306 of the deck of memory cells $330_1$ might be connected in series between one or more optional select gates 320, such as a corresponding one of the optional select gates $320_{10\text{-}0}$ to $320_{10\text{-}3}$, and one or more select gates 312, such as corresponding one of the select gates $312_{10\text{-}0}$ to $312_{10\text{-}3}$, and a corresponding one of the select gates $312_{11\text{-}0}$-$312_{11\text{-}3}$ (e.g., that might each be drain select transistors, commonly referred to as select gate drain). The optional select gates $320_{10\text{-}0}$ to $320_{10\text{-}3}$ might be commonly connected to a select line $322_{10}$, such as select line $DG_{10}$. In addition, fewer or more optional select gates 320 might be utilized in series. The optional select gates $320_{10\text{-}0}$-$320_{10\text{-}3}$ might be provided to improve conductivity of the conductive element $324_0$. Select gates $312_{10\text{-}0}$ to $312_{10\text{-}3}$ might be commonly connected to a select line $314_{10}$, such as a drain select line ($SGD_{10}$). Select gates $312_{11\text{-}0}$-$312_{11\text{-}3}$ might be commonly connected to a select line $314_{11}$, such as a drain select line ($SGD_{11}$). A control gate of each select gate 312 might be connected to a respective select line 314.

The select gates 312 of each segment of series-connected memory cells 306 of the deck of memory cells $330_1$ might be connected in series between its memory cells 208 and one or more pre-configured select gates 316 such as corresponding one of the pre-configured select gates $316_{10\text{-}0}$ to $316_{10\text{-}3}$, and a corresponding one of the pre-configured select gates $316_{11\text{-}0}$-$316_{11\text{-}3}$. Pre-configured select gates $316_{10\text{-}0}$ to $316_{10\text{-}3}$ might be commonly associated with a select line $318_{10}$, such as select line $SGP_{10}$. Pre-configured select gates $316_{11\text{-}0}$-$316_{11\text{-}3}$ might be commonly associated with a select line $318_{11}$, such as select line $SGP_{11}$. Fewer or more select gates 312 might be utilized in series and fewer or more pre-configured select gates 316 might be utilized in series.

The pre-configured select gates 316 of each segment of series-connected memory cells 306 of the deck of memory cells $330_1$ might be connected in series between its memory cells 208 and one or more optional select gates 320 such as corresponding one of the optional select gates $320_{11\text{-}0}$ to $320_{11\text{-}3}$, and a corresponding one of the optional select gates $320_{12\text{-}0}$-$320_{12\text{-}3}$. The optional select gates $320_{11\text{-}0}$ to $320_{11\text{-}3}$ might be commonly connected to a select line $322_{11}$, such as select line $DG_{11}$. The optional select gates $320_{12\text{-}0}$-$320_{12\text{-}3}$ might be commonly connected to a select line $322_{12}$, such as select line $DG_{12}$. For some embodiments, optional select gates 320 between a segment of series-connected memory cells 306 and its corresponding conductive element 324 might be configured to operate as GIDL generator gates. Fewer or more optional select gates 320 might be utilized in series. The optional select gates $320_{12\text{-}0}$-$320_{12\text{-}3}$ might be provided to improve conductivity of the conductive element $324_1$. The optional select gates $320_{11\text{-}0}$-$320_{11\text{-}3}$ might be provided to support a fringing field resulting from pre-configured select gates 316 that are not in contact with, or are only partially in contact with, their associated select line 318.

Each pre-configured select gate 316 might be configured, e.g., at a time of fabrication, to either have a programmable threshold voltage or a non-programmable threshold voltage. Note that this results from a structural difference between two pre-configured select gates 316 at a time of fabrication, and is independent of differences in threshold voltage that could result over time. As will be described in more detail infra, in operation, each pre-configured select gate 316 having a control gate associated with a same select line 318 might have either a first threshold voltage (Vt) or a second threshold voltage different than (e.g., higher than) the first threshold voltage. For example, each pre-configured select gate 316 might be fabricated to have the first threshold voltage. The first threshold voltage might be a negative threshold voltage. A pre-configured select gate 316 having a control gate connected to its associated select line 318 and sufficiently (e.g., fully) surrounding its corresponding channel material structure 244 might have a programmable threshold voltage, and could thus be subjected to a programming operation on its associated select line 318 to have the second threshold voltage, e.g., a positive threshold voltage. A pre-configured select gate 316 that is either not in contact with its associated select line 318, or has a control gate connected to its associated select line 318 without sufficiently surrounding its corresponding channel material structure 244, might remain at the first threshold voltage regardless of a programming operation on its associated select line 318. This might result in a number of programmable pre-configured select gates 316 between one segment of series-connected memory cells 306 and its corresponding conductive element 324 being different than the number of programmable pre-configured select gates 316 between a different segment of series-connected memory cells 306 and the corresponding conductive element 324.

Figure 4:
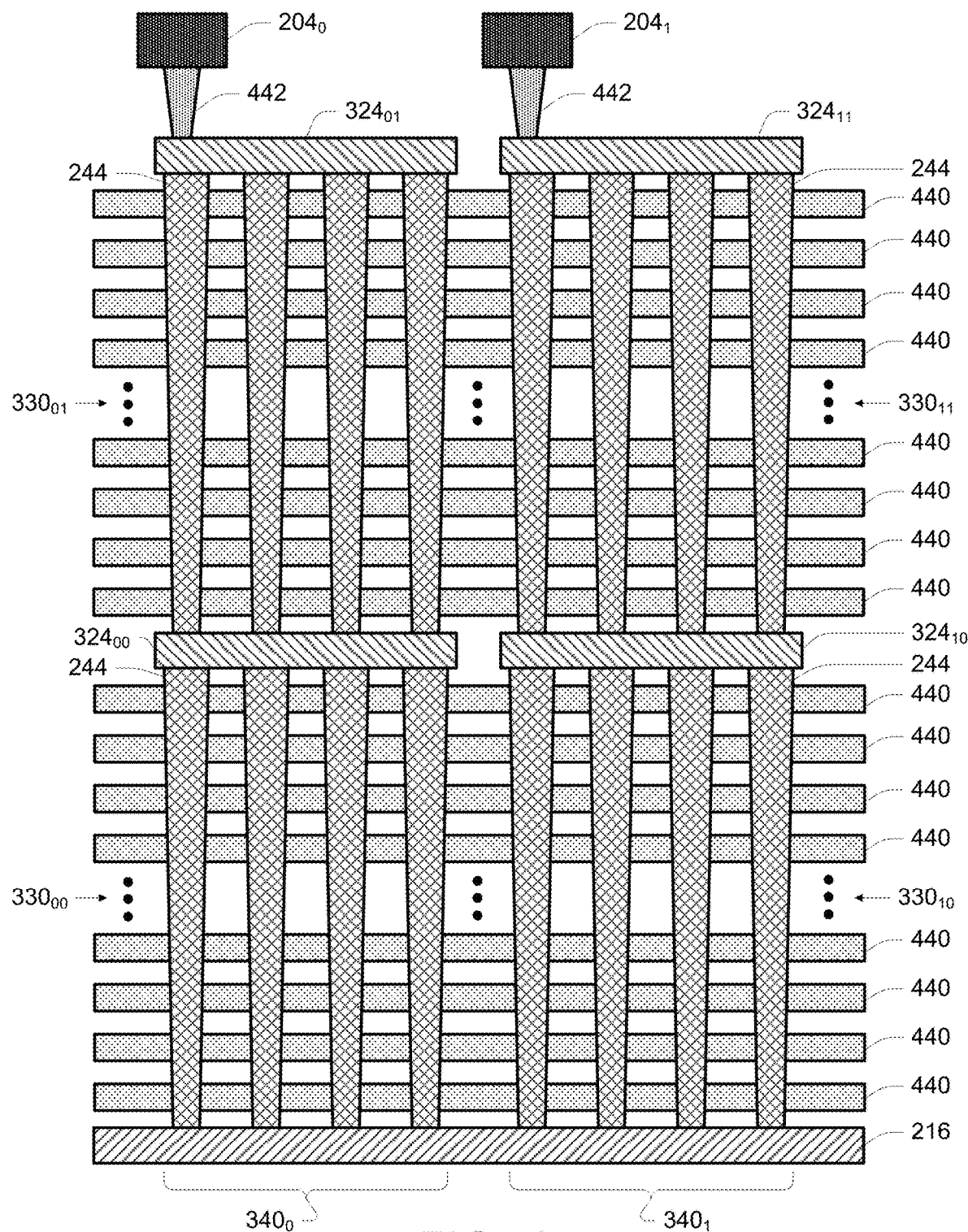
FIG. 4 depicts a conceptualized representation of a cross-sectional view of a portion of an array structure in accordance with an embodiment.

FIG. 4 depicts a conceptualized representation of a cross-sectional view of a portion of an array structure in accordance with an embodiment. Like numbered elements in FIG. 4 correspond to the description as provided with respect to FIGS. 3A-3B. The embodiment of FIG. 4 depicts an array structure similar to that depicted in FIGS. 3A-3B, having two decks of memory cells 330 for each cluster of strings of series-connected memory cells 340 that each contain four strings of series-connected memory cells. For simplicity, individual select lines, e.g., select lines 214, 314, 418, 322 and/or 328, and individual access lines 202 are depicted simply as conductors 440. FIG. 4 is provided primarily to depict a possible physical structure of a schematic such as depicted in FIGS. 3A-3B. Although each conductor 440 is depicted to be surround each channel material structure 244 of a given deck of memory cells 330, some conductors 440 might not surround each channel material structure 244.

In FIG. 4, a first data line, e.g., data line 204$_0$, might be connected to a corresponding conductive element 324, e.g., conductive element 324$_{01}$, through a contact 442. The conductive element 324$_{01}$ might be connected to the channel material structures 244 of its corresponding deck of memory cells 33001 and corresponding cluster of series-connected memory cells 340$_0$. In turn, the channel material structures 244 of its corresponding deck of memory cells 33001 and corresponding cluster of series-connected memory cells 340$_0$ might be connected to the conductive element 324$_{00}$ corresponding to the deck of memory cells 330$_{00}$. The conductive element 324$_{00}$ might be connected to the channel material structures 244 of its corresponding deck of memory cells 330$_{00}$ and corresponding cluster of series-connected memory cells 340$_0$. In turn, the channel material structures 244 of its corresponding deck of memory cells 330$_0$ and corresponding cluster of series-connected memory cells 340$_0$ might be connected to the common source 216.

In FIG. 4, a second data line, e.g., data line 204$_1$, might be connected to a corresponding conductive element 324, e.g., conductive element 324$_{11}$, through a contact 442. The conductive element 324$_{11}$ might be connected to the channel material structures 244 of its corresponding deck of memory cells 330$_{11}$ and corresponding cluster of series-connected memory cells 340$_1$. In turn, the channel material structures 244 of its corresponding deck of memory cells 330$_{11}$ and corresponding cluster of series-connected memory cells 340$_1$ might be connected to the conductive element 324$_{10}$ corresponding to the deck of memory cells 330$_{10}$. The conductive element 324$_{10}$ might be connected to the channel material structures 244 of its corresponding deck of memory cells 330$_{10}$ and corresponding cluster of series-connected memory cells 340$_1$. In turn, the channel material structures 244 of its corresponding deck of memory cells 330$_{10}$ and corresponding cluster of series-connected memory cells 340$_1$ might be connected to the common source 216.

Figure 5:
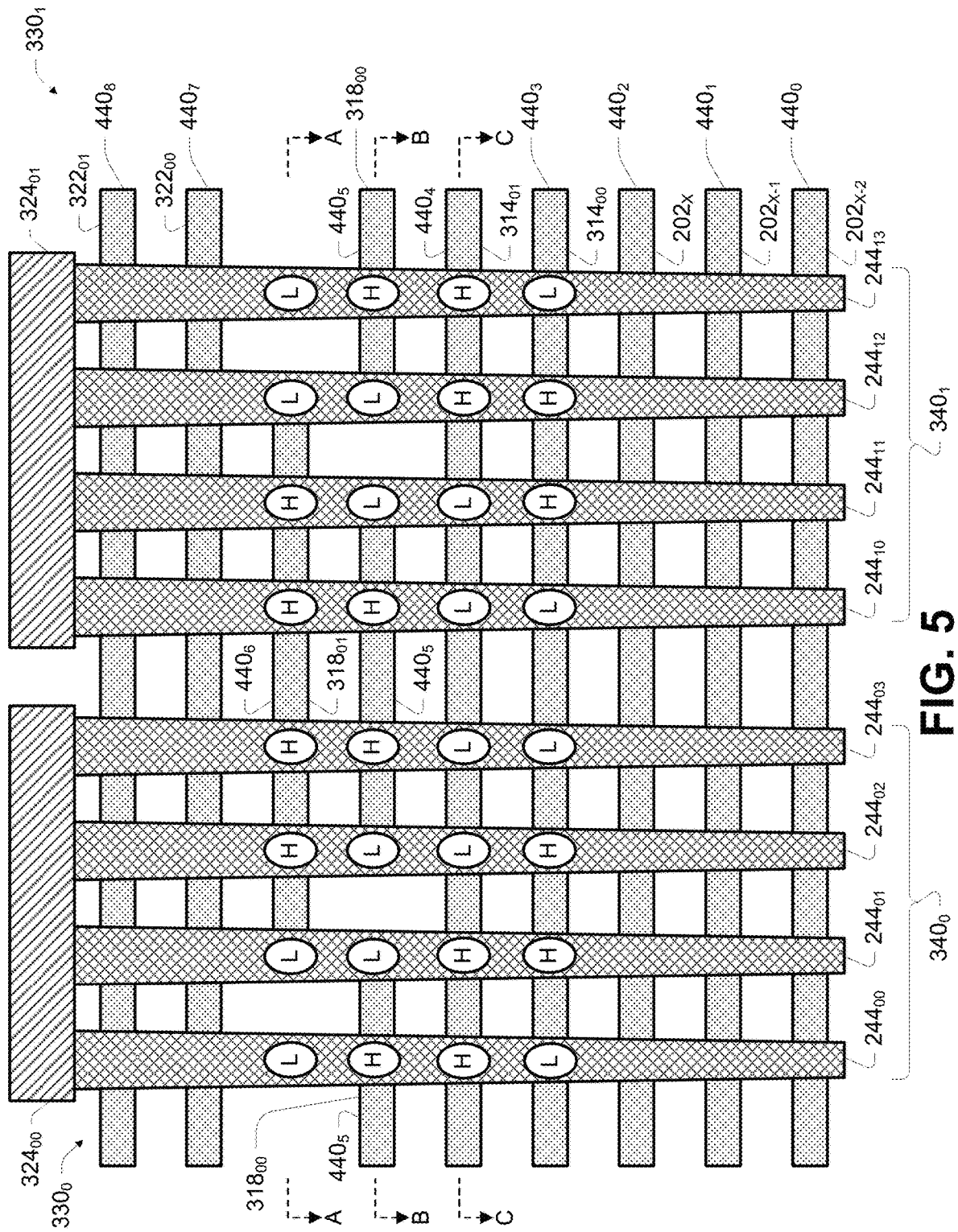
FIG. 5 depicts a conceptualized representation of a cross-sectional view of a portion of an array structure in accordance with another embodiment.

FIG. 5 depicts a conceptualized representation of a cross-sectional view of a portion of an array structure in accordance with another embodiment. Like numbered elements in FIG. 5 correspond to the description as provided with respect to FIG. 4. For example, the structure of FIG. 5 might correspond to a portion of two decks of memory cells 330, each having a structure similar to that depicted in FIG. 3A, in which the conductive element 324$_{00}$ of FIG. 5 might correspond to the conductive element 324$_0$ of FIG. 3A for selective connection to one data line 204 and the conductive element 324$_{01}$ of FIG. 5 might correspond to the conductive element 324$_0$ of FIG. 3A for selective connection to a different data line 204, the conductor 440$_8$ of FIG. 5 might correspond to the select line 322$_{01}$ of FIG. 3A, the conductor 440$_7$ of FIG. 5 might correspond to the select line 322$_{00}$ of FIG. 3A, the conductor 440$_6$ of FIG. 5 might correspond to the select line 318$_{01}$ of FIG. 3A, the conductor 440$_5$ of FIG. 5 might correspond to the select line 318$_{00}$ of FIG. 3A, the conductor 440$_4$ of FIG. 5 might correspond to the select line 314$_{01}$ of FIG. 3A, the conductor 440$_3$ of FIG. 5 might correspond to the select line 314$_{00}$ of FIG. 3A, the conductor 440$_2$ of FIG. 5 might correspond to the access line 202$_X$ of FIG. 3A, the conductor 440$_1$ of FIG. 5 might correspond to the access line 202$_{X-1}$ of FIG. 3A, and the conductor 440$_0$ of FIG. 5 might correspond to the access line 202$_{X-2}$ (not depicted in FIG. 3A).

The pre-configured select gates 316 associated with the select line 318$_{01}$ and corresponding to the channel material structures 244$_{00}$, 244$_{01}$, 244$_{12}$, and 244$_{13}$ (e.g., having channels in one of those channel material structures 244) might be fabricated to have the first (low) threshold voltage, e.g., indicated by the "L" designation in FIG. 5, and might remain at the first threshold voltage following programming of other pre-configured select gates 316 associated with the select line 318$_{01}$. The pre-configured select gates 316 associated with the select line 318$_{01}$ and corresponding to the channel material structures 244$_{02}$, 244$_{03}$, 244$_{10}$, and 244$_{11}$ might be fabricated to have the first (low) threshold voltage and might be subsequently programmed to have the second (high) threshold voltage, e.g., indicated by the "H" designation in FIG. 5.

The pre-configured select gates 316 associated with the select line 318$_{00}$ and corresponding to the channel material structures 244$_{01}$, 244$_{02}$, 244$_{11}$, and 244$_{12}$ might be fabricated to have the first (low) threshold voltage, e.g., indicated by the "L" designation in FIG. 5, and might remain at the first threshold voltage following programming of other pre-configured select gates 316 associated with the select line 318$_{00}$. The pre-configured select gates 316 associated with the select line 318$_{00}$ and corresponding to the channel material structures 244$_{00}$, 244$_{03}$, 244$_{10}$, and 244$_{13}$ might be fabricated to have the first (low) threshold voltage and might be subsequently programmed to have the second (high) threshold voltage, e.g., indicated by the "H" designation in FIG. 5.

FIGS. 6A-6C depict representations of top views of sections of the array structure depicted in FIG. 5. FIG. 6A is taken at the line A-A of FIG. 5, FIG. 6B is taken at the line B-B of FIG. 5, and FIG. 6C is taken at the line C-C of FIG. 5.

As can be seen in FIG. 6A, the conductor 440$_6$, e.g., the select line 318$_{01}$, might sufficiently (e.g., fully) surround the channel material structures $244_{02}$ and $244_{03}$ of the cluster of strings of series-connected memory cells $340_0$ and might sufficiently (e.g., fully) surround the channel material structures $244_{10}$ and $244_{11}$ of the cluster of strings of series-connected memory cells $340_1$. However, the conductor $440_6$ might not sufficiently surround the channel material structure $244_{01}$ of the cluster of strings of series-connected memory cells $340_0$ or the channel material structure $244_{12}$ of the cluster of strings of series-connected memory cells $340_1$. That is, under normal operating conditions for a programming operation, such as would be used in the programming of any of the memory cells 208, a conductor 440 does not sufficiently surround a channel material structure 244 if it is not expected to be capable of increasing a threshold voltage of a corresponding pre-configured select gate 316 to the second threshold voltage during a programming operation on its associated select line 318.

Similarly, the conductor $440_6$ might not make any connection to the channel material structure $244_{00}$ of the cluster of strings of series-connected memory cells $340_0$ or the channel material structure $244_{13}$ of the cluster of strings of series-connected memory cells $340_1$, such that it also might not sufficiently surround these channel material structures 244. As such, the pre-configured select gates 316 corresponding to the channel material structures $244_{02}$, $244_{03}$, $244_{10}$, and $244_{11}$ at the level of the conductor $440_6$ might have programmable threshold voltages, while the pre-configured select gates 316 corresponding to the channel material structures $244_{00}$, $244_{01}$, $244_{12}$, and $244_{13}$ at the level of the conductor $440_6$ might have non-programmable threshold voltages under normal operating conditions.

As can be seen in FIG. 6B, the conductor $440_5$, e.g., the select line $318_{00}$, might sufficiently (e.g., fully) surround the channel material structures $244_{00}$ and $244_{03}$ of the cluster of strings of series-connected memory cells $340_0$ and might sufficiently (e.g., fully) surround the channel material structures $244_{10}$ and $244_{13}$ of the cluster of strings of series-connected memory cells $340_1$. However, the conductor $440_5$ might not sufficiently surround the channel material structures $244_{01}$ or $244_{02}$ of the cluster of strings of series-connected memory cells $340_0$ or the channel material structures $244_{11}$ or $244_{12}$ of the cluster of strings of series-connected memory cells $340_1$. As such, the pre-configured select gates 316 corresponding to the channel material structures $244_{00}$, $244_{03}$, $244_{10}$, and $244_{13}$ at the level of the conductor $440_5$ might have programmable threshold voltages, while the pre-configured select gates 316 corresponding to the channel material structures $244_{01}$, $244_{02}$, $244_{11}$, and $244_{12}$ at the level of the conductor $440_5$ might have non-programmable threshold voltages under normal operating conditions.

As can be seen in FIG. 6C, the conductor $440_4$, e.g., the select line $314_{01}$, might sufficiently (e.g., fully) surround the channel material structures $244_{00}$, $244_{01}$, $244_{02}$, and $244_{03}$ of the cluster of strings of series-connected memory cells $340_0$ and might sufficiently (e.g., fully) surround the channel material structures $244_{10}$, $244_{11}$, $244_{12}$, and $244_{13}$ of the cluster of strings of series-connected memory cells $340_1$. As such, the select gates 312 corresponding to the channel material structures $244_{00}$, $244_{01}$, $244_{02}$, $244_{03}$, $244_{10}$, $244_{11}$, $244_{12}$, and $244_{13}$ at the level of the conductor $440_4$ might have programmable threshold voltages under normal operating conditions. The structure of FIG. 6C might further represent the structure for other levels, such as other select lines 314, access lines 202, and select lines 322.

Programming of the pre-configured select gates 316 might proceed by applying an enable voltage to the corresponding data lines 204 (not shown in FIG. 5), applying pass voltages to any transistors between the pre-configured select gates 316 and the data line 204 to activate those transistors, and applying programming voltage levels to the associated select lines 318. In the example of FIG. 5, programmable pre-configured select gates 316 associated with the select lines $318_{00}$ and $318_{01}$ might be programmed concurrently, or they might be programmed sequentially by programming programmable pre-configured select gates 316 associated with one select line 318 and then programming programmable pre-configured select gates 316 associated with the other select line 318. The programming might involve an iterative programming operation, e.g., applying increasingly higher programming voltages to a select line 318 followed by a verification to determine if the select gates 316 have a desired threshold voltage. Alternatively, given that each select gate 316 associated with a single select line 318 need only have a threshold voltage lower than some particular voltage level or a threshold voltage higher than the particular voltage level, the iterative process might be avoided by selecting a sufficiently high programming voltage such that each programmable pre-configured select gate 316 receiving that programming voltage at its control gate during its programming operation would be expected to have a resulting threshold voltage higher than the particular voltage level, e.g., the second threshold voltage.

It is noted that the method of providing pre-configured select gates 316 having one of two threshold voltages described with reference to FIGS. 5 and 6A-6C is not the only way to provide pre-configured select gates 316 having one of two threshold voltages. For example, the threshold voltages could be altered during fabrication by controlled implantation of impurities in the channel regions of different pre-configured select gates 316 to provide the same binary permutations. Such a process is described in U.S. Provisional Patent Application No. 63/238,892 filed Aug. 31, 2021 and U.S. patent application Ser. No. 17/889,471.

Following programming of the pre-configured select gates 316, the select gates 312 might be programmed. Selective programming of the select gates 312 might be facilitated by the pre-configured select gates 316. For example, the pre-configured select gates 316 corresponding to channel material structure 244 of a deck of memory cells 330 might have a respective binary permutation of two (e.g., high and low) threshold voltages. For example, assigning the low and high threshold voltages as corresponding to binary values 1 and 0, respectively, a set of pre-configured select gates 316 associated with select lines $318_{00}$ and $318_{01}$ might have one of four different binary permutations, e.g., 11 (e.g., low-low), 10 (e.g., low-high), 01 (e.g., high-low), and 00 (e.g., high-high). In the example of FIG. 5, the pre-configured select gates 316 associated with the select lines $318_{01}$ and $318_{00}$ and corresponding to the channel material structure $244_{00}$ have low (e.g., negative) and high (e.g., positive) threshold voltages, respectively; the pre-configured select gates 316 associated with the select lines $318_{01}$ and $318_{00}$ and corresponding to the channel material structure $244_{01}$ both have low (e.g., negative) threshold voltages; the pre-configured select gates 316 associated with the select lines $318_{01}$ and $318_{00}$ and corresponding to the channel material structure $244_{02}$ have high (e.g., positive) and low (e.g., negative) threshold voltages, respectively; the pre-configured select gates 316 associated with the select lines $318_{01}$ and $318_{00}$ and corresponding to the channel material structure $244_{03}$ both have high (e.g., positive) threshold voltages; the pre-configured select gates 316 associated with the select lines $318_{01}$ and $318_{00}$ and corresponding to the channel material structure $244_{10}$ both have high (e.g., positive) threshold voltages; the pre-configured select gates 316 associated with the select lines $318_{01}$ and $318_{00}$ and corresponding to the channel material structure $244_{11}$ have high (e.g., positive) and low (e.g., negative) threshold voltages, respectively; the pre-configured select gates 316 associated with the select lines $318_{01}$ and $318_{00}$ and corresponding to the channel material structure $244_{12}$ both have low (e.g., negative) threshold voltages; and the pre-configured select gates 316 associated with the select lines $318_{01}$ and $318_{00}$ and corresponding to the channel material structure $244_{13}$ have low (e.g., negative) and high (e.g., positive) threshold voltages, respectively.

The binary permutations of two threshold voltages of the pre-configured select gates 316 corresponding to the channel material structures 244 of a deck of memory cells 330 are mutually exclusive, e.g., the binary permutation of two threshold voltages for one channel material structure 244 of the deck of memory cells $330_0$ in FIG. 5 is different than the binary permutation of two threshold voltages for each remaining channel material structure 244 of the deck of memory cells $330_0$ in FIG. 5.

Note that determining a binary permutation of two threshold voltages, as used herein, looks to each transistor individually as to its possible threshold voltages when assigning a binary value to that transistor. Consider the example where the binary value 0 is assigned to the higher of two possible threshold voltages for a transistor, and the binary value 1 is assigned to the lower of two possible threshold voltages for that transistor. If a pre-configured select gate 316 associated with the select line $318_{00}$ could be assigned a first threshold voltage or a second threshold voltage higher than the first threshold voltage, and a pre-configured select gate 316 associated with the select line $318_{01}$ could be assigned a third threshold voltage or a fourth threshold voltage higher than the third threshold voltage, the pre-configured select gate 316 associated with the select line $318_{00}$ would be assigned the binary value 1 if it was assigned the first threshold voltage and would be assigned the binary value 0 if it was assigned the second threshold voltage, and the pre-configured select gate 316 associated with the select line $318_{01}$ would be assigned the binary value 1 if it was assigned the third threshold voltage and would be assigned the binary value 0 if it was assigned the fourth threshold voltage, regardless of whether the first threshold voltage and the third threshold voltage were equal, and regardless of whether the second threshold voltage and the fourth threshold voltage were equal. Thus, for a set of transistors, the threshold voltage for each transistor relative to its two possible states (e.g., low or high for that transistor) is controlling in determining the binary permutation of two threshold voltages for that set of transistors, regardless of the actual values of the possible threshold voltages for each of the transistors.

To program the select gates 312 associated with the select line $314_{00}$ and corresponding to the channel material structures $244_{01}$, $244_{02}$, $244_{11}$, and $244_{12}$, an enable voltage might be applied to the corresponding data lines 204 (not shown in FIG. 5), and pass voltages might be applied to any transistors between the pre-configured select gates 316 and the data lines 204, and any transistors between the select gates 312 associated with the select line $314_{00}$ and the pre-configured select gates 316, to activate those transistors. A set of control signals (e.g., voltage levels) might be applied to the select lines 318 to connect the selected select gates 312, associated with the select line $314_{00}$ and corresponding to the channel material structures $244_{01}$, $244_{02}$, $244_{11}$, and $244_{12}$, to their respective data line 204, and to isolate the unselected select gates 312, associated with the select line $314_{00}$ and corresponding to the channel material structures $244_{00}$, $244_{03}$, $244_{10}$, and $244_{13}$, from their respective data line 204. For example, a logic high signal could be applied to the select line $318_{01}$ to activate each of the pre-configured select gates 316 associated with the select line $318_{01}$, and a logic low signal could be applied to the select line $318_{00}$ to activate each of the pre-configured select gates 316 associated with the select line $318_{00}$ and having the first (low) threshold voltage and to deactivate each of the pre-configured select gates 316 associated with the select line $318_{00}$ and having the second (high) threshold voltage. A programming voltage might then be applied to the select line $314_{00}$ configured to increase the threshold voltages of the selected select gates 312. As with the pre-configured select gates 316, the programming of the select gates 312 might utilize an iterative process, or might utilize a single programming voltage.

To program the select gates 312 associated with the select line $314_{01}$ and corresponding to the channel material structures $244_{00}$, $244_{01}$, $244_{12}$, and $244_{13}$, an enable voltage might be applied to the corresponding data lines 204 (not shown in FIG. 5), and pass voltages might be applied to any transistors between the pre-configured select gates 316 and the data lines 204, and any transistors between the select gates 312 associated with the select line $314_{01}$ and the pre-configured select gates 316, to activate those transistors. A set of control signals (e.g., voltage levels) might be applied to the select lines 318 to connect the selected select gates 312, associated with the select line $314_{01}$ and corresponding to the channel material structures $244_{00}$, $244_{01}$, $244_{12}$, and $244_{13}$, to their respective data line 204, and to isolate the unselected select gates 312, associated with the select line $314_{01}$ and corresponding to the channel material structures $244_{02}$, $244_{03}$, $244_{10}$, and $244_{11}$, from their respective data line 204. For example, a logic low signal could be applied to the select line $318_{01}$ to activate each of the pre-configured select gates 316 associated with the select line $318_{01}$ and having the first (low) threshold voltage and to deactivate each of the pre-configured select gates 316 associated with the select line $318_{01}$ and having the second (high) threshold voltage, and a logic high signal could be applied to the select line $318_{00}$ to activate each of the pre-configured select gates 316 associated with the select line $318_{00}$, and a logic low signal. A programming voltage might then be applied to the select line $314_{01}$ configured to increase the threshold voltages of the selected select gates 312.

In general, the select gates 312 might be programmed to have a respective binary permutation of two (e.g., high and low) threshold voltages that is a complement of the respective binary permutation of two (e.g., high and low) threshold voltages for the corresponding pre-configured select gates 316 sharing the same channel material structure 244. That is, each select line 314 might correspond to a respective select line 318, and its associated select gates 312 might be programmed to have threshold voltages that are the complement of the binary permutation of two threshold voltages of the pre-configured select gates 316 associated with its respective select line 318. For example, the select line $314_{01}$ might correspond to the select line $318_{01}$, whose associated select gates 316 have the binary permutation of low, low, high, high, high, high, low, and low for the channel material structures $244_{00}$ to $244_{13}$, respectively, such that the select gates 312 associated with the select line $314_{01}$ might be programmed to have the binary permutation of high, high, low, low, low, low, high, and high for the channel material structures $244_{00}$ to $244_{13}$, respectively. In this manner, through appropriate selection of control signals, each segment of series-connected memory cells 306 of a given deck of memory cells 330 might be individually connected to its corresponding conductive element 324 while isolating each remaining segment of series-connected memory cells 306 of that deck of memory cells 330 from its corresponding conductive element 324. For example, by applying a combination of logic levels of low, high, high, and low to the select lines $314_{00}$, $314_{01}$, $318_{00}$, and $318_{01}$, respectively, a segment of series-connected memory cells 306 corresponding to the deck of memory cells $330_0$ and the channel material structure $244_{00}$ of FIG. 5 could be connected to its corresponding conductive element $324_{00}$, while segments of series-connected memory cells 306 corresponding to the remaining channel material structures 244 of the deck of memory cells $330_0$ of FIG. 5 could be isolated from their corresponding conductive element $324_{00}$. Conversely, all of the segments of series-connected memory cells 306 of a given deck of memory cells 330 might be commonly connected to their corresponding conductive element 324, e.g., by applying a logic high signal to each of the select lines $314_{00}$, $314_{01}$, $318_{00}$, and $318oi$.

Figure 7:
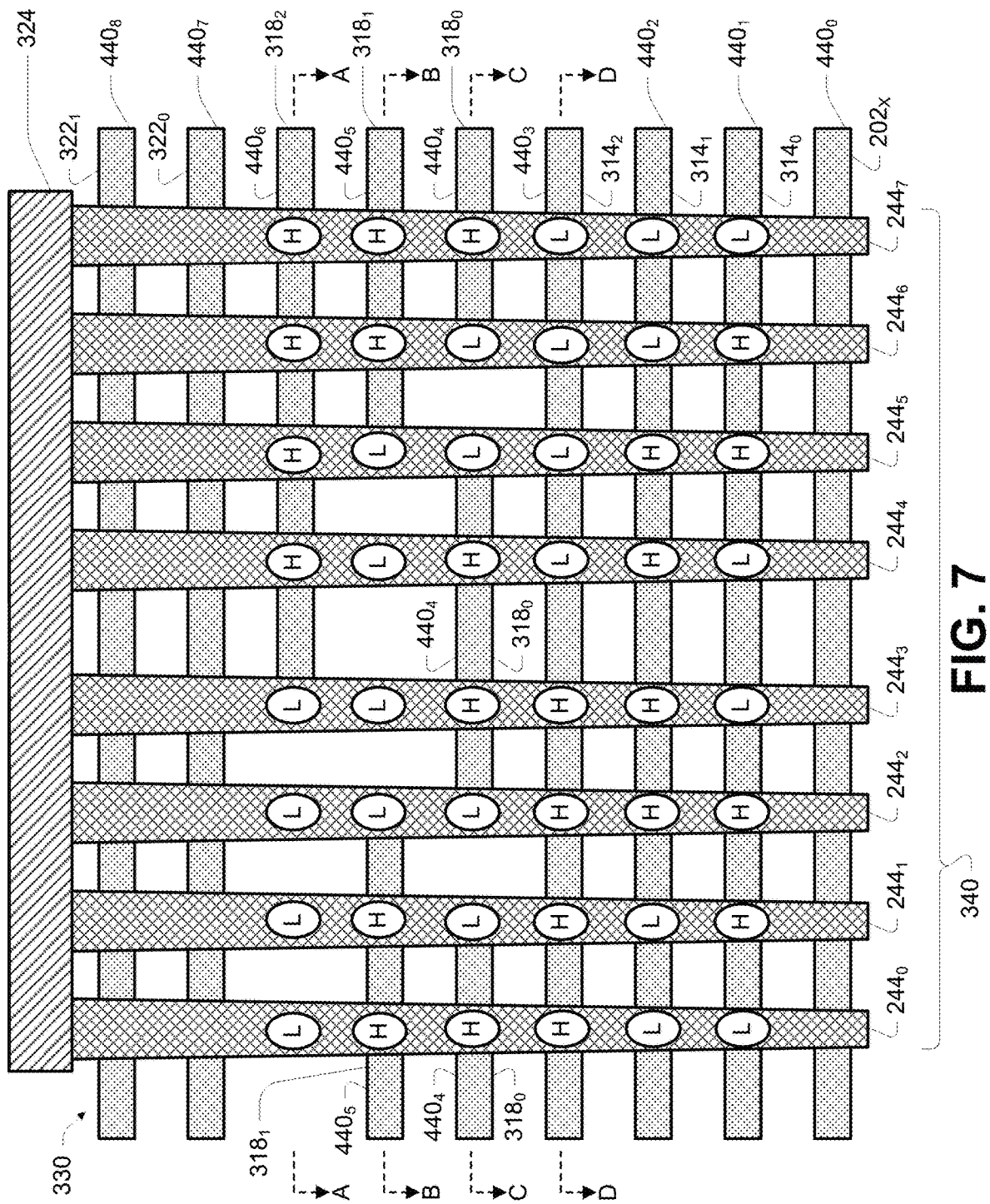
FIG. 7 depicts a conceptualized representation of a cross-sectional view of a portion of an array structure in accordance with a further embodiment.

FIG. 7 depicts a conceptualized representation of a cross-sectional view of a portion of an array structure in accordance with another embodiment. Like numbered elements in FIG. 5 correspond to the description as provided with respect to FIG. 4. For example, the structure of FIG. 7 might correspond to a portion of a deck of memory cells 330 having a cluster of strings of series-connected memory cells 340 having eight NAND strings 206 per deck of memory cells 330. The conductor $440_8$ of FIG. 7 might correspond to a select line $322_1$ associated with optional select gates 320, the conductor $440_7$ of FIG. 7 might correspond to select line $322_0$ associated with optional select gates 320, the conductor $440_6$ of FIG. 7 might correspond to a select line $318_2$ associated with pre-configured select gates 316, the conductor $440_5$ of FIG. 7 might correspond to a select line $318_1$ associated with pre-configured select gates 316, the conductor $440_4$ of FIG. 7 might correspond to a select line $318_0$ associated with pre-configured select gates 316, the conductor $440_3$ of FIG. 7 might correspond to a select line $314_2$ associated with select gates 312, the conductor $440_2$ of FIG. 7 might correspond to a select line $314_1$ associated with select gates 312, the conductor $440_1$ of FIG. 7 might correspond to a select line $314_0$ associated with select gates 312, and the conductor $440_0$ of FIG. 7 might correspond to an access line $202_X$.

The pre-configured select gates 316 associated with the select line $318_2$ and corresponding to the channel material structures $244_0$, $244_1$, $244_2$, and $244_3$ might be fabricated to have the first (low) threshold voltage, e.g., indicated by the "L" designation in FIG. 7, and might remain at the first threshold voltage following programming of other pre-configured select gates 316 associated with the select line $318_2$. The pre-configured select gates 316 associated with the select line $318_2$ and corresponding to the channel material structures $244_4$, $244_5$, $244_6$, and $244_7$ might be fabricated to have the first (low) threshold voltage and might be subsequently programmed to have the second (high) threshold voltage, e.g., indicated by the "H" designation in FIG. 7.

The pre-configured select gates 316 associated with the select line $318_1$ and corresponding to the channel material structures $244_2$, $244_3$, $244_4$, and $244_5$ might be fabricated to have the first (low) threshold voltage, e.g., indicated by the "L" designation in FIG. 7, and might remain at the first threshold voltage following programming of other pre-configured select gates 316 associated with the select line $318_1$. The pre-configured select gates 316 associated with the select line $318_1$ and corresponding to the channel material structures $244_0$, $244_1$, $244_6$, and $244_7$ might be fabricated to have the first (low) threshold voltage and might be subsequently programmed to have the second (high) threshold voltage, e.g., indicated by the "H" designation in FIG. 7.

The pre-configured select gates 316 associated with the select line $318_0$ and corresponding to the channel material structures $244_1$, $244_2$, $244_5$, and $244_6$ might be fabricated to have the first (low) threshold voltage, e.g., indicated by the "L" designation in FIG. 7, and might remain at the first threshold voltage following programming of other pre-configured select gates 316 associated with the select line $318_0$. The pre-configured select gates 316 associated with the select line $318_1$ and corresponding to the channel material structures $244_0$, $244_3$, $244_4$, and $244_7$ might be fabricated to have the first (low) threshold voltage and might be subsequently programmed to have the second (high) threshold voltage, e.g., indicated by the "H" designation in FIG. 7.

Figure 8A:
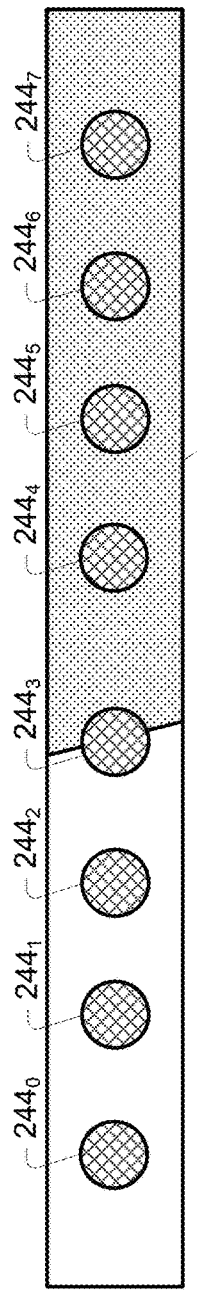
FIGS. 8A-8D depict representations of top views of sections of the array structure depicted in FIG. 7.
Figure 8B:
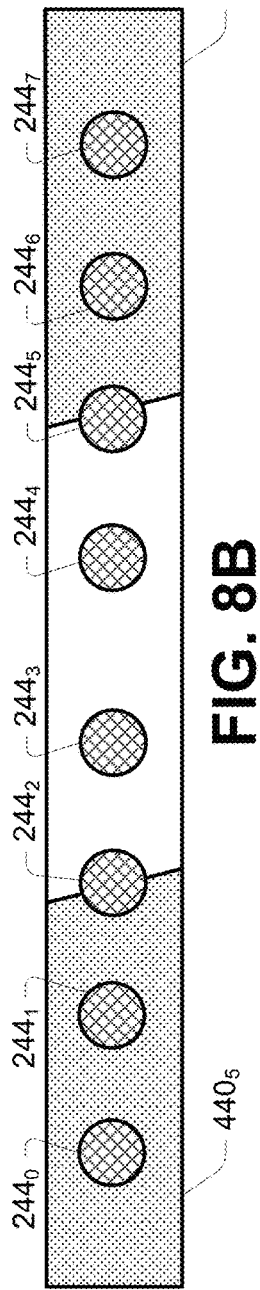
Figure 8C:
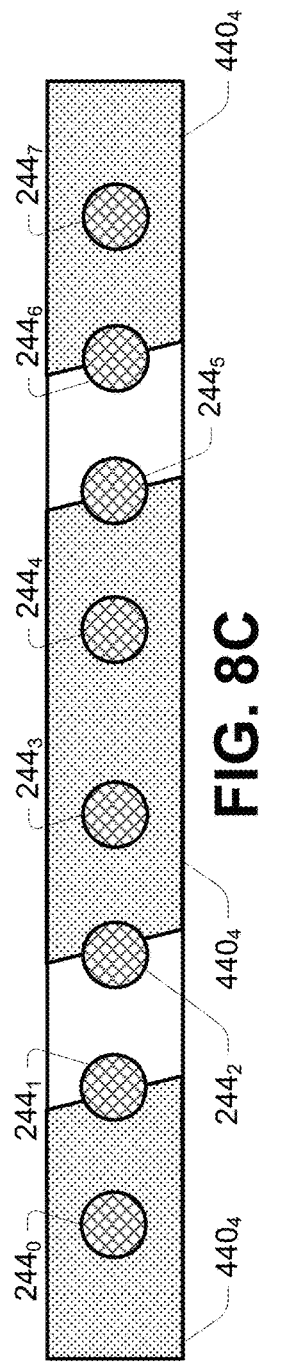
Figure 8D:
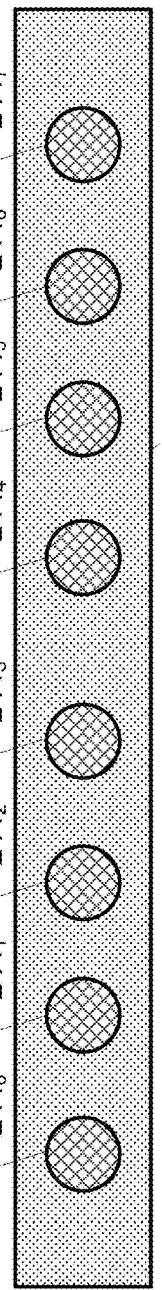

FIGS. 8A-8D depict representations of top views of sections of the array structure depicted in FIG. 7. FIG. 8A is taken at the line A-A of FIG. 7, FIG. 8B is taken at the line B-B of FIG. 7, FIG. 8C is taken at the line C-C of FIG. 7, and FIG. 8D is taken at the line D-D of FIG. 7.

As can be seen in FIG. 8A, the conductor $440_6$, e.g., the select line $318_2$, might sufficiently (e.g., fully) surround the channel material structures $244_4$, $244_5$, $244_6$, and $244_7$. However, the conductor $440_6$ might not sufficiently surround the channel material structure $244_3$. Similarly, the conductor $440_6$ might not make any connection to the channel material structures $244_0$, $244_1$, or $244_2$. As such, the pre-configured select gates 316 corresponding to the channel material structures $244_4$, $244_5$, $244_6$, and $244_7$ at the level of the conductor $440_6$ might have programmable threshold voltages, while the pre-configured select gates 316 corresponding to the channel material structures $244_0$, $244_1$, $244_2$, and $244_3$ at the level of the conductor $440_6$ might have non-programmable threshold voltages under normal operating conditions.

As can be seen in FIG. 8B, the conductor $440_5$, e.g., the select line $318_1$, might sufficiently (e.g., fully) surround the channel material structures $244_0$, $244_1$, $244_6$, and $244_7$. However, the conductor $440_5$ might not sufficiently surround the channel material structures $244_2$ and $244_5$, and the conductor $440_5$ might not make any connection to the channel material structures $244_3$ or $244_4$. As such, the pre-configured select gates 316 corresponding to the channel material structures $244_0$, $244_1$, $244_6$, and $244_7$ at the level of the conductor $440_5$ might have programmable threshold voltages, while the pre-configured select gates 316 corresponding to the channel material structures $244_2$, $244_3$, $244_4$, and $244_5$ at the level of the conductor $440_5$ might have non-programmable threshold voltages under normal operating conditions.

As can be seen in FIG. 8C, the conductor $440_4$, e.g., the select line $318_0$, might sufficiently (e.g., fully) surround the channel material structures $244_0$, $244_3$, $244_4$, and $244_7$. However, the conductor $440_4$ might not sufficiently surround the channel material structures $244_1$, $244_2$, $244_5$, or $244_6$. As such, the pre-configured select gates 316 corresponding to the channel material structures $244_0$, $244_3$, $244_4$, and $244_7$ at the level of the conductor $440_4$ might have programmable threshold voltages, while the pre-configured select gates 316 corresponding to the channel material structures $244_1$, $244_2$, $244_5$, and $244_6$ at the level of the conductor $440_4$ might have non-programmable threshold voltages under normal operating conditions.

As can be seen in FIG. 8D, the conductor $440_3$, e.g., the select line $314_2$, might sufficiently (e.g., fully) surround the channel material structures $244_0$, $244_1$, $244_2$, $244_3$, $244_4$, $244_5$, $244_6$, and $244_7$. As such, the select gates 312 corresponding to the channel material structures $244_0$, $244_1$, $244_2$, $244_3$, $244_4$, $244_5$, $244_6$, and $244_7$ at the level of the conductor $440_3$ might have programmable threshold voltages under normal operating conditions. The structure of FIG. 8D might further represent the structure for other levels, such as other select lines 314, access lines 202, and select lines 322.

Programming of the pre-configured select gates 316 might proceed by applying an enable voltage to the data line 204 (not shown in FIG. 7), applying pass voltages to any transistors between the pre-configured select gates 316 and the data line 204 to activate those transistors, and applying programming voltage levels to the associated select lines 318. In the example of FIG. 7, programmable pre-configured select gates 316 associated with the select lines $318_0$, $318_1$, and $318_2$ might be programmed concurrently, or they might be programmed sequentially such as described with reference to FIG. 5. Following programming of the pre-configured select gates 316, the pre-configured select gates 316 corresponding to each channel material structure 244 of the deck of memory cells 330 might have a respective binary permutation of two (e.g., high and low) threshold voltages. For example, assigning the low and high threshold voltages as corresponding to binary values 1 and 0, respectively, a set of pre-configured select gates 316 associated with select lines $318_0$, $318_1$, and $318_2$ and a single channel material structure 244 might have one of eight different binary permutations, e.g., 111, 110, 101, 100, 011, 010, 001 and 000.

In the example of FIG. 7, the pre-configured select gates 316 associated with the select lines $318_0$, $318_1$, and $318_2$ and corresponding to the channel material structure $244_0$ have high (e.g., positive), high, and low (e.g., negative) threshold voltages, respectively; the pre-configured select gates 316 associated with the select lines $318_0$, $318_1$, and $318_2$ and corresponding to the channel material structure $244_1$ have low, high, and high threshold voltages, respectively; the pre-configured select gates 316 associated with the select lines $318_0$, $318_1$, and $318_2$ and corresponding to the channel material structure $244_2$ each have low threshold voltages; the pre-configured select gates 316 associated with the select lines $318_0$, $318_1$, and $318_2$ and corresponding to the channel material structure $244_3$ have high, low, and low threshold voltages, respectively; the pre-configured select gates 316 associated with the select lines $318_0$, $318_1$, and $318_2$ and corresponding to the channel material structure $244_4$ have high, low, and high threshold voltages, respectively; the pre-configured select gates 316 associated with the select lines $318_0$, $318_1$, and $318_2$ and corresponding to the channel material structure $244_5$ have low, low, and high threshold voltages, respectively; the pre-configured select gates 316 associated with the select lines $318_0$, $318_1$, and $318_2$ and corresponding to the channel material structure $244_6$ have low, high, and high threshold voltages, respectively; and the pre-configured select gates 316 associated with the select lines $318_0$, $318_1$, and $318_2$ and corresponding to the channel material structure $244_7$ each have high threshold voltages.

The binary permutations of two threshold voltages of the pre-configured select gates 316 corresponding to the channel material structures 244 of a deck of memory cells 330 are mutually exclusive, e.g., the binary permutation of two threshold voltages for one channel material structure 244 of the deck of memory cells $330_0$ in FIG. 7 is different than the binary permutation of two threshold voltages for each remaining channel material structure 244 of the deck of memory cells $330_0$ in FIG. 7.

Programming of the select gates 312 associated with the select lines $314_0$, $314_1$, and $314_2$ might proceed similar to that discussed with reference to FIG. 5. In particular, the select gates 312 associated with the select line $314_0$ and corresponding to the channel material structures $244_1$, $244_2$, $244_5$, and $244_6$ could be selected for programming by applying control signals to the select lines $318_0$, $318_1$, and $318_2$ of low, high, and high logic levels, respectively, and activating each remaining intervening transistor between the select line $314_0$ and the data line 204. The select gates 312 associated with the select line $314_1$ and corresponding to the channel material structures $244_2$, $244_3$, $244_4$, and $244_5$ could be selected for programming by applying control signals to the select lines $318_0$, $318_1$, and $318_2$ of high, low, and high logic levels, respectively, and activating each remaining intervening transistor between the select line $314_1$ and the data line 204. The select gates 312 associated with the select line $314_2$ and corresponding to the channel material structures $244_0$, $244_1$, $244_2$, and $244_3$ could be selected for programming by applying control signals to the select lines $318_0$, $318_1$, and $318_2$ of high, high, and low logic levels, respectively, and activating each remaining intervening transistor between the select line $314_2$ and the data line 204.

In general, the select gates 312 might be programmed to have a respective binary permutation of two (e.g., high and low) threshold voltages that is a complement of the respective binary permutation of two (e.g., high and low) threshold voltages for the corresponding pre-configured select gates 316 sharing the same channel material structure 244. In this manner, through appropriate selection of control signals, each segment of series-connected memory cells 306 of a given deck of memory cells 330 might be individually connected to its corresponding conductive element 324 while isolating each remaining segment of series-connected memory cells 306 of that deck of memory cells 330 from its corresponding conductive element 324. For example, by applying a combination of logic levels of low, low, high, high, high, and low to the select lines $314_0$, $314_1$, $314_2$, $318_0$, $318_1$, and $318_2$, respectively, a segment of series-connected memory cells 306 corresponding to the deck of memory cells 330 and the channel material structure $244_0$ of FIG. 7 could be connected to its corresponding conductive element 324, while segments of series-connected memory cells 306 corresponding to the remaining channel material structures 244 of the deck of memory cells 330 of FIG. 7 could be isolated from their corresponding conductive element 324. Conversely, all of the segments of series-connected memory cells 306 of the deck of memory cells 330 might be commonly connected to their corresponding conductive element 324, e.g., by applying a logic high signal to each of the select lines $314_0$, $314_1$, $314_2$, $318_0$, $318_1$, and $318_2$.

Figure 9:
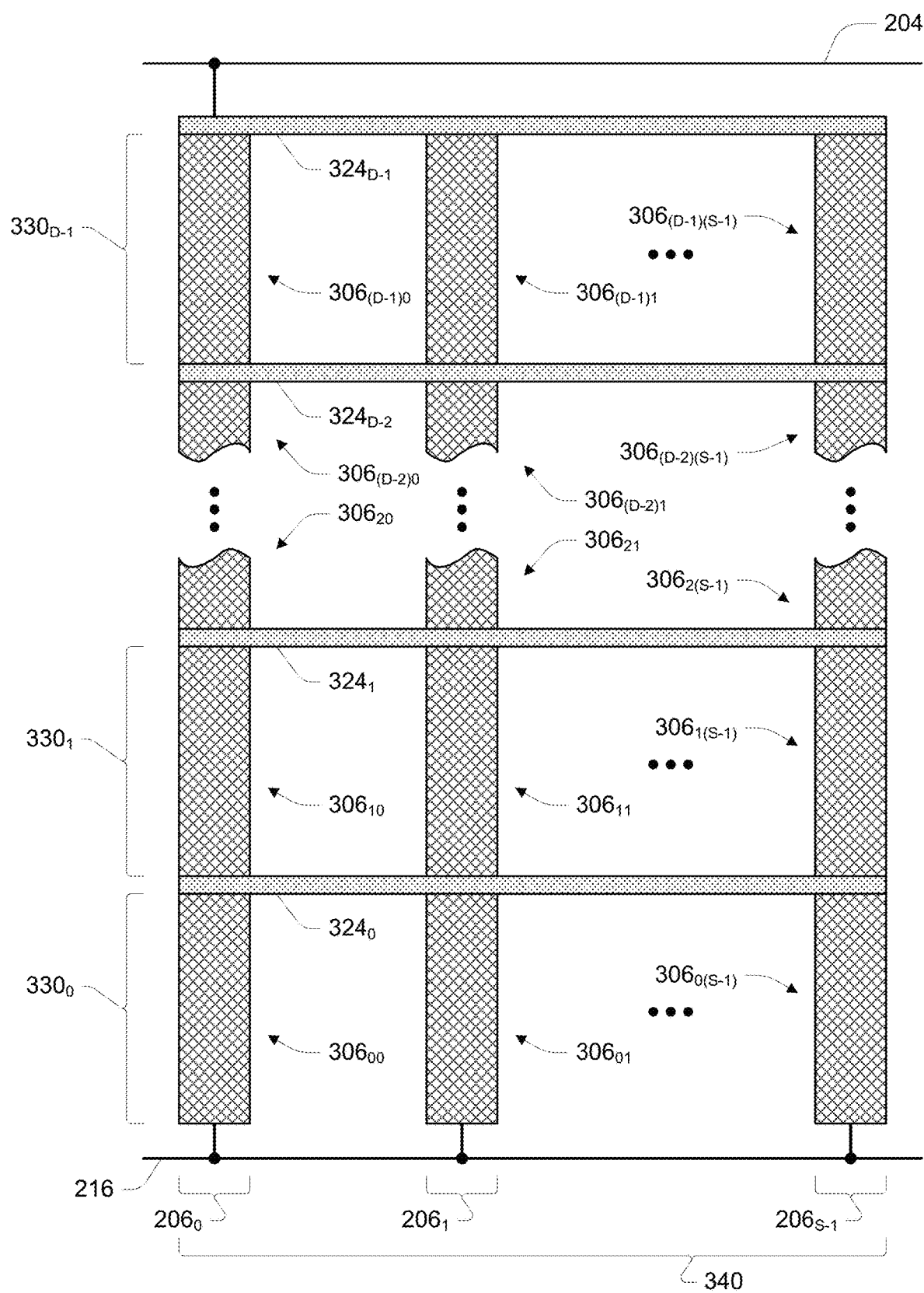
FIG. 9 depicts a conceptualized representation of a cross-sectional view of a portion of an array structure in accordance with an embodiment.

FIG. 9 depicts a conceptualized representation of a cross-sectional view of a portion of an array structure in accordance with an embodiment. The embodiment of FIG. 9 depicts a generalized representation of embodiments described herein. FIG. 9 depicts D decks of memory cells 330, e.g., decks of memory cells $330_0$ to $330_{D-1}$, where D is any integer value greater than or equal to two. Each deck of memory cells 330 might have a corresponding one of D conductive elements 324. For example, the deck of memory cells $330_0$ might have a corresponding conductive element $324_0$, the deck of memory cells $330_1$ might have a corresponding conductive element $324_1$, and so on. Each deck of memory cells 330 might further have its channel material structure 244 connected to the corresponding conductive element 324 of an adjacent deck of memory cells 330. For example, the deck of memory cells $330_1$ might have its channel material structure 244 connected to its corresponding conductive element $324_1$, and connected to the corresponding conductive element $324_0$ of the deck of memory cells $330_0$.

FIG. 9 further depicts the cluster of strings of series-connected memory cells 340 to have S strings of series-connected memory cells, e.g., NAND strings $206_0$ to $206_{S-1}$, where S is any integer value greater than or equal to two. Each deck of memory cells 330 thus might have S segments of series-connected memory cells 306. For example, the deck of memory cells $330_0$ might have segments of series-connected memory cells $306_{00}$ to $306_{0(S-1)}$, the deck of memory cells $330_1$ might have segments of series-connected memory cells $306_{10}$ to $306_{1(S-1)}$, and so on. Similarly, the NAND string $206_0$ might include the segments of series-connected memory cells $306_{00}$ to $306_{(D-1)0}$, the NAND string $206_0$ might include the segments of series-connected memory cells $306_{00}$ to $306_{(D-1)0}$, the NAND string 2061 might include the segments of series-connected memory cells $306_{01}$ to $306_{(D-1)1}$, and so on. The conductive elements 324, and the selective connection of the segments of series-connected memory cells 306 to their corresponding conductive element 324 facilitates parallel current flow through one or more of the decks of memory cells 330 during a sensing (e.g., read or verify) operation. This might facilitate increased current flow during the sensing operation, which might permit the use of larger numbers of memory cells in a string of series-connected memory cells.

Figure 10:
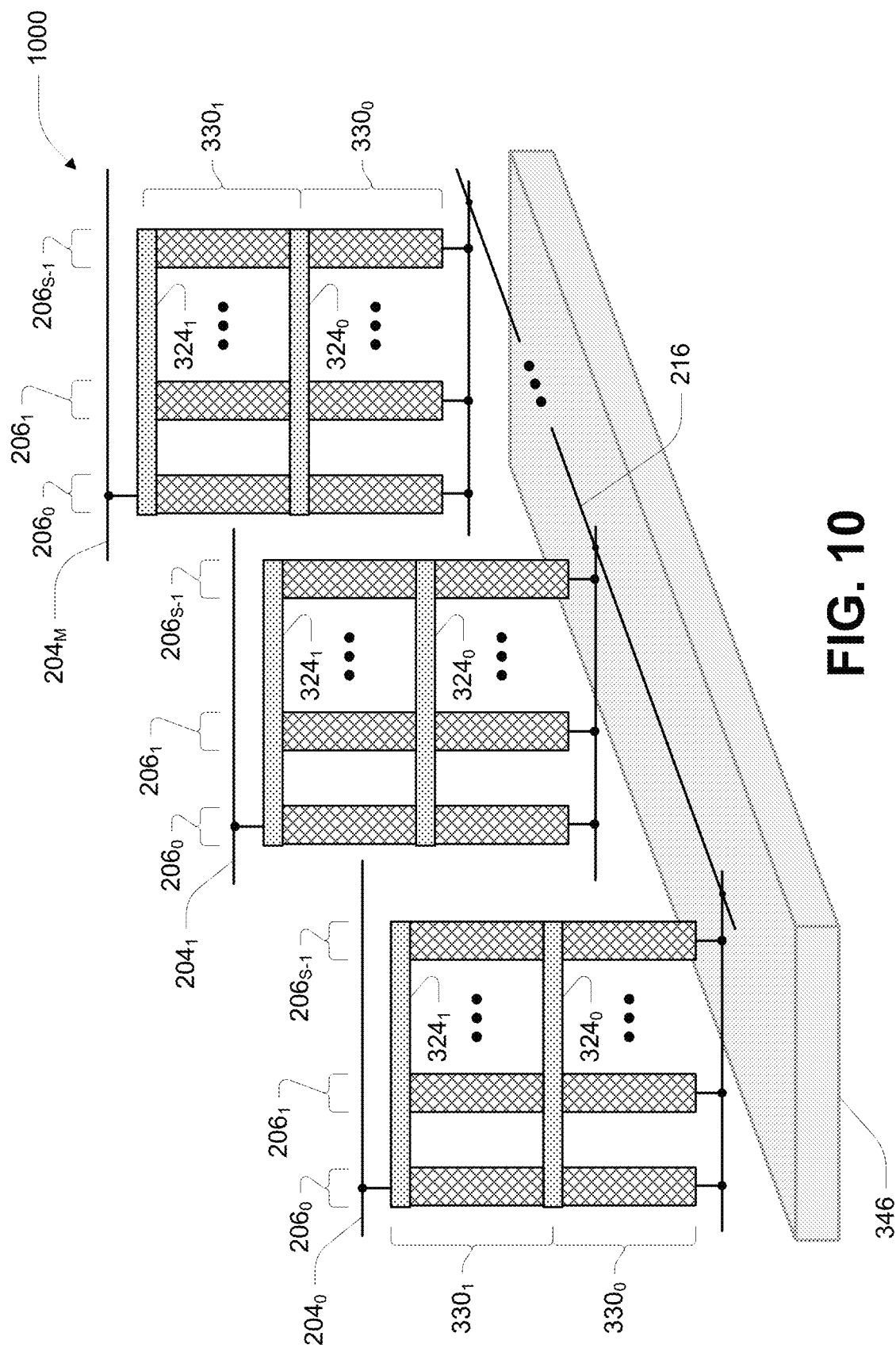
FIG. 10 depicts a conceptualized three-dimensional view of a portion of an array structure in accordance with an embodiment.

FIG. 10 depicts a conceptualized three-dimensional view of a portion of an array structure in accordance with an embodiment as could be used in a memory of the type described with reference to FIG. 1, e.g., as a portion of array of memory cells 104. Like numbered elements in FIG. 10 correspond to the description as provided with respect to FIG. 3A. FIG. 10 provides additional detail of one example of a three-dimensional NAND array structure. The three-dimensional NAND array of memory cells 1000 might be formed over peripheral circuitry 346. The peripheral circuitry 346 might represent a variety of circuitry for accessing the array of memory cells 100. The peripheral circuitry 346 might include complementary circuit elements. For example, the peripheral circuitry 346 might include both n-channel and p-channel transistors formed on a same semiconductor substrate, a process commonly referred to as CMOS, or complementary metal-oxide-semiconductors. Although CMOS often no longer utilizes a strict metal-oxide-semiconductor construction due to advancements in integrated circuit fabrication and design, the CMOS designation remains as a matter of convenience.

FIG. 11 depicts a conceptualized current flow through a single string of series-connected memory cells of the related art. In a typical array structure, a data state of a selected memory cell 208 of a NAND string 206 might be determined by applying pass voltages to control gates of each transistor between a data line 204 and the common source 216 other than the selected memory cell 208. A sense voltage might then be applied to a control gate of the selected memory cell while a voltage difference is established between the data line 204 and the source 216. A resulting current flow, or lack thereof, through the NAND string 206 might then be used to determine whether the selected memory cell 208 was activated in response to the sense voltage, e.g., having a threshold voltage lower than the sense voltage, or deactivated in response to the sense voltage, e.g., having a threshold voltage higher than the sense voltage. This current flow through a single string of series-connected memory cells is depicted in FIG. 11. As longer NAND strings 206 (e.g., more series-connected memory cells) become more common, the resistance of the NAND string 206 may become too high for an effective detection of current flow. Various embodiments seek to mitigate this issue by reducing the effective resistance for a same number of memory cells connected in series. Specifically, various embodiments facilitate parallel current flow through one or more decks of memory cells 330 not containing the memory cell 208 selected for the sensing operation.

FIGS. 12A-12B depict conceptualized current flows through bundled strings of series-connected memory cells in accordance with an embodiment. The embodiment of FIGS. 12A-12B presume two decks of memory cells and a cluster of strings of series-connected memory cells containing four NAND strings. In FIG. 12A, the selected memory cell might be in the NAND string $206_0$ of the deck of memory cells $330_0$. As such, parallel current flow might be enabled for the deck of memory cells $330_1$ by connecting each of its segments of series-connected memory cells to its corresponding conductive element $324_1$. This might include applying a set of control signals to the select lines 314 and select lines 318, and to each remaining select line, control line and/or access line, of the deck of memory cells $330_1$ configured to activate each transistor between the conductive element $324_1$ and the conductive element $324_0$. Parallel current flow might be disabled for the deck of memory cells $330_0$ by isolating each of its segments of series-connected memory cells from its corresponding conductive element $324_0$ other than the segment of series-connected memory cells containing the selected memory cell, as depicted by the arrows in FIG. 12A. This might include applying a set of control signals to the select lines 314 and select lines 318 of the deck of memory cells $330_0$ configured to connect the segment of series-connected memory cells containing the selected memory cell to the conductive element $324_0$, and to isolate each remaining segment of series-connected memory cells of the deck of memory cells $330_0$ from the conductive element $324_0$. Remaining lines, other than the access line connected to the selected memory cell, could receive a pass voltage, and the access line connected to the selected memory cell could receive the sense voltage. The use of parallel current flow effectively reduces the resistance experienced between the data line 204 and the common source 216. Furthermore, the resulting level of current flow between the data line 204 and the common source 216 can still be determined responsive to whether the selected memory cell is activated or deactivated in response to the sense voltage.

In FIG. 12B, the selected memory cell might be in the NAND string $206_0$ of the deck of memory cells $330_1$. As such, parallel current flow might be enabled for the deck of memory cells $330_0$ by connecting each of its segments of series-connected memory cells to its corresponding conductive element $324_0$, and parallel current flow might be disabled for the deck of memory cells $330_1$ by isolating each of its segments of series-connected memory cells from its corresponding conductive element $324_1$ other than the segment of series-connected memory cells containing the selected memory cell, as depicted by the arrows in FIG. 12B, similar to that described with reference to FIG. 12A.

FIGS. 13A-13C depict conceptualized current flows through bundled strings of series-connected memory cells in accordance with another embodiment. The embodiment of FIGS. 13A-13C presumes three decks of memory cells and a cluster of strings of series-connected memory cells containing four NAND strings. In FIG. 13A, the selected memory cell might be in the NAND string $206_0$ of the deck of memory cells $330_0$. As such, parallel current flow might be enabled for the decks of memory cells $330_1$ and $330_2$ by connecting each of their segments of series-connected memory cells to their corresponding conductive elements $324_1$ and $324_2$, respectively. This might include applying a set of control signals to the select lines 314 and select lines 318, and to each remaining select line, control line and/or access line, of the decks of memory cells $330_1$ and $330_2$ configured to activate each transistor between the conductive element $324_1$ and the conductive element $324_2$, and each transistor between the conductive element $324_0$ and the conductive element $324_1$. Parallel current flow might be disabled for the deck of memory cells $330_0$ by isolating each of its segments of series-connected memory cells from its corresponding conductive element $324_0$ other than the segment off series-connected memory cells containing the selected memory cell, as depicted by the arrows in FIG. 13A. This might include applying a set of control signals to the select lines 314 and select lines 318 of the deck of memory cells $330_0$ configured to connect the segment of series-connected memory cells containing the selected memory cell to the conductive element $324_0$, and to isolate each remaining segment of series-connected memory cells of the deck of memory cells $330_0$ from the conductive element $324_0$. Remaining lines, other than the access line connected to the selected memory cell, could receive a pass voltage, and the access line connected to the selected memory cell could receive the sense voltage. The use of parallel current flow effectively reduces the resistance experienced between the data line 204 and the common source 216. Furthermore, the resulting level of current flow between the data line 204 and the common source 216 can still be determined responsive to whether the selected memory cell is activated or deactivated in response to the sense voltage.

In FIG. 13B, the selected memory cell might be in the NAND string $206_0$ of the deck of memory cells $330_1$. As such, parallel current flow might be enabled for the decks of memory cells $330_0$ and $330_2$ by connecting each of their segments of series-connected memory cells to their corresponding conductive elements $324_0$ and $324_2$, respectively, and parallel current flow might be disabled for the deck of memory cells $330_1$ by isolating each of its segments of series-connected memory cells from its corresponding conductive element $324_1$ other than the segment off series-connected memory cells containing the selected memory cell, as depicted by the arrows in FIG. 13B, similar to that described with reference to FIG. 13A.

In FIG. 13C, the selected memory cell might be in the NAND string $206_0$ of the deck of memory cells $330_2$. As such, parallel current flow might be enabled for the decks of memory cells $330_0$ and $330_1$ by connecting their segments of series-connected memory cells to their corresponding conductive elements $324_0$ and $324_1$, respectively, and parallel current flow might be disabled for the deck of memory cells $330_2$ by isolating each of its segments of series-connected memory cells from its corresponding conductive element $324_2$ other than the segment off series-connected memory cells containing the selected memory cell, as depicted by the arrows in FIG. 13C, similar to that described with reference to FIG. 13A.

Although the example of FIGS. 13A-13C provided for parallel current flow in all but one deck of memory cells 330, e.g., all but the deck of memory cells 330 containing the memory cell selected for the sensing operation, fewer decks of memory cells 330 could be configured for parallel current flow while still providing benefit over the related art. For example, with reference to FIG. 13A where the selected memory cell is in the deck of memory cells $330_0$, the deck of memory cells $330_2$ could be configured for parallel current flow, while both the deck of memory cells $330_0$ and the deck of memory cells $330_1$ could be configured for current flow through a single channel material structure 244, or the deck of memory cells $330_1$ could be configured for parallel current flow, while both the deck of memory cells $330_0$ and the deck of memory cells $330_2$ could be configured for current flow through a single channel material structure 244. Similarly, while the examples of FIGS. 12A-12B and FIGS. 13A-13C provided for parallel current flow through all segments of series-connected memory cells 306 of a deck of memory cells 330, fewer segments of series-connected memory cells 306 within a deck of memory cells 330 could be configured for parallel current flow while still providing benefit over the related art. For example, with reference to FIG. 5, by applying a combination of logic levels of high, high, high, and low to the select lines 3 1400, 3 1401, 3 1800, and $318_{01}$, respectively, the segments of series-connected memory cells 306 corresponding to the deck of memory cells $330_0$ and the channel material structures $244_{00}$ and $244_{01}$ of FIG. 5 could be connected to its corresponding conductive element $324_{00}$, while segments of series-connected memory cells 306 corresponding to the remaining channel material structures 244 of the deck of memory cells $330_0$ of FIG. 5 could be isolated from their corresponding conductive element $324_{00}$.

Figure 14:
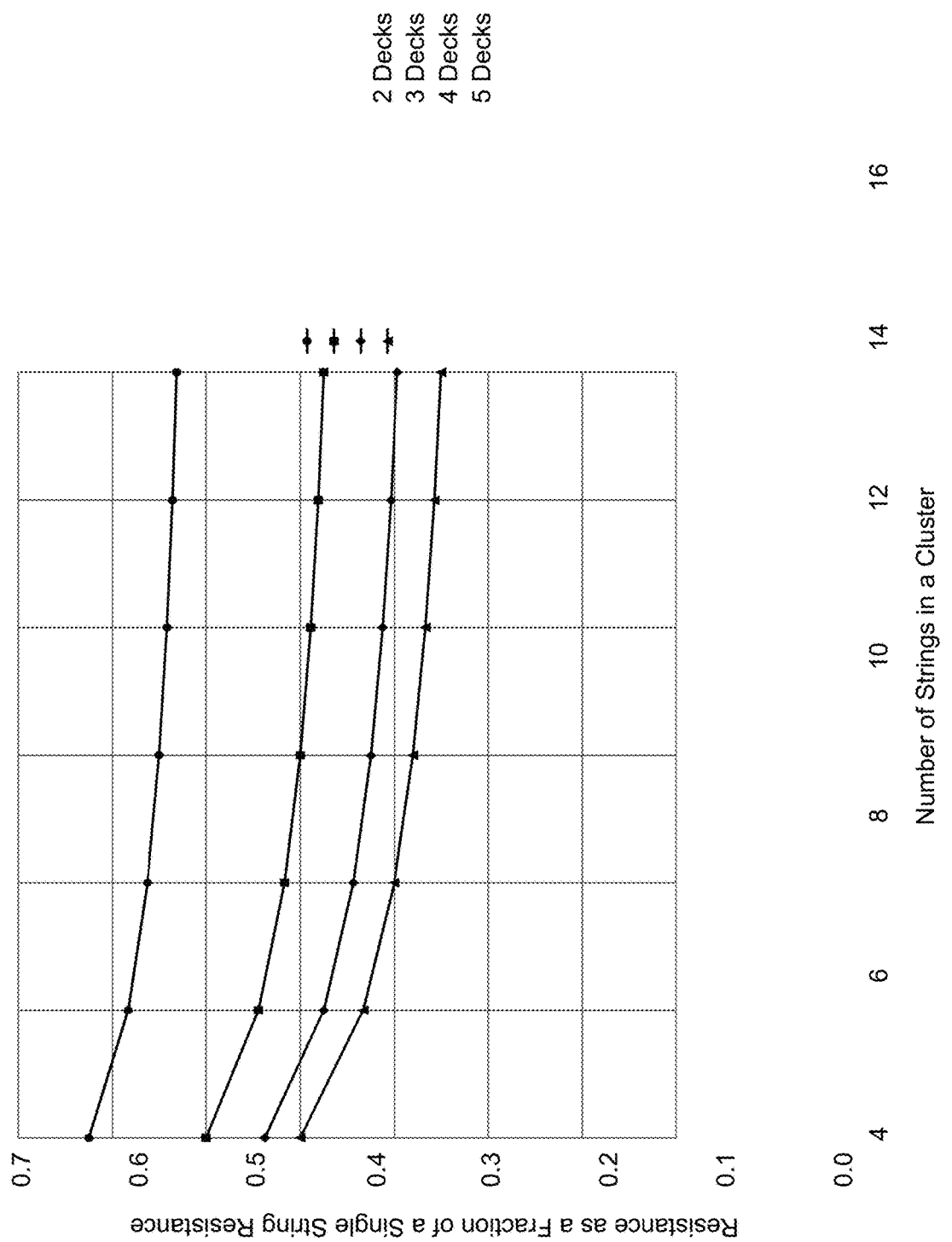
FIG. 14 depicts an expected relationship between resistance and a number of strings in a cluster for several different numbers of decks of memory cells in accordance with an embodiment.

The relative reduction in resistance afforded by various embodiments might be a function of both the number of decks of memory cells for a given NAND string, and the number of NAND strings per cluster of strings of series-connected memory cells. FIG. 14 depicts an expected relationship between resistance and a number of strings in a cluster for several different numbers of decks of memory cells in accordance with an embodiment. As can be seen in FIG. 14, the embodiments depicted in FIGS. 12A-12B might be expected to have resistance values of a little more than 60% of the resistance of the typical configuration depicted in FIG. 11. Stated differently, this might permit the number of memory cells in each NAND string 206 of FIGS. 12A-12B to be increased to around 1.6 times the number of memory cells in the NAND string 206 of FIG. 11 while permitting use of the same sensing devices to detect current flow. Similarly, the embodiments depicted in FIGS. 13A-13C might be expected to have resistance values of about 50% of the resistance of the typical configuration depicted in FIG. 11. Stated differently, this might permit the number of memory cells in each NAND string 206 of FIGS. 13A-13C to be increased to around 2 times the number of memory cells in the NAND string 206 of FIG. 11 while permitting use of the same sensing devices to detect current flow.

Figure 15:
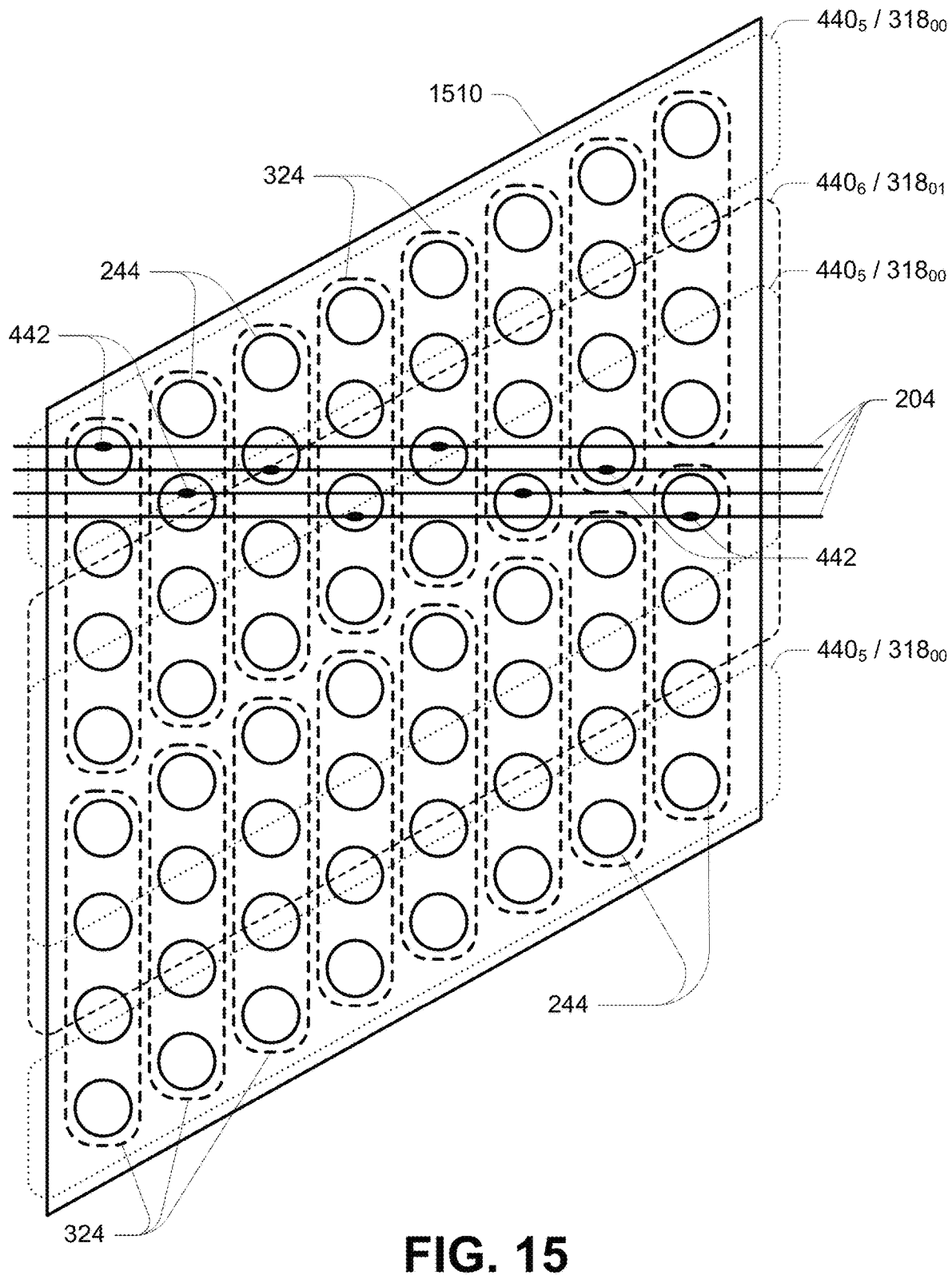
FIG. 15 depicts a conceptualized top view of an array layout in accordance with an embodiment.

FIG. 15 depicts a conceptualized top view of an array layout in accordance with an embodiment. FIG. 15 depicts one possible array layout of clusters of strings of series-connected memory cells containing four NAND strings, regardless of the number of decks of memory cells. FIG. 15 depicts one possible arrangement of four data lines 204. Each data line 204 might be connected to a respective conductive element 324, e.g., a top-most conductive element 324, through a respective contact 442. Additional data lines 204 might be similarly arranged to make contact to other conductive elements 324 of FIG. 15, but such data lines 204 are omitted for clarity. FIG. 15 further depicts a placement of portions of the conductors $440_5$ and $440_6$, e.g., select lines $318_{00}$ and $318_{01}$, respectively, of the example of FIGS. 6A-6B in dashed lines.

FIG. 15 might depict one block of memory cells having a block boundary 1510. While FIG. 15 depicts sixteen clusters of strings of series-connected memory cells, each containing four NAND strings, blocks of memory cells might contain fewer or more clusters of strings of series-connected memory cells, and each cluster might contain fewer or more four strings of series-connected memory cells. During the removal of the instances of sacrificial material and the forming of control gate structures as will be described in subsequent figures, access might be made on the left or right side of the block boundary 1510 of FIG. 15.

Figure 16A:
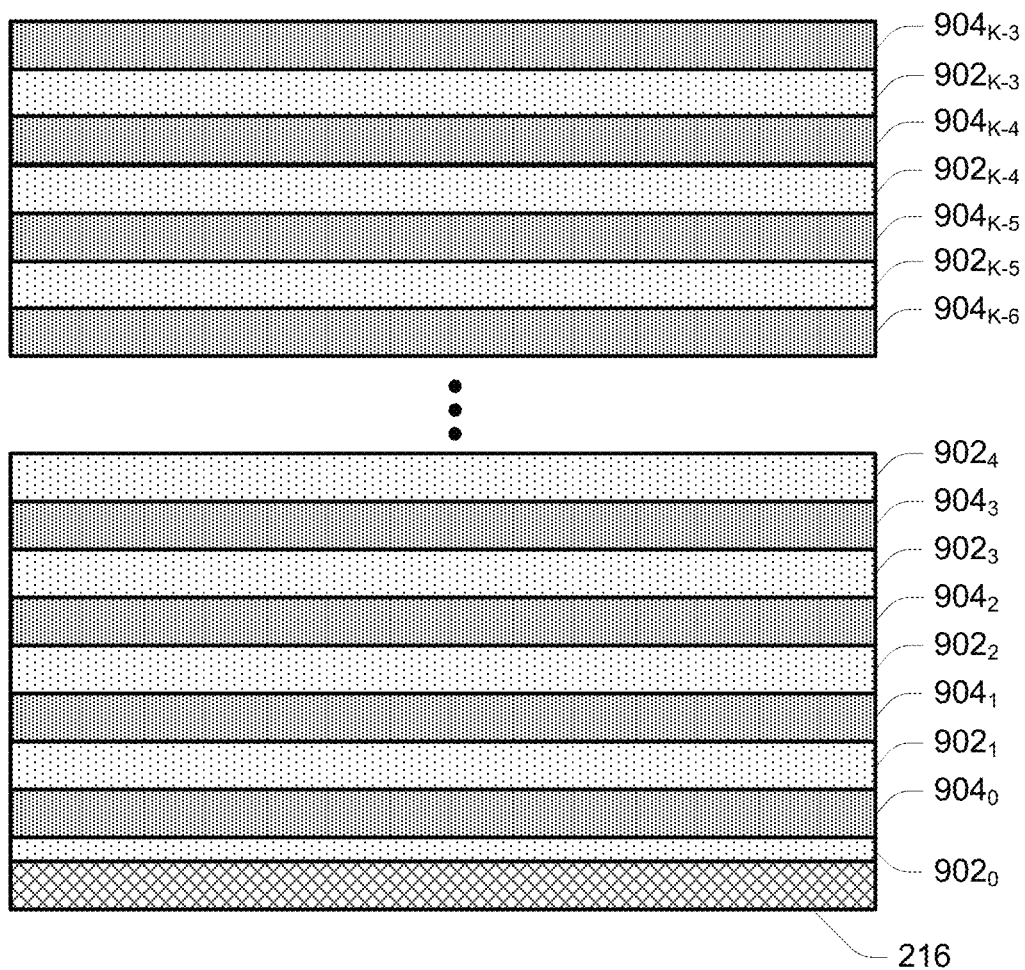
FIGS. 16A-16O depict cross-sectional views of a memory array structure during various stages of fabrication in accordance with embodiments.
Figure 16B:
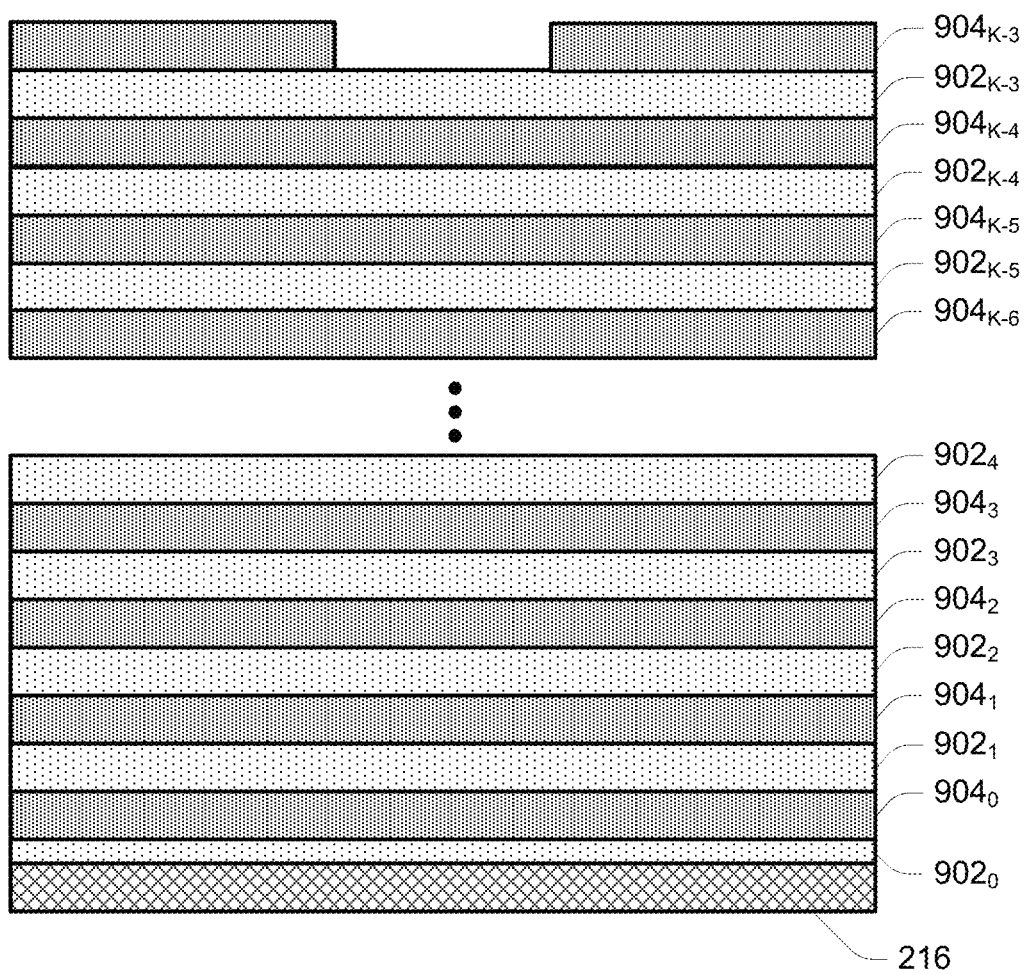
Figure 16C:
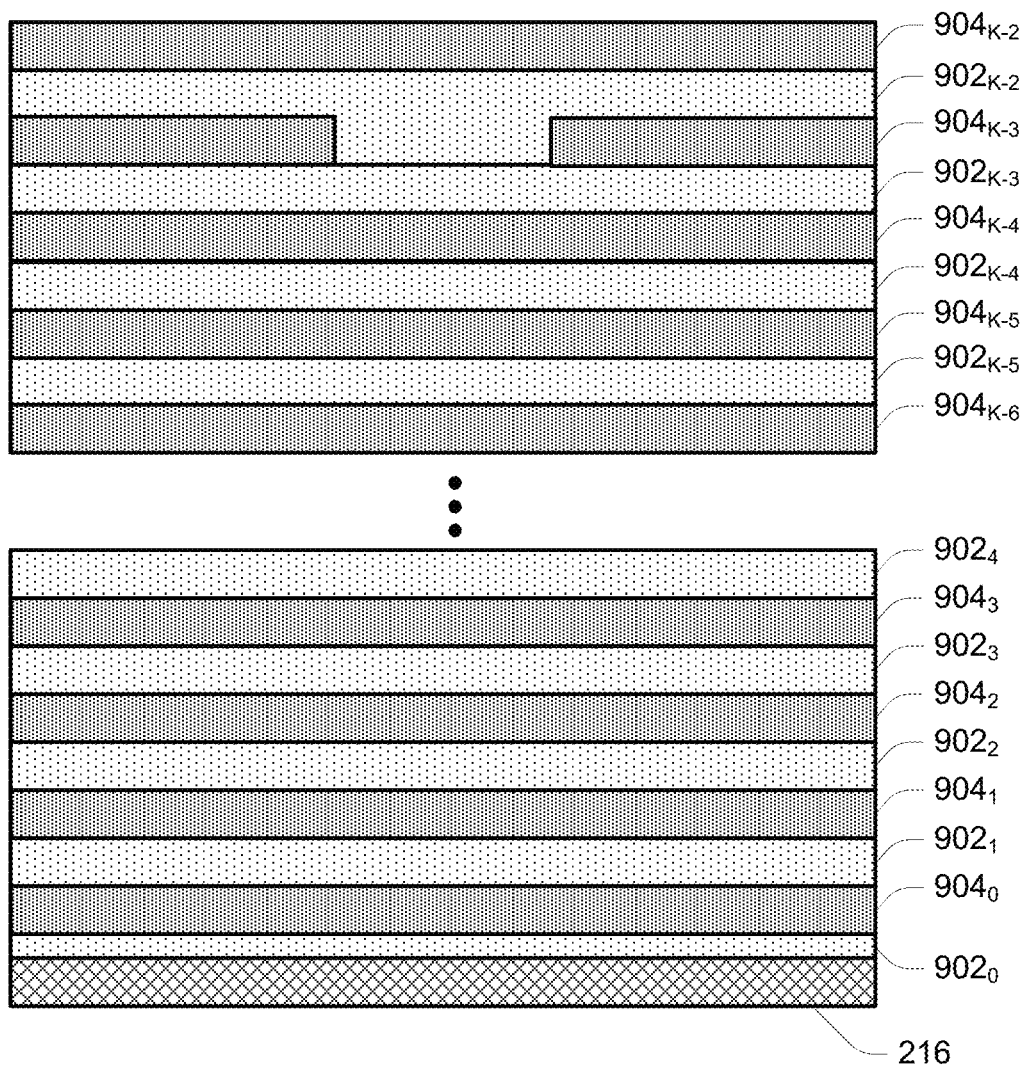
Figure 16D:
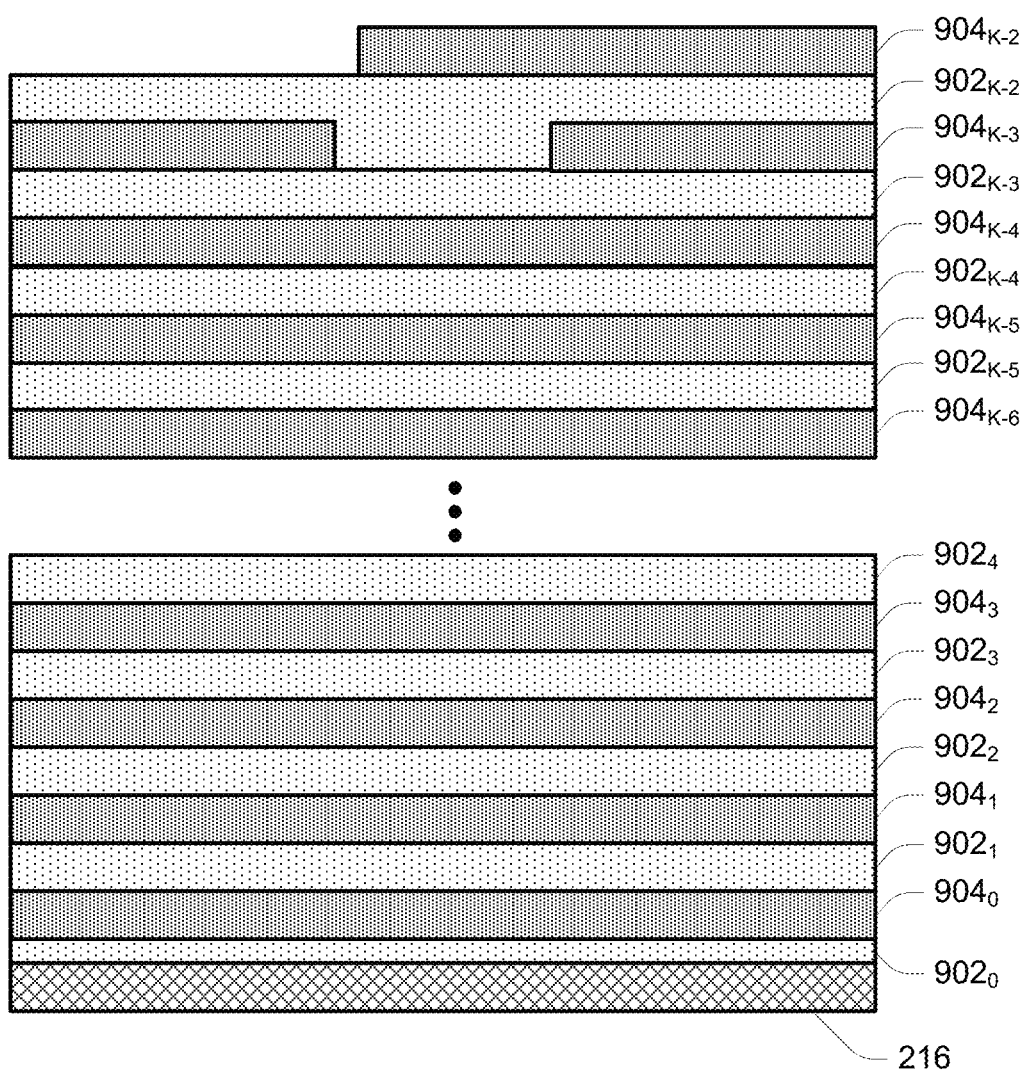
Figure 16E:
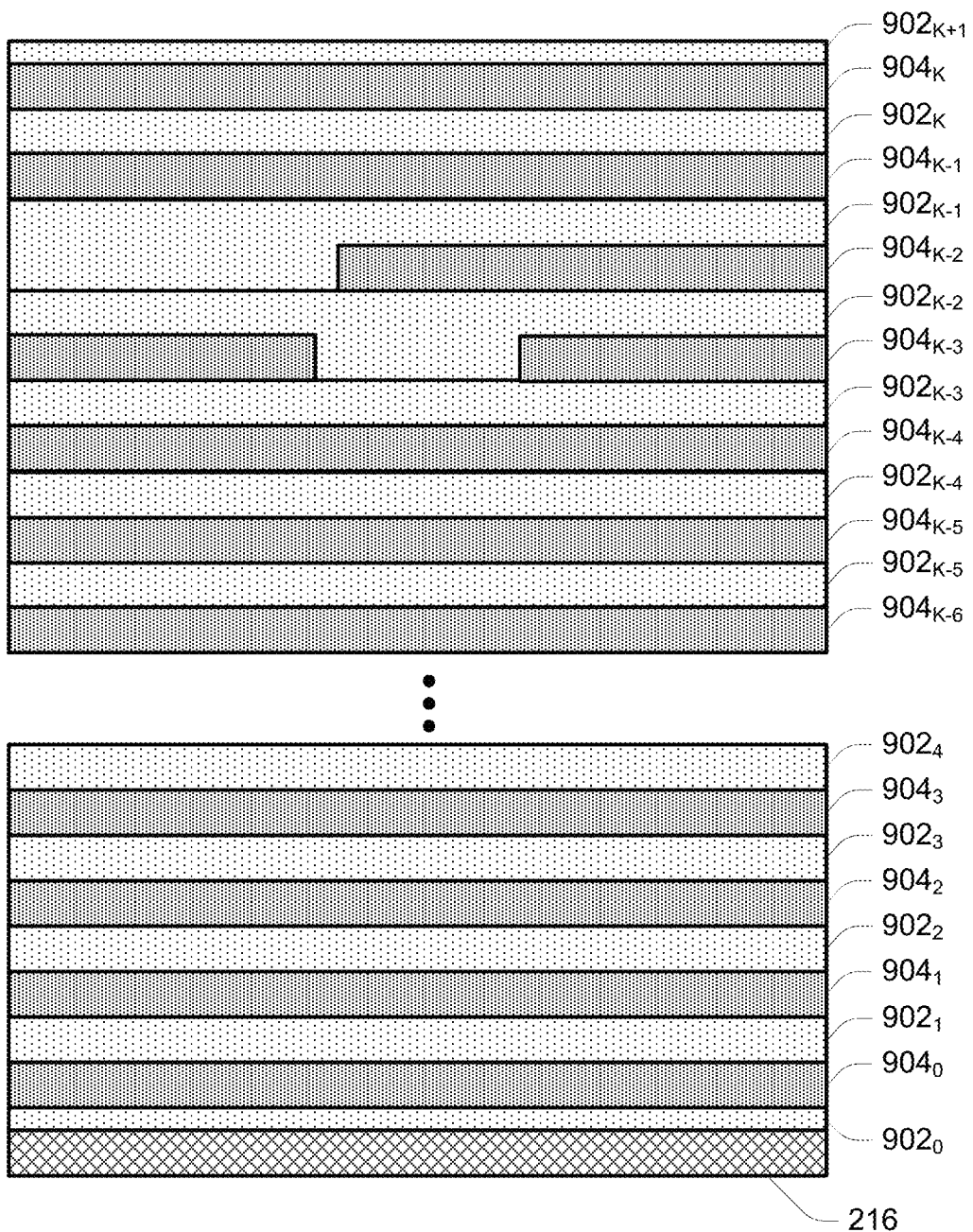
Figure 16F:
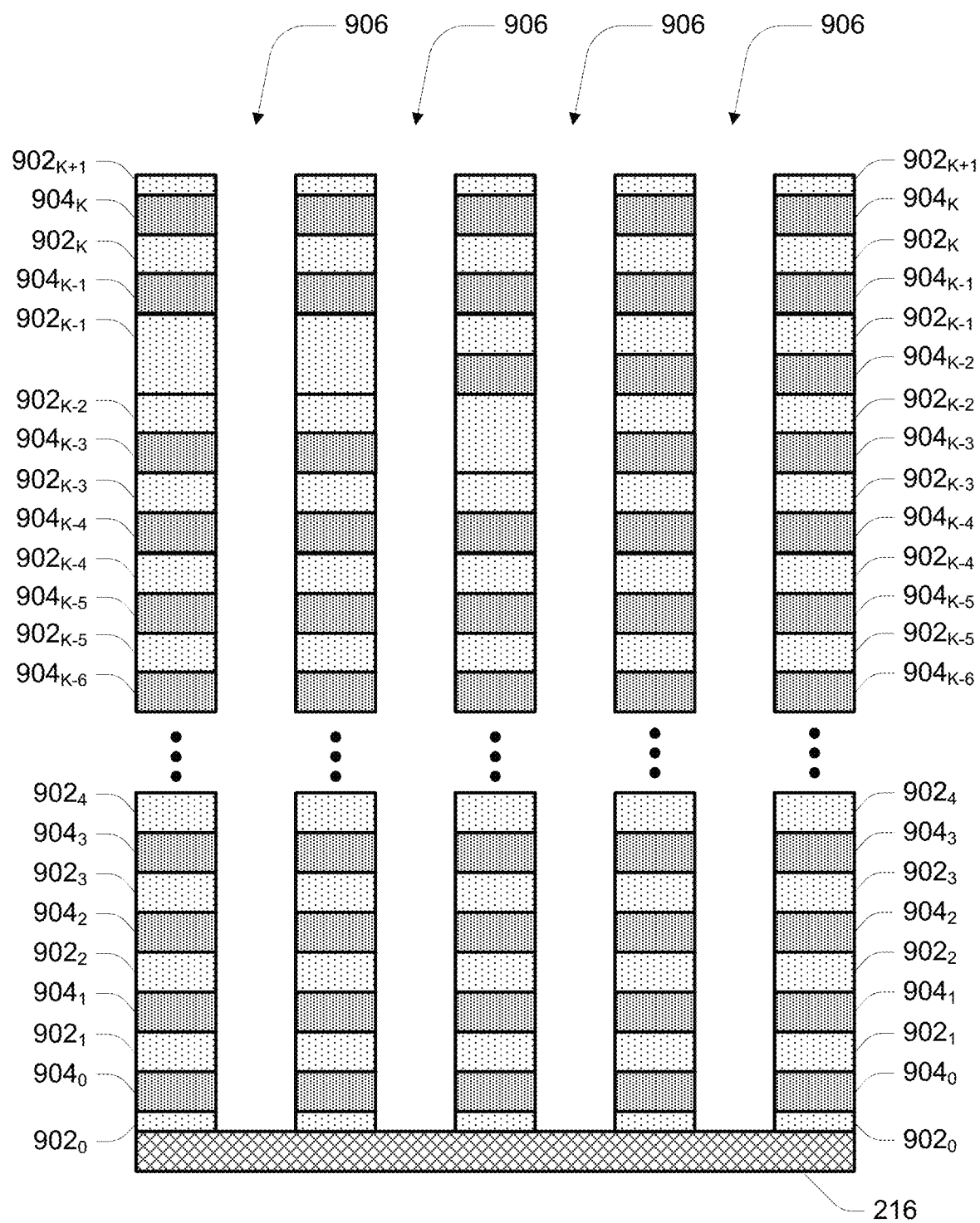
Figure 16G:
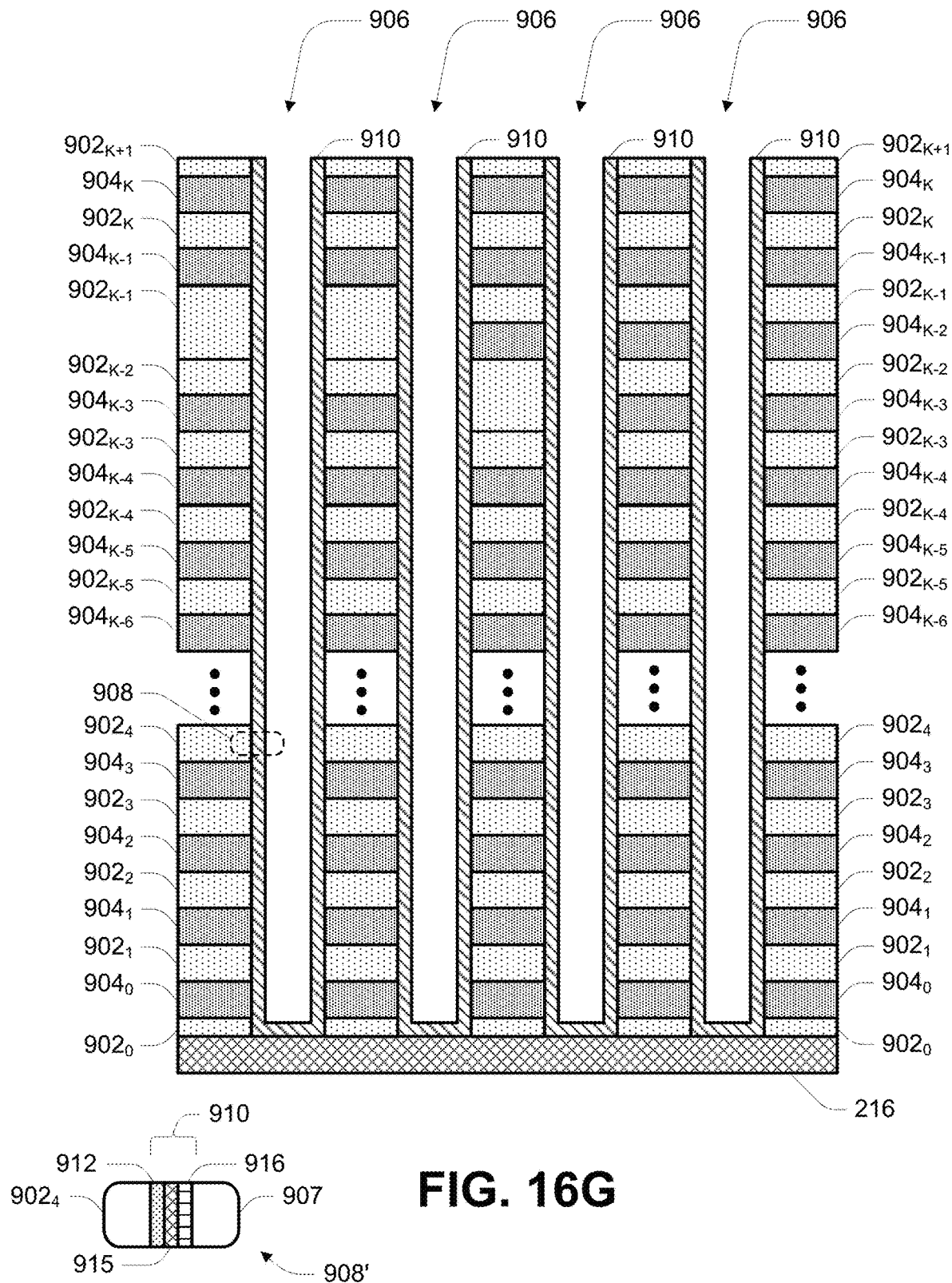
Figure 16H:
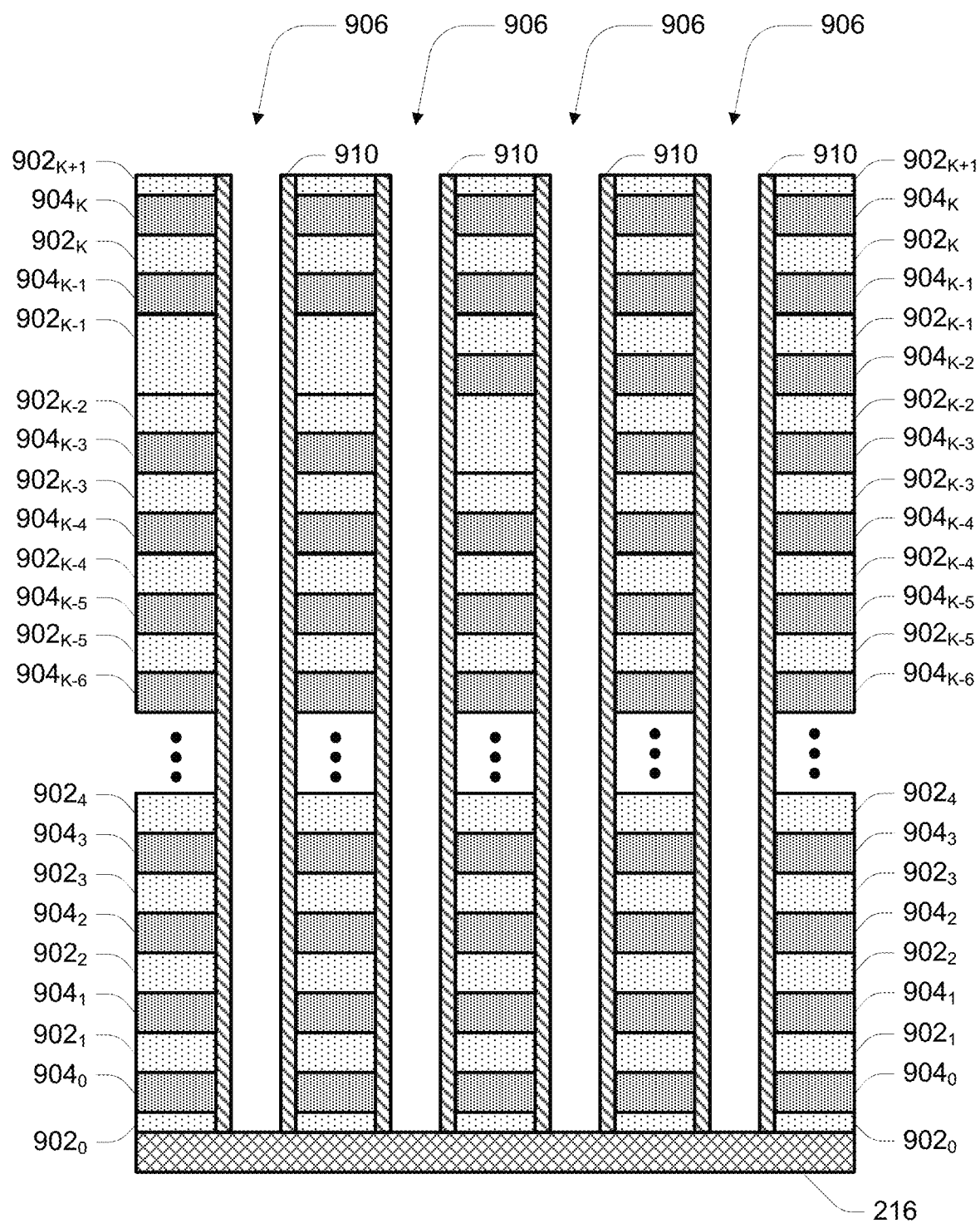
Figure 16I:
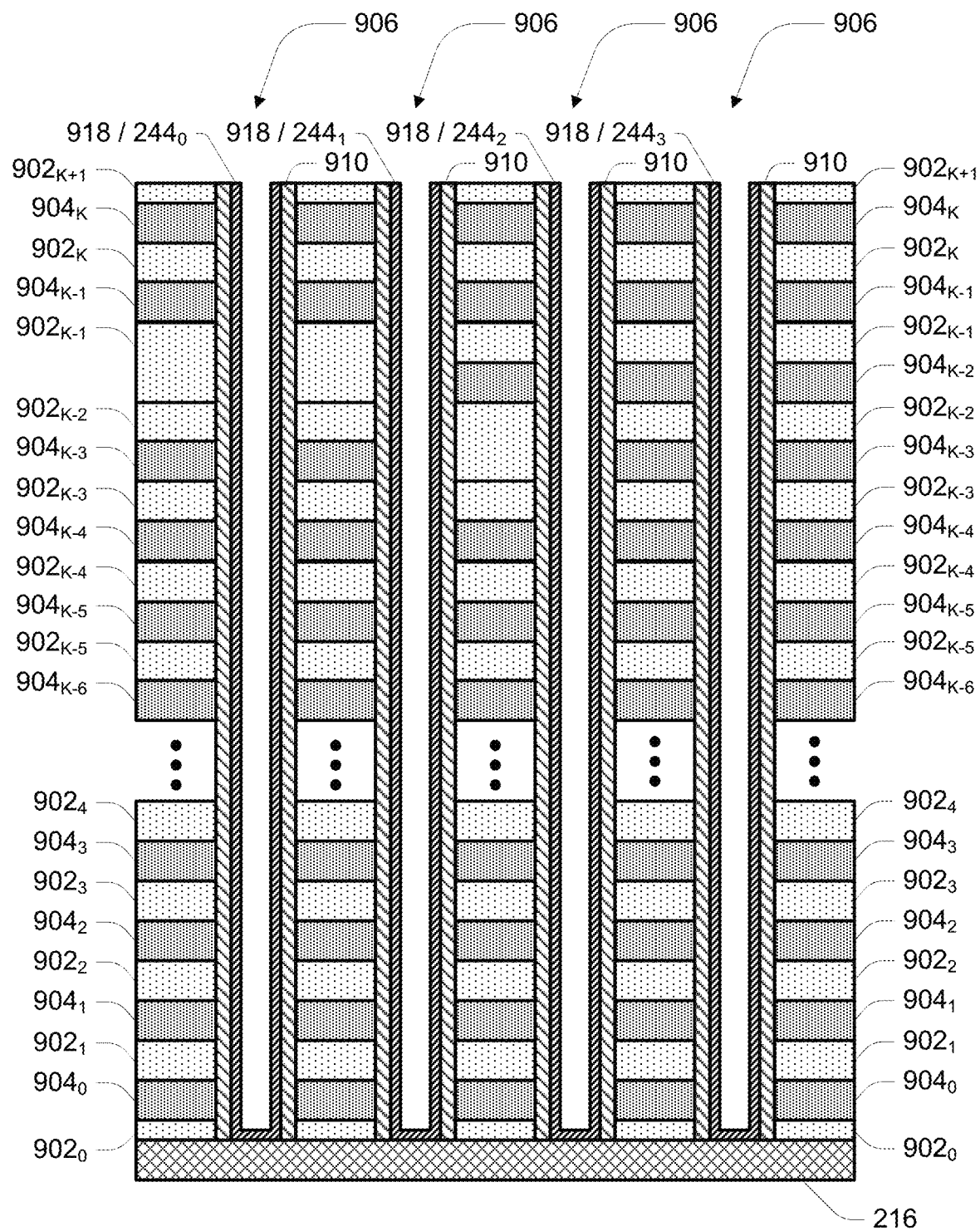
Figure 16J:
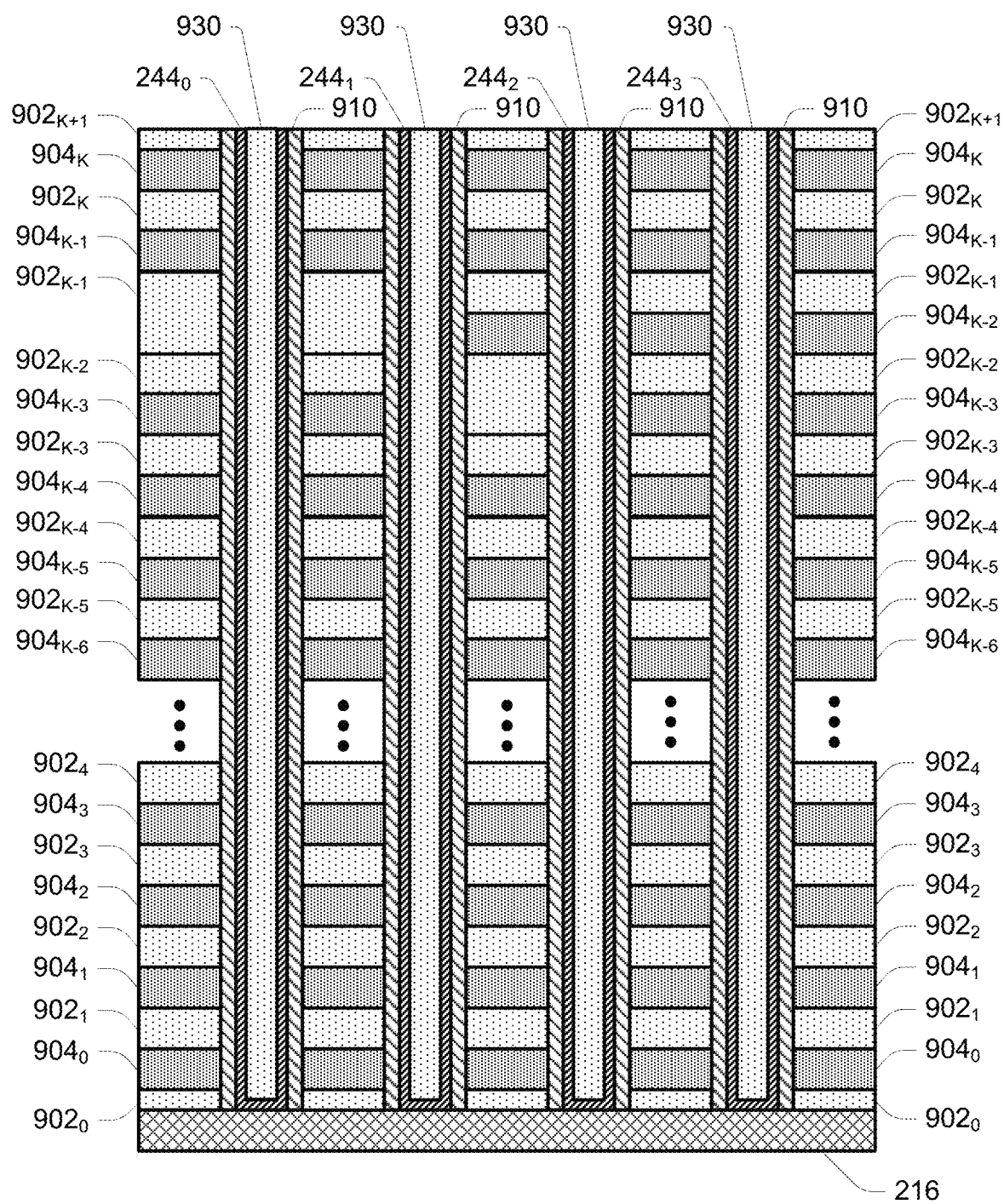
Figure 16K:
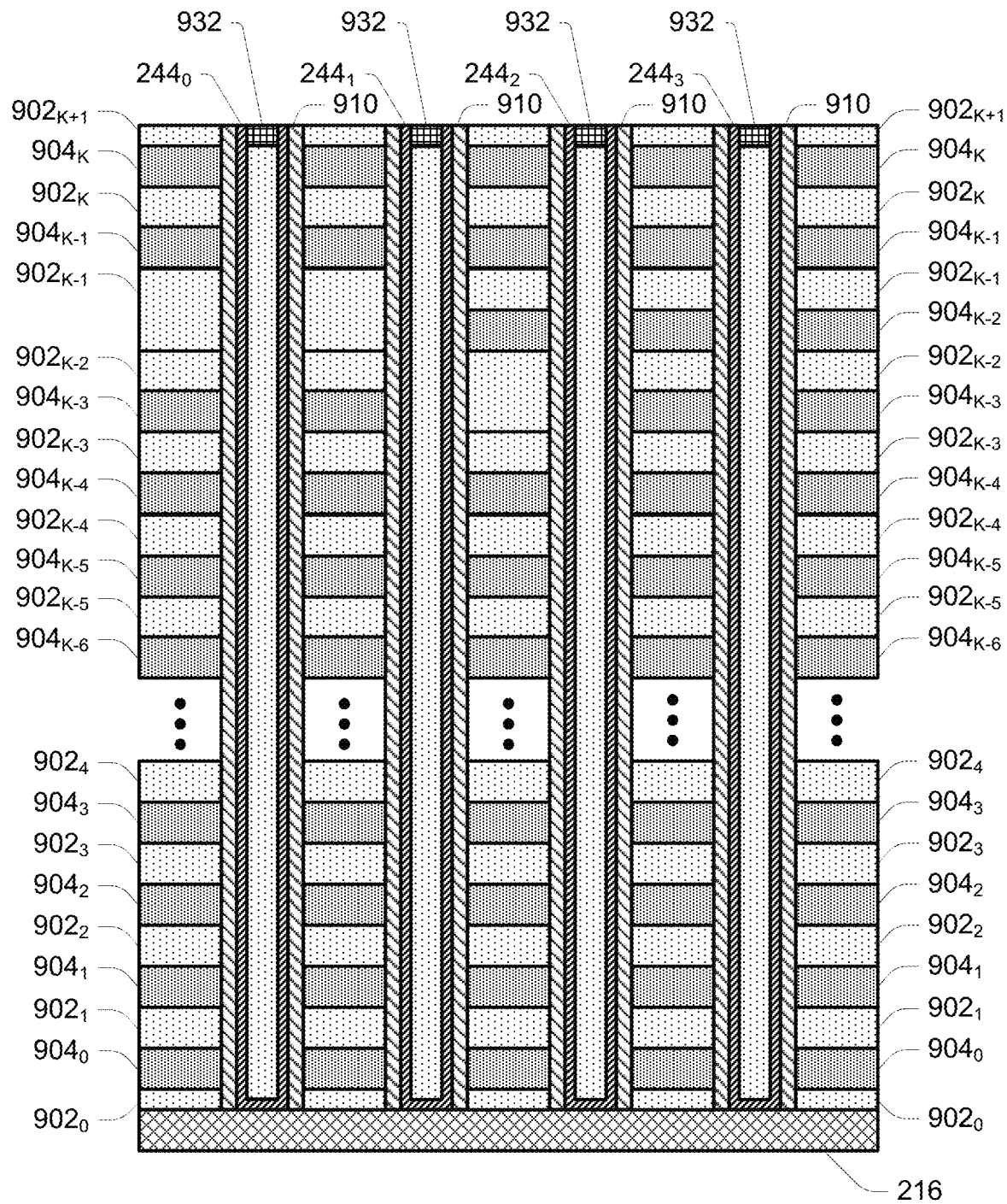
Figure 16L:
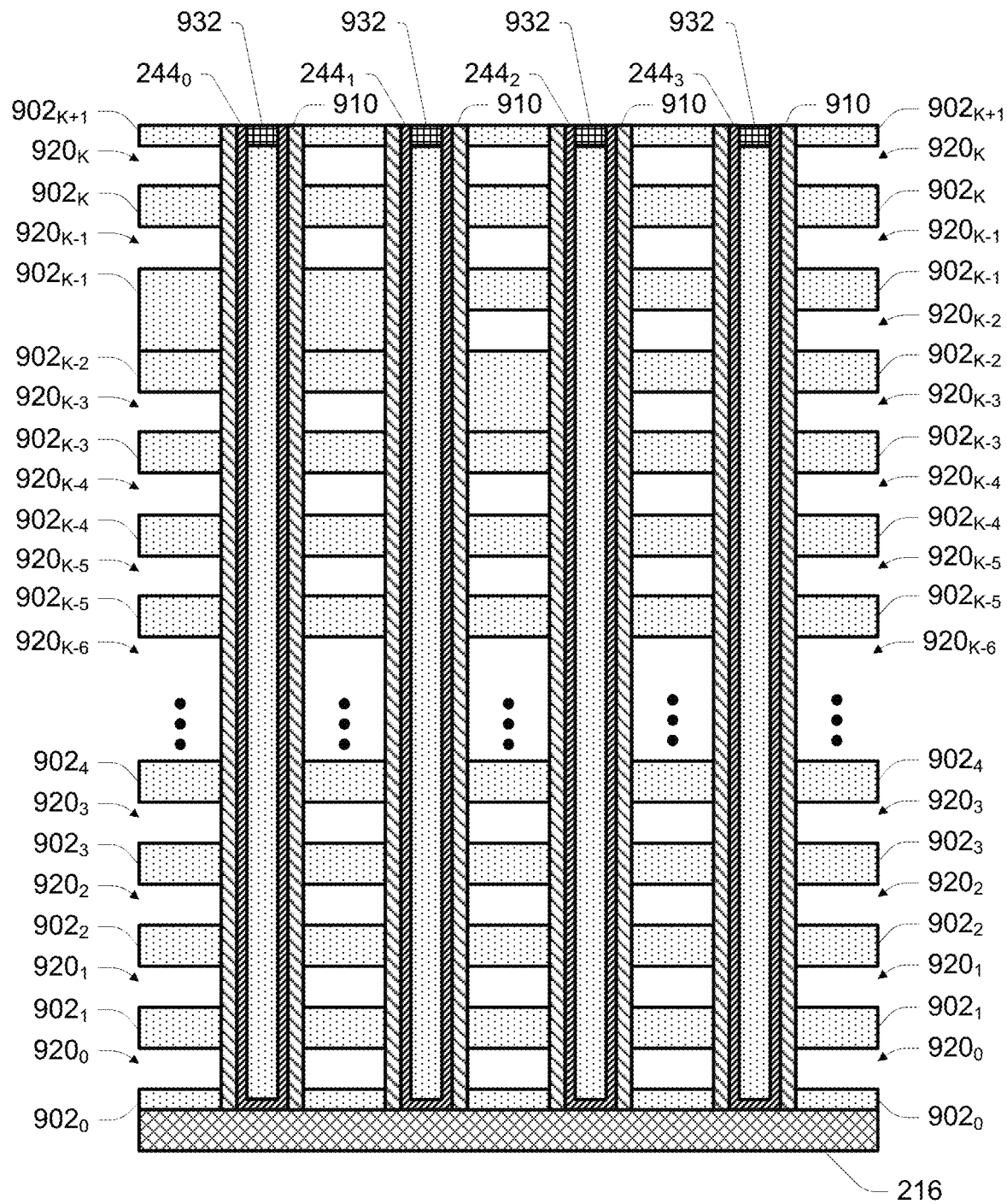
Figure 16M:
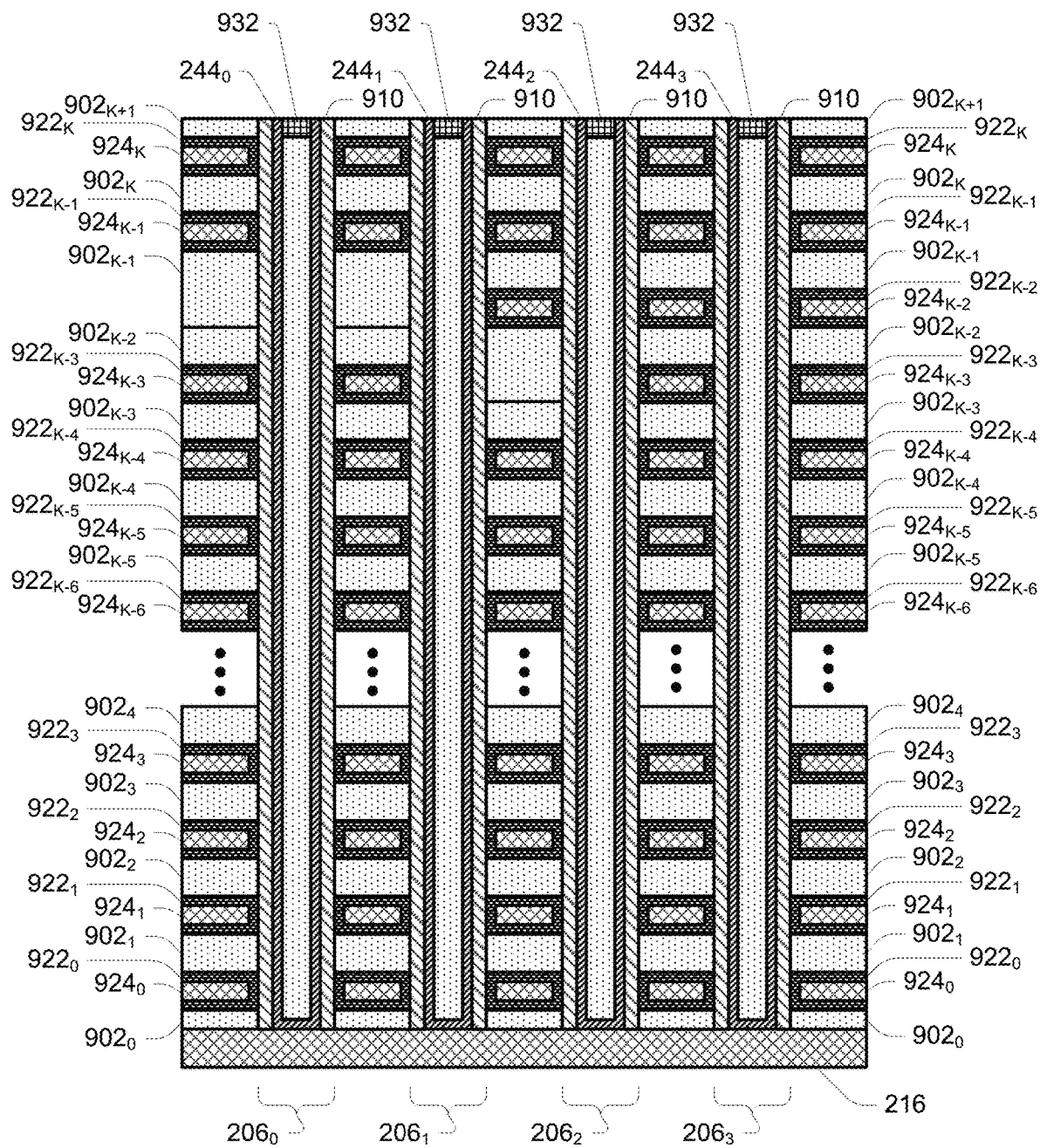
Figure 16N:
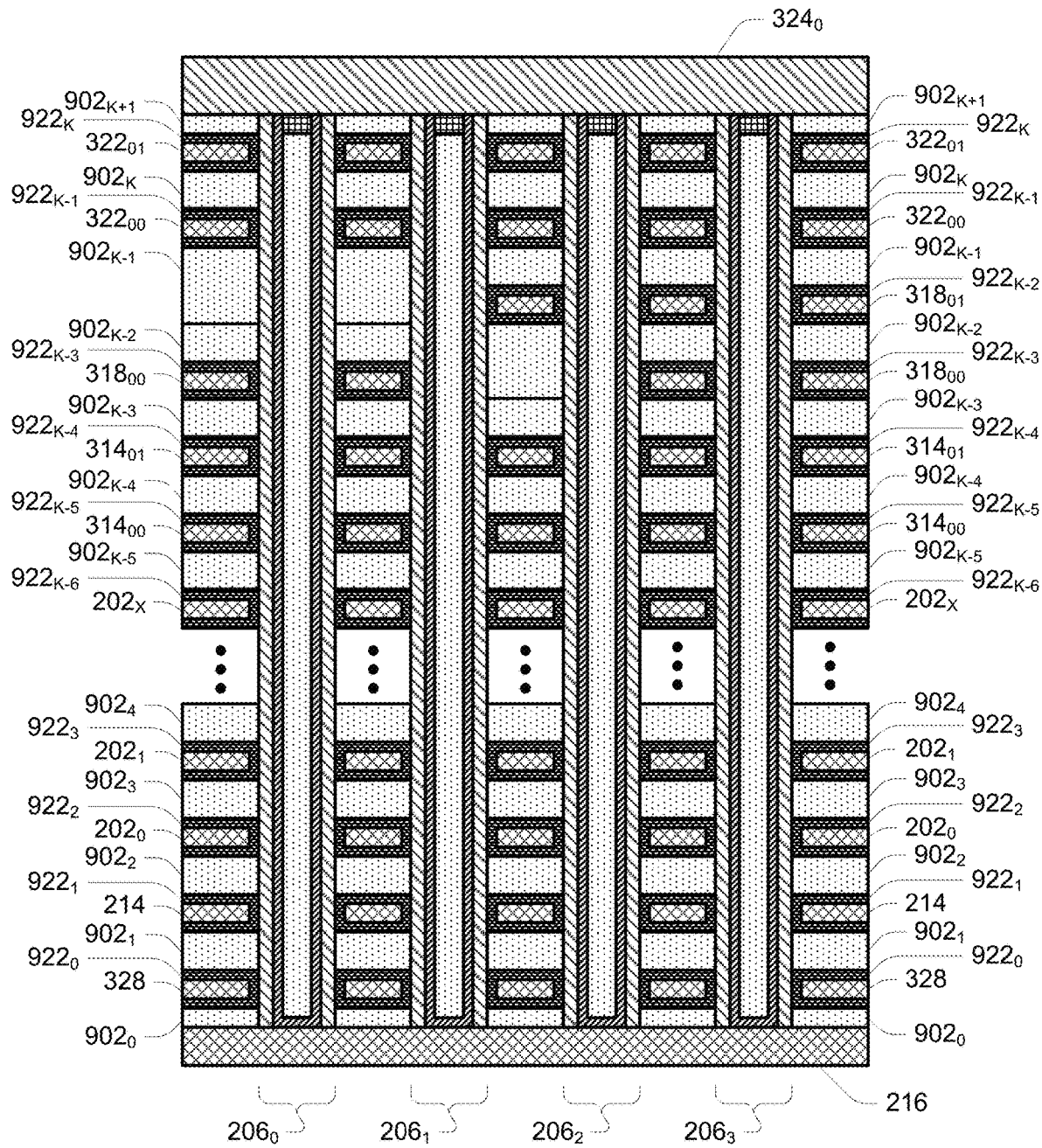
Figure 16O:
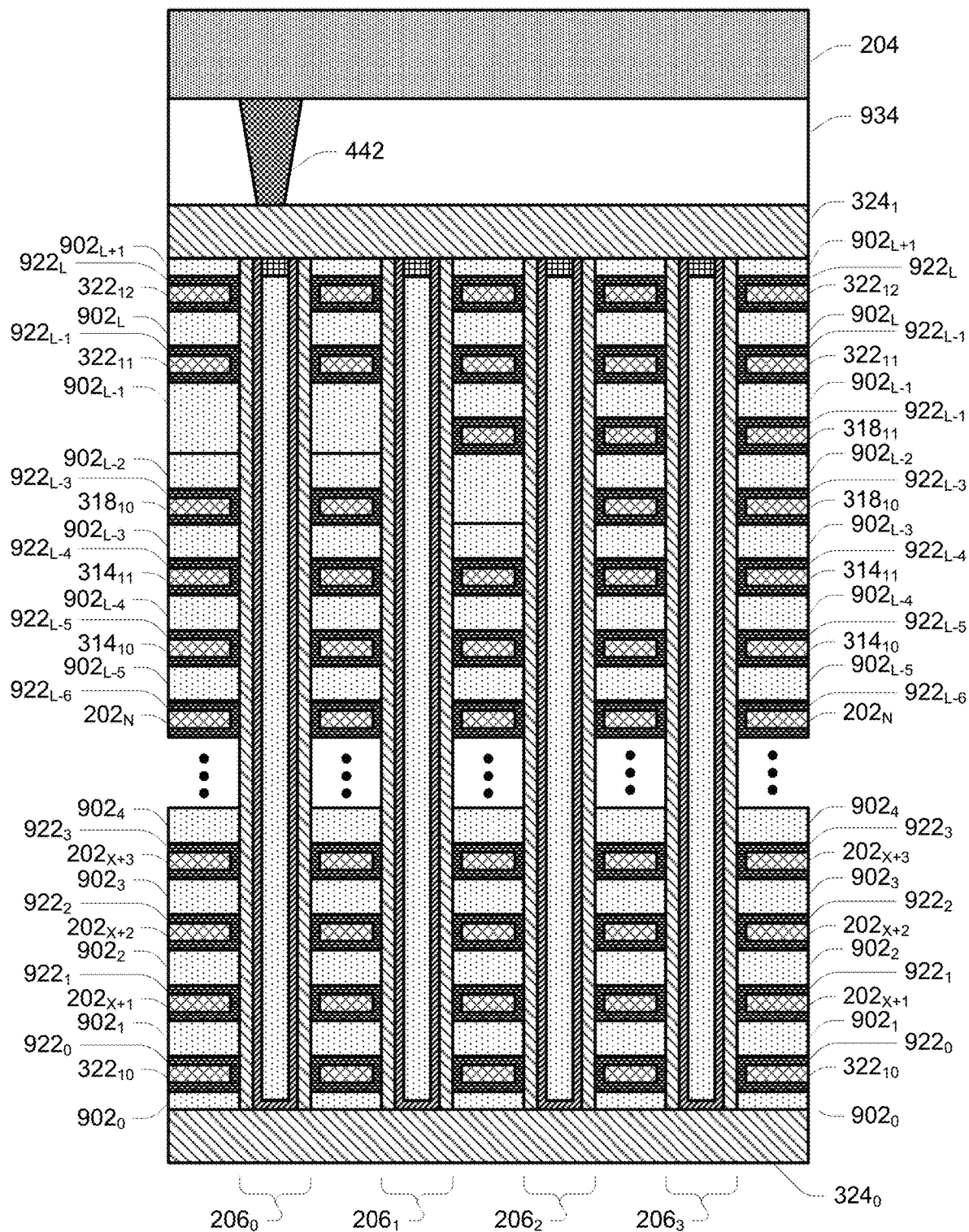

FIGS. 16A-16O depict cross-sectional views of a memory array structure during various stages of fabrication in accordance with embodiments. FIGS. 16A-16N might depict formation of a deck of memory cells having its channel material structures connected to the common source. FIG. 16O might depict a deck of memory cells having its conductive element connected to a data line 204. The embodiment of FIGS. 16A-16O might represent a structure having the schematic of FIGS. 3A-3B and a structure of FIGS. 5 and 6A-6C in relation to the select lines 318.

In FIG. 16A, K−2 instances of a dielectric 902 (e.g., $902_0$ to $902_{K-3}$) and K-2 instances of a sacrificial material 904 (e.g., $904_0$ to $904_{K-3}$) might be formed in an alternating manner. Although instances of the dielectric $902_5$-$902_{K-6}$, and instances of sacrificial material $904_4$-$904_{K-5}$, are not explicitly depicted in the figures, it will be understood that these instances of the dielectric 902 and of the sacrificial material 904 could also be formed in an alternating manner as depicted in the figures. The instance of the dielectric $902_0$ could be formed overlying a common source 216 or formed on a contact (not shown) to the common source 216.

The value K+1 might represent the number of transistors to be formed around the channel material structure $244_0$ of FIG. 3A between a connection to a common source 216 and a conductive element 324. The instances of the dielectric 902 might each contain one or more dielectric materials. The instances of dielectric 902 might comprise, consist of, or consist essentially of an oxide, e.g., silicon dioxide (SiO$_2$), and/or might comprise, consist of, or consist essentially of a high-K dielectric material, such as aluminum oxides (AlO$_x$), hafnium oxides (HfO$_x$), hafnium aluminum oxides (HfAlO$_x$), hafnium silicon oxides (HfSiO$_x$), lanthanum oxides (LaO$_x$), tantalum oxides (TaO$_x$), zirconium oxides (ZrO$_x$), zirconium aluminum oxides (ZrAlO$_x$), or yttrium oxide (Y$_2$O$_3$), as well as any other dielectric material. High-K dielectrics as used herein means a material having a dielectric constant greater than that of silicon dioxide. The instances of dielectric 902 might further comprise, consist of, or consist essentially of a spin-on dielectric material, e.g., hydrogen silsesquioxane (HSQ), hexamethyldisiloxane, octamethyltrisiloxane, etc., or a high-density-plasma (HDP) oxide. The instances of dielectric 902 might further comprise, consist of, or consist essentially of any other dielectric material. As one example, the instances of the dielectric 902 might contain silicon dioxide.

The instances of the sacrificial material 904 might contain a material that can be subjected to removal without significantly affecting the material(s) of the dielectric 902. As one example, the instances of the sacrificial material 904 might contain silicon nitride for instances of the dielectric 902 containing silicon dioxide. Additional instances of the dielectric 902 and instances of the sacrificial material 904 might be formed, depending upon the number of transistors intended to be formed, e.g., memory cells, dummy memory cells, GIDL generator gates, select gates and pre-configured select gates.

In FIG. 16B, a portion of the instance of sacrificial material $904_{K-3}$ might be removed. For example, an anisotropic removal process, e.g., reactive ion etching (ME), might be used with the instance of dielectric $902_{K-3}$ acting as an etch stop. As such, a portion of the instance of dielectric $902_{K-3}$ might be exposed. In FIG. 16C, an instance of dielectric $902_{K-2}$ might be formed overlying the instance of sacrificial material $904_{K-3}$ and the exposed portion of the instance of dielectric $902_{K-3}$, and an instance of sacrificial material $904_{K-2}$ might be formed overlying the instance of dielectric $902_{K-2}$.

In FIG. 16D, a portion of the instance of sacrificial material $904_{K-2}$ might be removed. For example, an anisotropic removal process, e.g., reactive ion etching (ME), might be used with the instance of dielectric $902_{K-2}$ acting as an etch stop. As such, a portion of the instance of dielectric $902_{K-2}$ might be exposed. In FIG. 16E, an instance of dielectric $902_{K-1}$ might be formed overlying the instance of sacrificial material $904_{K-2}$ and the exposed portion of the instance of dielectric $902_{K-2}$, and instances of sacrificial material $904_{K-1}$ to $904_K$ and instances of dielectric $902_K$ to $902_{K+1}$ might be formed in an alternating fashion overlying the instance of dielectric $902_{K-2}$.

In FIG. 16F, vias 906 might be formed through the instances of the dielectric 902 and the instances of the sacrificial material 904. For example, an anisotropic removal process, e.g., reactive ion etching (ME), might be used with the common source 216, or a contact (not depicted in FIG. 16F) to the common source 216, acting as an etch stop. As such, the vias 906 might extend through all instances of the dielectric 902 and through all instances of the sacrificial material 904, exposing portions of the common source 216.

In FIG. 16G, data storage structures 910 might be formed to line the sidewalls of each via 906, e.g., formed along the sidewalls of the instances of the dielectric 902 and the instances of the sacrificial material 904, and the exposed portions of the common source 216. The portion 908 of the channel material structure 910 is depicted in further detail in the expanded portion 908'. As depicted, the data storage structures 910 might each include a charge-blocking material 912 formed to line the via 906, a charge-storage material 914 might be formed on the charge-blocking material 912, and a dielectric (e.g., gate dielectric) 916 might be formed on the charge-storage material 914. The charge-storage material 914 might contain a dielectric or conductive charge-storage material. The charge-storage material 914 might further contain both dielectric and conductive materials, e.g., conductive nano-particles in a dielectric bulk material. For charge-storage material 914 containing a conductive material as its bulk, or as a continuous structure, resulting memory cells might typically be referred to as floating-gate memory cells. For charge-storage material 914 containing a dielectric material as its bulk, or as a continuous structure, resulting memory cells might typically be referred to as charge-trap memory cells.

The charge-blocking material 912 might function as a charge-blocking node for future memory cells and other transistors having a same structure, and might include one or more dielectric materials, such as described with reference to the dielectric 902. For example, the charge-blocking material 912 might include a high-K dielectric material. The charge-storage material 914 might function as a charge-storage node for future memory cells and other transistors having a same structure, and might include one or more conductive or dielectric materials capable of storing a charge. For example, the charge-storage material 914 might include silicon nitride, which has charge trapping levels inside the film. The dielectric 916 might function as a gate dielectric for future memory cells and other transistors having a same structure, and might include one or more dielectric materials such as described with reference to the dielectric 902.

In FIG. 16H, a portion (e.g., a bottom portion) of each data storage structure 910 might be removed. For example, an anisotropic removal process, e.g., reactive ion etching (ME), might be used with the common source 216, or a contact (not depicted in FIG. 16H) to the common source 216, acting as an etch stop. As such, portions of the common source 216 might again be exposed.

In FIG. 16I, a channel material 918 might be formed to line the voids 906. The channel material 918 might be a portion of a contiguous semiconductor structure, e.g., a channel material structure 244, for each transistor that is formed around a given data storage structure 910, or might otherwise be electrically connected, which might include selectively electrically connected, to channels of each such transistor. The channel material 918 might function as a channel for future memory cells and other transistors having a same or similar structure. The channel material 918 might include one or more semiconductor materials. For one embodiment, the channel material 918 might include a silicon-containing material, such as amorphous or polycrystalline silicon. The channel material 918 might have a conductivity type, e.g., a p-type conductivity or an n-type conductivity, and may have sufficient conductivity to give a future transistor a negative threshold voltage. Although the channel material 918 is depicted as a hollow structure, the channel material 918 could alternatively be a solid structure.

In FIG. 16J, a dielectric 930 might be formed in the voids 906. The dielectric 930 might contain one or more dielectric materials. The dielectric 930 might comprise, consist of, or consist essentially of an oxide, e.g., silicon dioxide ($SiO_2$). The dielectric 930 might further comprise, consist of, or consist essentially of a spin-on dielectric material, e.g., hydrogen silsesquioxane (HSQ), hexamethyldisiloxane, octamethyltrisiloxane, etc., or a high-density-plasma (HDP) oxide. The dielectric 930 might further comprise, consist of, or consist essentially of any other dielectric material. The dielectric 930 might contain one or more dielectric materials that can be selectively removed without adversely affecting the materials of the instances of dielectric 902, the charge-blocking material 912, the charge-storage material 914, the gate dielectric 916, and the channel material 918. The dielectric 930 might be deposited overlying the structure of FIG. 16I, and then removed to the level of an upper surface of the upper instance of dielectric 902, e.g., instance of dielectric $902_{K+1}$, such as by chemical-mechanical planarization (CMP). Although depicted as a solid dielectric 930, a portion of each void 906 might remain after forming the dielectric 930.

In FIG. 16K, a portion of each instance of dielectric 930 might be removed to recess the upper surface of the instances of dielectric 930. For example, the instances of dielectric 930 might be recessed to expose portions of the channel material 918, to a level of the upper instance of sacrificial material 904, e.g., instance of sacrificial material $904_K$. A respective conductive plug 932 might then be formed overlying each instance of dielectric 930 and in contact with its corresponding channel material 918 of the channel material structures 244. Each conductive plug 932 might contain one or more conductive materials, and might comprise, consist of, or consist essentially of conductively doped polysilicon and/or might comprise, consist of, or consist essentially of metal, such as a refractory metal, or a metal-containing material, such as a refractory metal silicide or a metal nitride, e.g., a refractory metal nitride, as well as any other conductive material. For some embodiments, the conductive plugs 932 might contain a conductively-doped polysilicon, such as an n+-type conductively-doped polysilicon.

If FIG. 16L, the instances of sacrificial material 904 might be removed to define voids 920, e.g., voids $920_0$ to $920_K$. The removal might include an isotropic removal process, e.g., a plasma etching process. In FIG. 16M, instances of an optional charge-blocking material 922, e.g., instances of charge-blocking material 922O to 922K, might be formed to line the voids 920, e.g., voids $920_0$ to $920_K$, respectively. The instances of charge-blocking material 922 might include one or more dielectric materials, such as described with reference to the dielectric 902, and might include a high-K dielectric material. For embodiments with the charge-blocking material 912, the instances of charge-blocking material 922 might function as an additional charge-blocking material of a charge-blocking node for future memory cells and other transistors having a same or similar structure. For embodiments without the charge-blocking material 912, the instances of charge-blocking material 922 might function individually as a charge-blocking node for future memory cells and other transistors having a same structure. For embodiments with the charge-blocking material 912, and without the instances of charge-blocking material 922, the charge-blocking material 912 might function individually as a charge-blocking node for future memory cells and other transistors having a same or similar structure. Instances of a conductor 924, e.g., instances of a conductor $924_0$ to $924_K$, might be formed to fill the voids 920, e.g., voids $920_0$ to $920_K$, respectively. The instances of the conductor 924 might contain one or more conductive materials. The instances of the conductor 924 might comprise, consist of, or consist essentially of conductively doped polysilicon and/or might comprise, consist of, or consist essentially of metal, such as a refractory metal, or a metal-containing material, such as a refractory metal silicide or a metal nitride, e.g., a refractory metal nitride, as well as any other conductive material.

A transistor might be formed at each intersection of an instance of the conductor 924 and the channel material 918, where an instance of the conductor 924 might function as a control gate of the transistor, adjacent channel material 918 might function as a channel of the transistor, and an instance of charge-blocking material 922 and/or charge-blocking material 912, charge-storage material 914, and dielectric 916 between the instance of the conductor 924 and the adjacent channel material 918 might function as a charge-blocking node, charge-storage node and gate dielectric, respectively, of that transistor. Such transistors could include memory cells 208, select gates 210, select gates 312, pre-configured select gates 316, and optional select gates 320, for example.

In this example corresponding to the schematic of FIG. 3A and the structure of FIG. 5, the instance of the conductor $924_K$ might correspond to the select line $322_{01}$, the instance of the conductor $924_{K-1}$ might correspond to the select line $322_{00}$, the instance of the conductor $924_{K-2}$ might correspond to the select line $318_{01}$, the instance of the conductor $924_{K-3}$ might correspond to the select line $318_{00}$, the instance of the conductor $924_{K-4}$ might correspond to the select line $314_{01}$, the instance of the conductor $924_{K-5}$ might correspond to the select line $314_{00}$, the instance of the conductor $924_1$ might correspond to the select line 214, the instance of the conductor $924_0$ might correspond to the control line 328, and the instances of the conductor $924_{K-6}$ to $924_2$ might correspond to the access lines $202_X$ to $202_0$, respectively. These correspondences are reflected in FIG. 16N.

In FIG. 16N, a conductive element $324_0$ might be formed overlying and in contact with each of the channel material structures 244, which might include being in contact with an optional conductive plug 932. The conductive element $324_0$ might contain one or more conductive materials, and might comprise, consist of, or consist essentially of conductively doped polysilicon and/or might comprise, consist of, or consist essentially of metal, such as a refractory metal, or a metal-containing material, such as a refractory metal silicide or a metal nitride, e.g., a refractory metal nitride, as well as any other conductive material. For some embodiments, the conductive element $324_0$ might contain a conductively-doped polysilicon, such as an $n^+$-type conductively-doped polysilicon.

The embodiment of FIG. 16O, e.g., up to the conductive element $324_1$, might be formed in a manner similar to that described with reference to FIGS. 16A-16N, except that the formation of alternating instances of dielectric 902 (e.g., instances of dielectric $902_0$ to $902_{L+1}$) and instances of sacrificial material 904 (e.g., instances of sacrificial material $904_0$ to $904_L$) might be formed overlying the conductive element $324_0$ instead of the common source 216. The value of L may or may not be equal to the value of K.

Further in FIG. 16O, a data line contact 442 might be formed through a dielectric 934 that might be formed overlying and connected to the conductive element $324_1$. A data line 204 might be formed overlying and connected to the data line contact 442. The contact 442 might contain one or more conductive materials, e.g., conductive materials such as described with reference to the conductor 924. For some embodiments, the contact 442 might contain an $n^+$-type conductively-doped polysilicon. For other embodiments, the contact 442 might include an $n^+$-type conductively-doped polysilicon formed overlying the conductive element $324_1$, titanium nitride (TiN) formed overlying the $n^+$-type conductively-doped polysilicon, and tungsten (W) formed overlying the titanium nitride. While FIGS. 16A-16O depicted an example method of fabricating a portion of the array structure, other methods of fabrication could be used with various embodiments.

FIGS. 17A-17D depict cross-sectional views of a memory array structure during various stages of fabrication in accordance with embodiments. FIGS. 17A-17D might depict a portion of formation of a deck of memory cells having its channel material structures connected to the common source such as described with reference to FIGS. 16A-16O. The embodiment of FIGS. 17A-17D might represent a structure having the schematic of FIGS. 3A-3B and a structure of FIGS. 5 and 6A-6C in relation to the select lines 318. Like numbered elements in FIGS. 17A-17D correspond to the description as provided with respect to FIGS. 16A-16O.

Figure 17A:
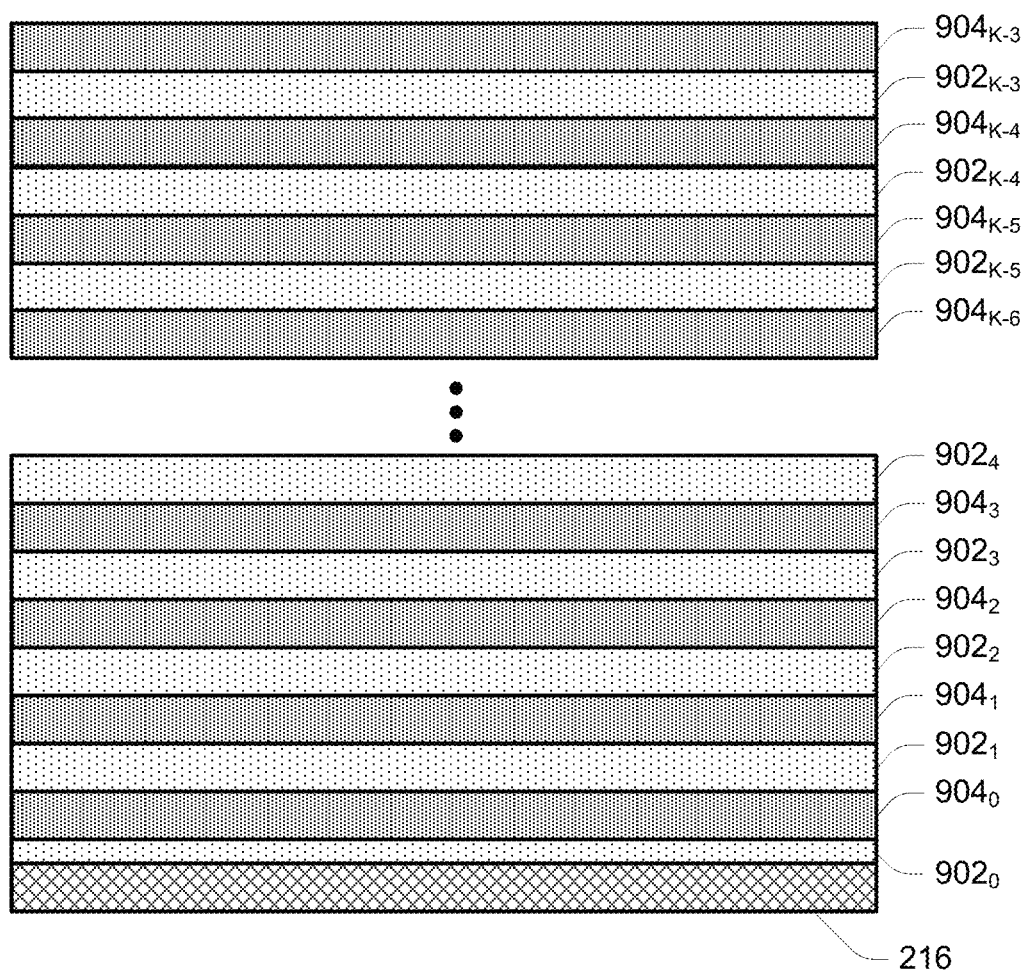
FIGS. 17A-17D depict cross-sectional views of a memory array structure during various stages of fabrication in accordance with embodiments.

In FIG. 17A, K-2 instances of a dielectric 902 (e.g., $902_0$ to $902_{K-3}$) and K-2 instances of a sacrificial material 904 (e.g., $904_0$ to $904_{K-3}$) might be formed in an alternating manner. Although instances of the dielectric $902_5$-$902_{K-6}$, and instances of sacrificial material $904_4$-$904_{K-5}$, are not explicitly depicted in the figures, it will be understood that these instances of the dielectric 902 and of the sacrificial material 904 could also be formed in an alternating manner as depicted in the figures. The instance of the dielectric $902_0$ could be formed overlying a common source 216 or formed on a contact (not shown) to the common source 216.

The value K+1 might represent the number of transistors to be formed around the channel material structure $244_0$ of FIG. 3A between a connection to a common source 216 and a conductive element 324. The instances of the dielectric 902 might each contain one or more dielectric materials. The instances of dielectric 902 might comprise, consist of, or consist essentially of an oxide, e.g., silicon dioxide ($SiO_2$), and/or might comprise, consist of, or consist essentially of a high-K dielectric material, such as aluminum oxides ($AlO_x$), hafnium oxides ($HfO_x$), hafnium aluminum oxides ($HfAlO_x$), hafnium silicon oxides ($HfSiO_x$), lanthanum oxides ($LaO_x$), tantalum oxides ($TaO_x$), zirconium oxides ($ZrO_x$), zirconium aluminum oxides ($ZrAlO_x$), or yttrium oxide ($Y_2O_3$), as well as any other dielectric material. High-K dielectrics as used herein means a material having a dielectric constant greater than that of silicon dioxide. The instances of dielectric 902 might further comprise, consist of, or consist essentially of a spin-on dielectric material, e.g., hydrogen silsesquioxane (HSQ), hexamethyldisiloxane, octamethyltrisiloxane, etc., or a high-density-plasma (HDP) oxide. The instances of dielectric 902 might further comprise, consist of, or consist essentially of any other dielectric material. As one example, the instances of the dielectric 902 might contain silicon dioxide.

The instances of the sacrificial material 904 might contain a material that can be subjected to removal without significantly affecting the material(s) of the dielectric 902. As one example, the instances of the sacrificial material 904 might contain silicon nitride for instances of the dielectric 902 containing silicon dioxide. Additional instances of the dielectric 902 and instances of the sacrificial material 904 might be formed, depending upon the number of transistors intended to be formed, e.g., memory cells, dummy memory cells, GIDL generator gates, select gates and pre-configured select gates.

Figure 17B:
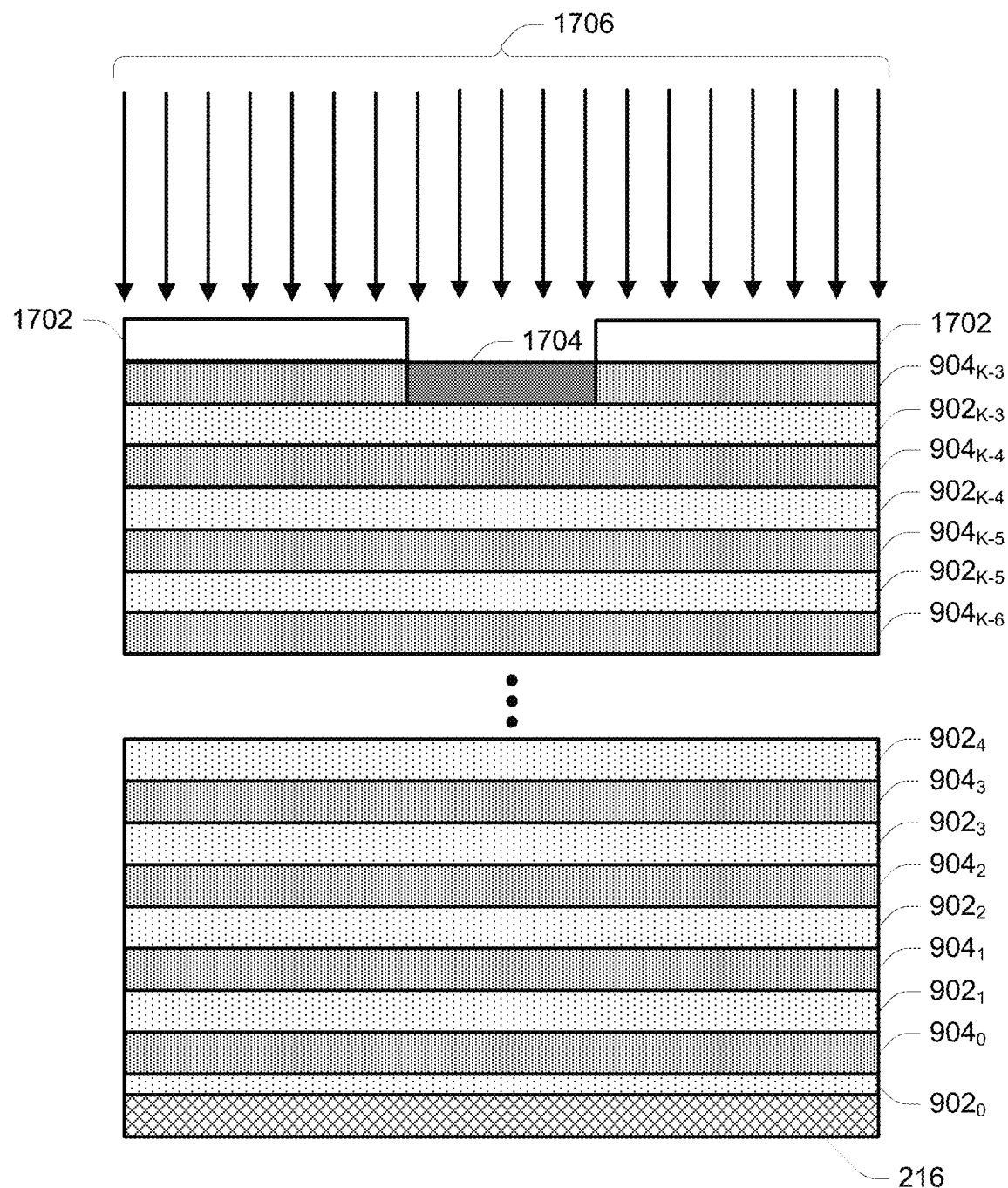
Figure 17C:
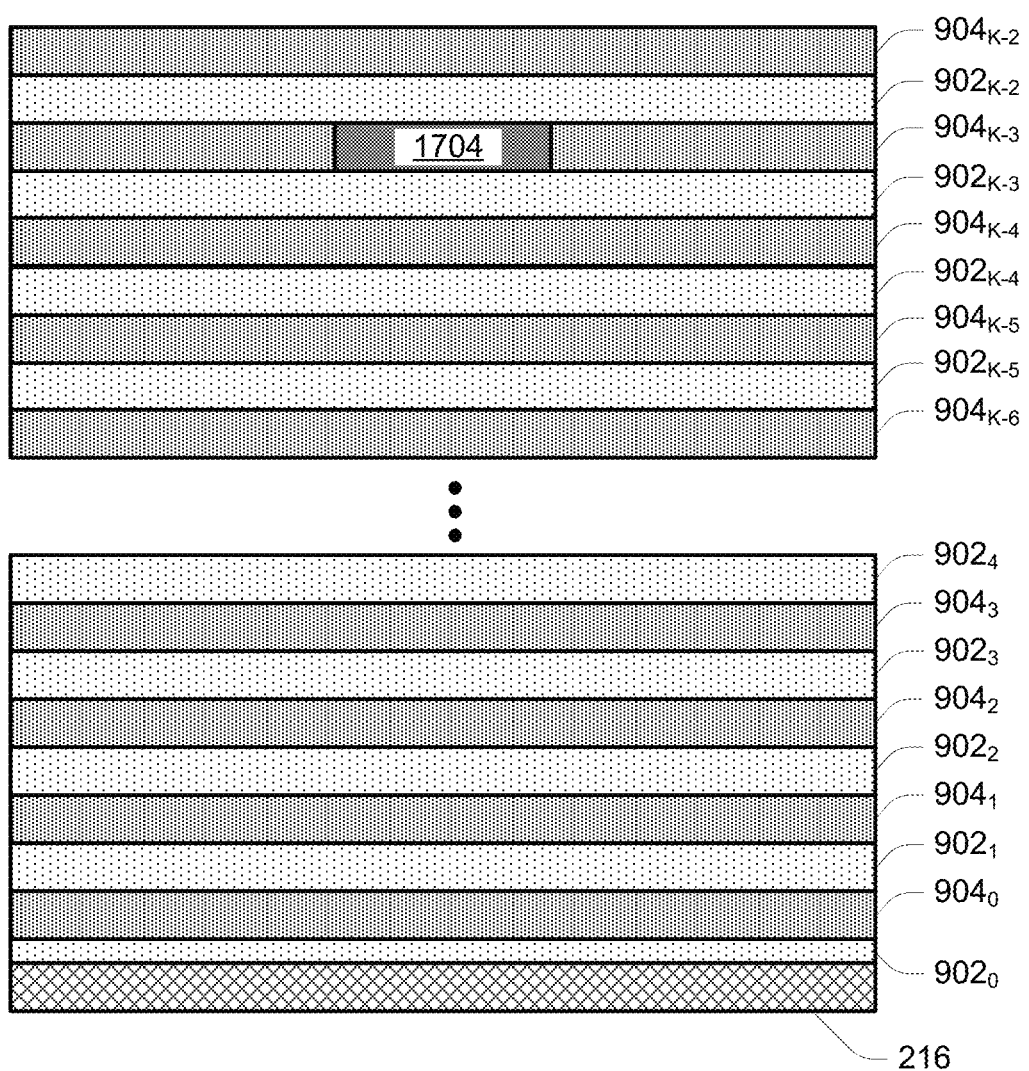

In FIG. 17B, a portion of the instance of sacrificial material $904_{K-3}$ might be doped. For example, a patterned mask 1702 might be formed overlying (e.g., on) the instance of sacrificial material $904_{K-3}$ to expose a portion of the sacrificial material $904_{K-3}$. The mask 1702 might represent a mask formed using a photolithographic process. A doped region 1704 of the instance of sacrificial material $904_{K-3}$ might be formed by implanting a dopant species, e.g., carbon, into the exposed portion of the instance of sacrificial material $904_{K-3}$. As is well understood in the art, such implantation might commonly involve acceleration of ions directed at a surface of the instance of sacrificial material $904_{K-3}$ such as conceptually depicted by arrows 1706. Other methods of forming doped regions are known and embodiments herein are not limited to any method of forming the doped region 1704. The dopant species might be selected such that upon subsequent removal of the instances of sacrificial material 904, the doped region 904 of the instance of sacrificial material $904_{K-3}$ might remain. In this manner, the doped region 1704 might act to prevent a control gate (e.g., conductor 924) from forming around a corresponding channel material 918 without removing a portion of the instance of sacrificial material $904_{K-3}$ as described with reference to FIG. 16B In FIG. 17C, an instance of dielectric $902_{K-2}$ might be formed overlying the instance of sacrificial material $904_{K-3}$ and the doped region of the instance of sacrificial material $904_{K-3}$, and an instance of sacrificial material $904_{K-2}$ might be formed overlying the instance of dielectric $902_{K-2}$.

Figure 17D:
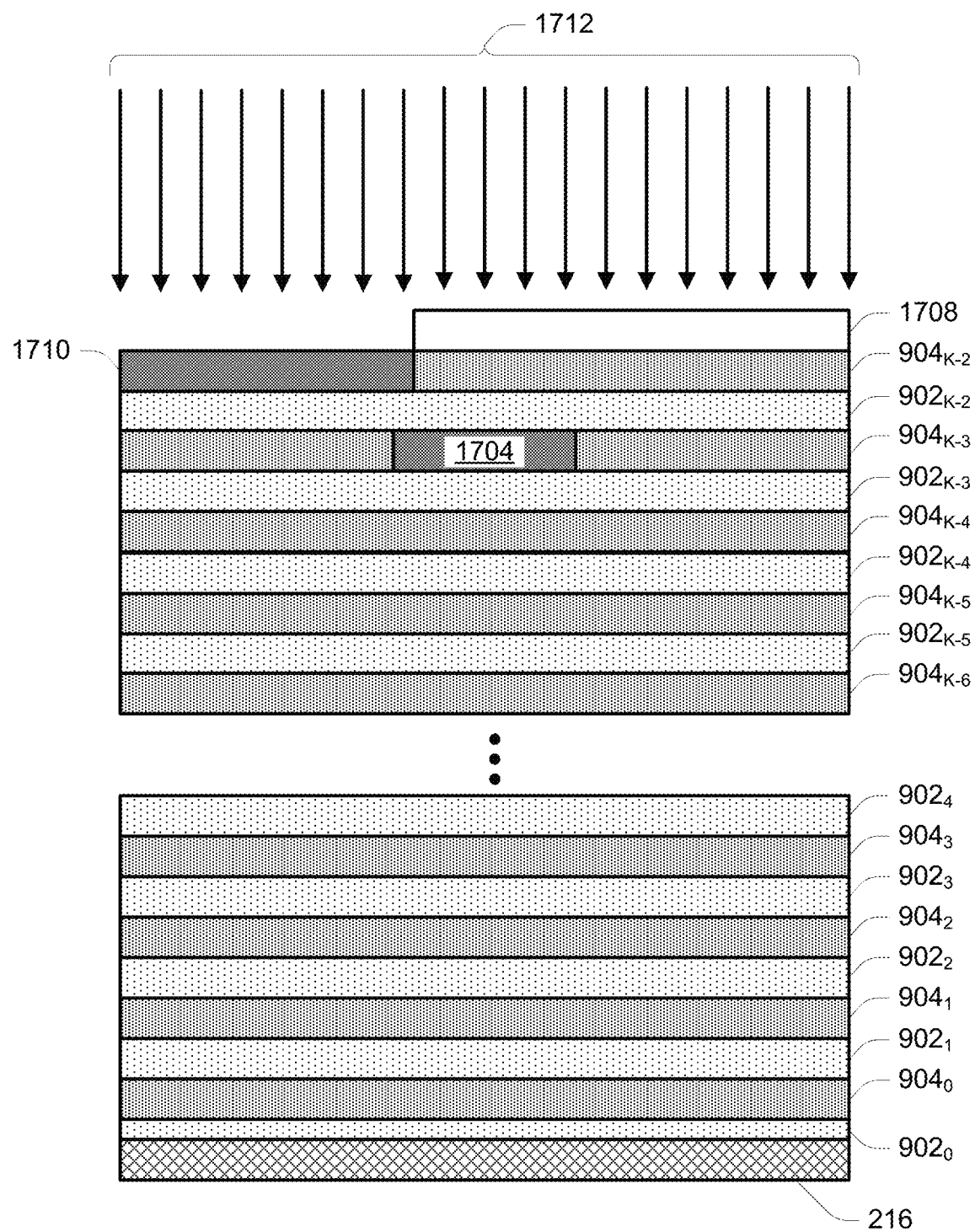

In FIG. 17D, a portion of the instance of sacrificial material $904_{K-2}$ might be doped. For example, a patterned mask 1708 might be formed overlying (e.g., on) the instance of sacrificial material $904_{K-2}$ to expose a portion of the instance of sacrificial material $904_{K-2}$. The mask 1708 might represent a mask formed using a photolithographic process. A doped region 1710 of the instance of sacrificial material $904_{K-2}$ might be formed by implanting a dopant species, e.g., carbon, into the exposed portion of the instance of sacrificial material $904_{K-2}$. As is well understood in the art, such implantation might commonly involve acceleration of ions directed at a surface of the instance of sacrificial material $904_{K-2}$ such as conceptually depicted by arrows 1712. Other methods of forming doped regions are known and embodiments herein are not limited to any method of forming the doped region 1710. The dopant species might be selected such that upon subsequent removal of the instances of sacrificial material 904, the doped region 904 of the instance of sacrificial material $904_{K-2}$ might remain. In this manner, the doped region 1710 might act to prevent a control gate (e.g., conductor 924) from forming around a corresponding channel material 918 without removing a portion of the instance of sacrificial material $904_{K-2}$ as described with reference to FIG. 16D. Further processing might proceed as described with reference to FIGS. 16E-16O.

Figure 18:
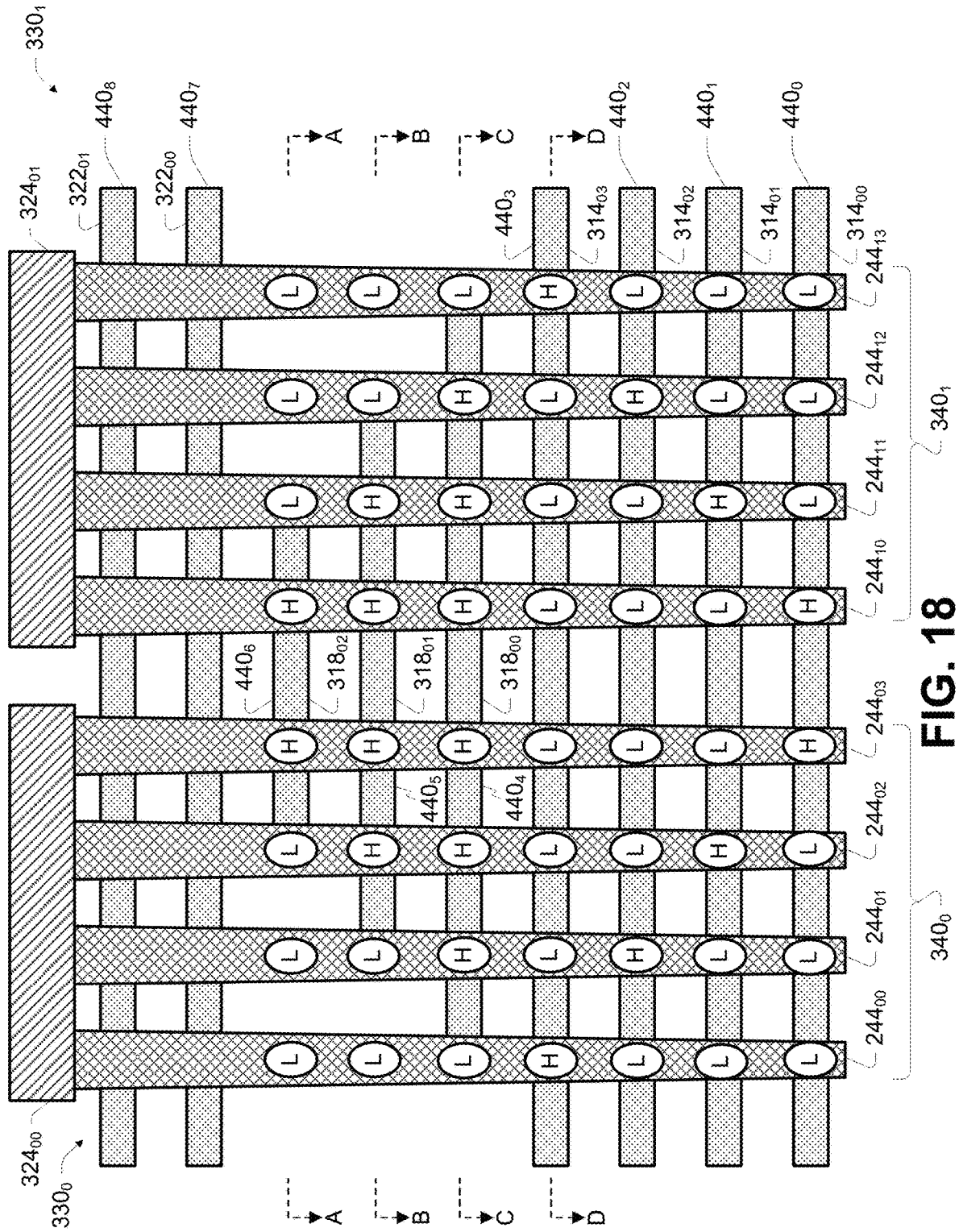
FIG. 18 depicts a conceptualized representation of a cross-sectional view of a portion of an array structure in accordance with another embodiment.

FIG. 18 depicts a conceptualized representation of a cross-sectional view of a portion of an array structure in accordance with another embodiment. Like numbered elements in FIG. 18 correspond to the description as provided with respect to FIG. 4. For example, the structure of FIG. 18 might correspond to a portion of two decks of memory cells 330. FIG. 18 depicts a staircase configuration of the conductors 440 corresponding to the select lines 318, select lines $318_{00}$-$318_{02}$.

The pre-configured select gates 316 associated with the select line $318_{02}$ and corresponding to the channel material structures $244_{00}$, $244_{01}$, $244_{02}$, $244_{11}$ $244_{12}$, and $244_{13}$ (e.g., having channels in one of those channel material structures 244) might be fabricated to have the first (low) threshold voltage, e.g., indicated by the "L" designation in FIG. 18, and might remain at the first threshold voltage following programming of other pre-configured select gates 316 associated with the select line $318_{02}$. The pre-configured select gates 316 associated with the select line $318_{02}$ and corresponding to the channel material structures $244_{03}$ and $244_{10}$ might be fabricated to have the first (low) threshold voltage and might be subsequently programmed to have the second (high) threshold voltage, e.g., indicated by the "H" designation in FIG. 18.

The pre-configured select gates 316 associated with the select line $318_{01}$ and corresponding to the channel material structures $244_{00}$, $244_{01}$, $244_{12}$, and $244_{13}$ (e.g., having channels in one of those channel material structures 244) might be fabricated to have the first (low) threshold voltage, e.g., indicated by the "L" designation in FIG. 18, and might remain at the first threshold voltage following programming of other pre-configured select gates 316 associated with the select line $318_{01}$. The pre-configured select gates 316 associated with the select line $318_{01}$ and corresponding to the channel material structures $244_{02}$, $244_{03}$, $244_{10}$, and $244_{11}$ might be fabricated to have the first (low) threshold voltage and might be subsequently programmed to have the second (high) threshold voltage, e.g., indicated by the "H" designation in FIG. 18.

The pre-configured select gates 316 associated with the select line $318_{00}$ and corresponding to the channel material structures $244_{00}$ and $244_{13}$ might be fabricated to have the first (low) threshold voltage, e.g., indicated by the "L" designation in FIG. 18, and might remain at the first threshold voltage following programming of other pre-configured select gates 316 associated with the select line $318_{00}$. The pre-configured select gates 316 associated with the select line $318_{00}$ and corresponding to the channel material structures $244_{01}$, $244_{02}$, $244_{03}$, $244_{10}$, $244_{11}$, and $244_{12}$ might be fabricated to have the first (low) threshold voltage and might be subsequently programmed to have the second (high) threshold voltage, e.g., indicated by the "H" designation in FIG. 18.

FIGS. 19A-19D depict representations of top views of sections of the array structure depicted in FIG. 18. FIG. 19A is taken at the line A-A of FIG. 18, FIG. 19B is taken at the line B-B of FIG. 18, FIG. 19C is taken at the line C-C of FIG. 18, and FIG. 19D is taken at the line D-D of FIG. 18.

As can be seen in FIG. 19A, the conductor $440_6$, e.g., the select line $318_{02}$, might sufficiently (e.g., fully) surround the channel material structure $244_{03}$ of the cluster of strings of series-connected memory cells $340_0$ and might sufficiently (e.g., fully) surround the channel material structure $244_{10}$ of the cluster of strings of series-connected memory cells $340_1$. However, the conductor $440_6$ might not sufficiently surround the channel material structure $244_{02}$ of the cluster of strings of series-connected memory cells $340_0$ or the channel material structure $244_{11}$ of the cluster of strings of series-connected memory cells $340_1$. That is, under normal operating conditions for a programming operation, such as would be used in the programming of any of the memory cells 208, a conductor 440 does not sufficiently surround a channel material structure 244 if it is not expected to be capable of increasing a threshold voltage of a corresponding pre-configured select gate 316 to the second threshold voltage during a programming operation on its associated select line 318.

Similarly, the conductor $440_6$ might not make any connection to the channel material structures $244_{00}$ and $244_{01}$ of the cluster of strings of series-connected memory cells $340_0$ or the channel material structures $244_{12}$ and $244_{13}$ of the cluster of strings of series-connected memory cells $340_1$, such that it also might not sufficiently surround these channel material structures 244. As such, the pre-configured select gates 316 corresponding to the channel material structures $244_{03}$ and $244_{10}$ at the level of the conductor $440_6$ might have programmable threshold voltages, while the pre-configured select gates 316 corresponding to the channel material structures $244_{00}$, $244_{01}$, $244_{02}$, $244_{11}$, $244_{12}$ and $244_{13}$ at the level of the conductor $440_6$ might have non-programmable threshold voltages under normal operating conditions.

As can be seen in FIG. 19B, the conductor $440_5$, e.g., the select line $318_{01}$, might sufficiently (e.g., fully) surround the channel material structures $244_{02}$ and $244_{03}$ of the cluster of strings of series-connected memory cells $340_0$ and might sufficiently (e.g., fully) surround the channel material structures $244_{10}$ and $244_{11}$ of the cluster of strings of series-connected memory cells $340_1$. However, the conductor $440_5$ might not sufficiently surround the channel material structure $244_{01}$ of the cluster of strings of series-connected memory cells $340_0$ or the channel material structure $244_{12}$ of the cluster of strings of series-connected memory cells $340_1$. As such, the pre-configured select gates 316 corresponding to the channel material structures $244_{02}$, $244_{03}$, $244_{10}$, and $244_{11}$ at the level of the conductor $440_5$ might have programmable threshold voltages, while the pre-configured select gates 316 corresponding to the channel material structures $244_{00}$, $244_{01}$, $244_{12}$, and $244_{13}$ at the level of the conductor $440_5$ might have non-programmable threshold voltages under normal operating conditions.

As can be seen in FIG. 19C, the conductor $440_4$, e.g., the select line $318_{00}$, might sufficiently (e.g., fully) surround the channel material structures $244_{01}$, $244_{02}$, and $244_{03}$ of the cluster of strings of series-connected memory cells $340_0$ and might sufficiently (e.g., fully) surround the channel material structures $244_{10}$, $244_{11}$, and $244_{12}$ of the cluster of strings of series-connected memory cells $340_1$. As such, the select gates 316 corresponding to the channel material structures $244_{01}$, $244_{02}$, $244_{03}$, $244_{10}$, $244_{11}$, and $244_{12}$ at the level of the conductor $440_4$ might have programmable threshold voltages, while the pre-configured select gates 316 corresponding to the channel material structures $244_{00}$ and $244_{13}$ at the level of the conductor $440_5$ might have non-programmable threshold voltages under normal operating conditions.

As can be seen in FIG. 19D, the conductor $440_3$, e.g., the select line 31403, might sufficiently (e.g., fully) surround the channel material structures $244_{00}$, $244_{01}$, $244_{02}$, and $244_{03}$ of the cluster of strings of series-connected memory cells $340_0$ and might sufficiently (e.g., fully) surround the channel material structures $244_{10}$, $244_{11}$, $244_{12}$, and $244_{13}$ of the cluster of strings of series-connected memory cells $340_1$. As such, the select gates 312 corresponding to the channel material structures $244_{00}$, $244_{01}$, $244_{02}$, $244_{03}$, $244_{10}$, $244_{11}$, $244_{12}$, and $244_{13}$ at the level of the conductor $440_3$ might have programmable threshold voltages under normal operating conditions. The structure of FIG. 19D might further represent the structure for other levels, such as other select lines 314, access lines 202, and select lines 322.

Programming of the pre-configured select gates 316 might proceed by applying an enable voltage to the corresponding data lines 204 (not shown in FIG. 18), applying pass voltages to any transistors between the pre-configured select gates 316 and the data line 204 to activate those transistors, and applying programming voltage levels to the associated select lines 318. In the example of FIG. 18, programmable pre-configured select gates 316 associated with the select lines $318_{00}$, $318_{01}$, and $318_{02}$ might be programmed concurrently, or they might be programmed sequentially by programming programmable pre-configured select gates 316 associated with one select line 318 and then programming programmable pre-configured select gates 316 associated with remaining select lines 318 in sequence. The programming might involve an iterative programming operation, e.g., applying increasingly higher programming voltages to a select line 318 followed by a verification to determine if the select gates 316 have a desired threshold voltage. Alternatively, given that each select gate 316 associated with a single select line 318 need only have a threshold voltage lower than some particular voltage level or a threshold voltage higher than the particular voltage level, the iterative process might be avoided by selecting a sufficiently high programming voltage such that each programmable pre-configured select gate 316 receiving that programming voltage at its control gate during its programming operation would be expected to have a resulting threshold voltage higher than the particular voltage level, e.g., the second threshold voltage.

Following programming of the pre-configured select gates 316, the select gates 312 might be programmed. Selective programming of the select gates 312 might be facilitated by the pre-configured select gates 316. For example, the pre-configured select gates 316 corresponding to conductor $440_3$ and channel material structures $244_{00}$ and $244_{13}$ first might be programmed by applying a logic low control signal to conductors $440_4$, $440_5$, and $440_6$ and a programming voltage to conductor $440_3$ with other conductors receiving control signals configured to activate their corresponding transistors. The pre-configured select gates 316 corresponding to conductor $440_2$ and channel material structures $244_{01}$ and $244_{12}$ then might be programmed by applying a logic low control signal to conductors $440_3$, $440_5$, and $440_6$, a logic high control signal to conductor $440_4$, and a programming voltage to conductor $440_2$ with other conductors receiving control signals configured to activate their corresponding transistors. The pre-configured select gates 316 corresponding to conductor $440_1$ and channel material structures $244_{02}$ and $244_{11}$ then might be programmed by applying a logic low control signal to conductors $440_2$, $440_3$, and $440_6$, a logic high control signal to conductors $440_4$ and $440_5$, and a programming voltage to conductor $440_1$ with other conductors receiving control signals configured to activate their corresponding transistors. The pre-configured select gates 316 corresponding to conductor $440\backslash 0$ and channel material structures $244_{03}$ and $244_{10}$ then might be programmed by applying a logic low control signal to conductors $440_1$, $440_2$, and $440_3$, a logic high control signal to conductors $440_4$, $440_5$, and $440_6$, and a programming voltage to conductor $440_0$ with other conductors receiving control signals configured to activate their corresponding transistors.

Figure 20:
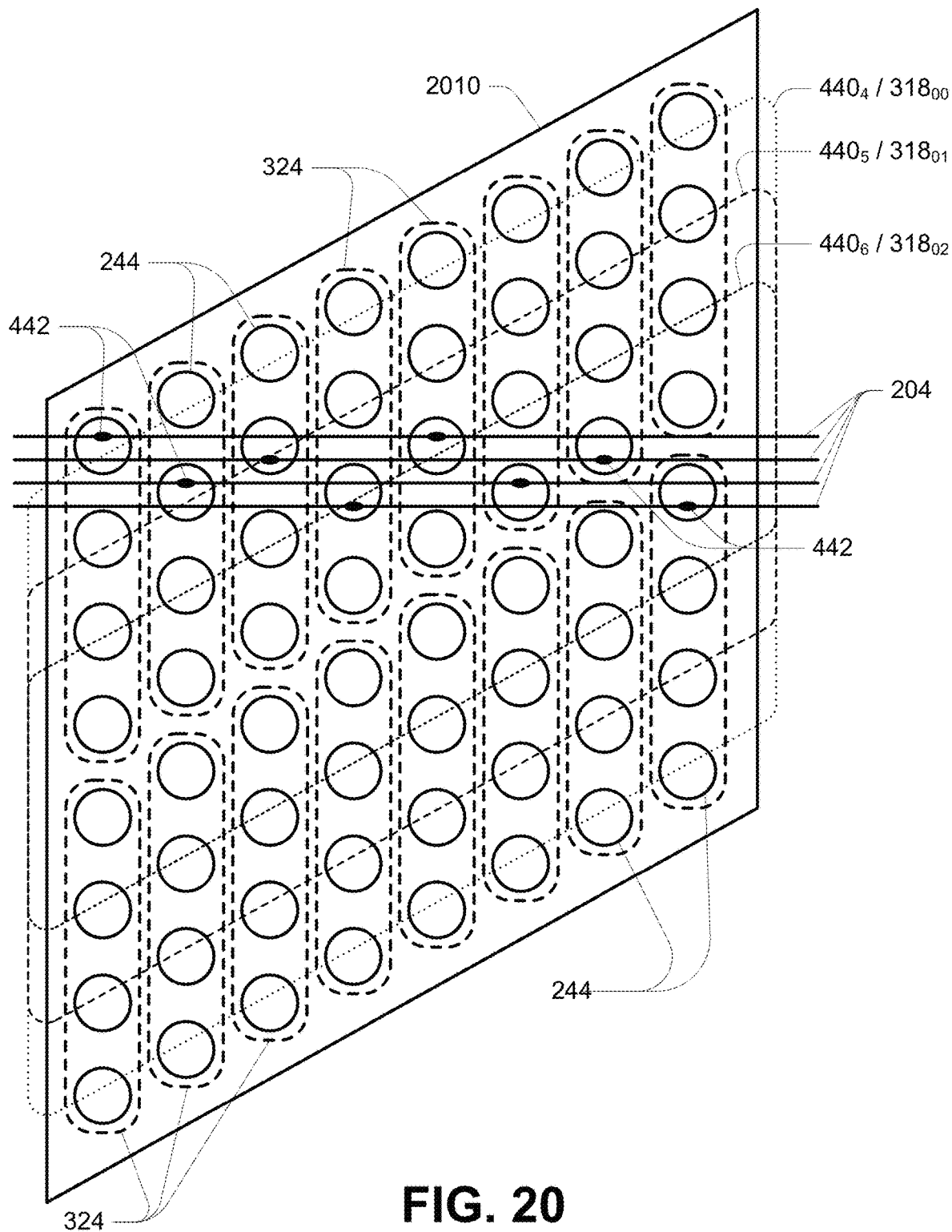
FIG. 20 depicts a conceptualized top view of an array layout in accordance with an embodiment.

FIG. 20 depicts a conceptualized top view of an array layout in accordance with an embodiment. FIG. 20 depicts one possible array layout of clusters of strings of series-connected memory cells containing four NAND strings, regardless of the number of decks of memory cells. FIG. 20 depicts one possible arrangement of four data lines 204. Each data line 204 might be connected to a respective conductive element 324, e.g., a top-most conductive element 324, through a respective contact 442. Additional data lines 204 might be similarly arranged to make contact to other conductive elements 324 of FIG. 20, but such data lines 204 are omitted for clarity. FIG. 20 further depicts a placement of portions of the conductors $440_4$, $440_5$, and $440_6$, e.g., select lines $318_{00}$, $318_{01}$, and $318_{02}$, respectively, of the example of FIGS. 19A-19C in dashed lines.

FIG. 20 might depict one block of memory cells having a block boundary 2010. While FIG. 20 depicts sixteen clusters of strings of series-connected memory cells, each containing four NAND strings, blocks of memory cells might contain fewer or more clusters of strings of series-connected memory cells, and each cluster might contain fewer or more four strings of series-connected memory cells. During the removal of the instances of sacrificial material and the forming of control gate structures, access might be made on the left or right side of the block boundary 2010 of FIG. 20.

FIGS. 21A-21I depict cross-sectional views of a memory array structure during various stages of fabrication in accordance with embodiments. FIGS. 21A-21I might depict a portion of formation of a deck of memory cells having its channel material structures connected to the common source such as described with reference to FIGS. 16A-16O. The embodiment of FIGS. 17A-17D might represent a structure of FIGS. 18 and 19A-19D in relation to the select lines 318. Like numbered elements in FIGS. 21A-21I correspond to the description as provided with respect to FIGS. 16A-16O.

Figure 21A:
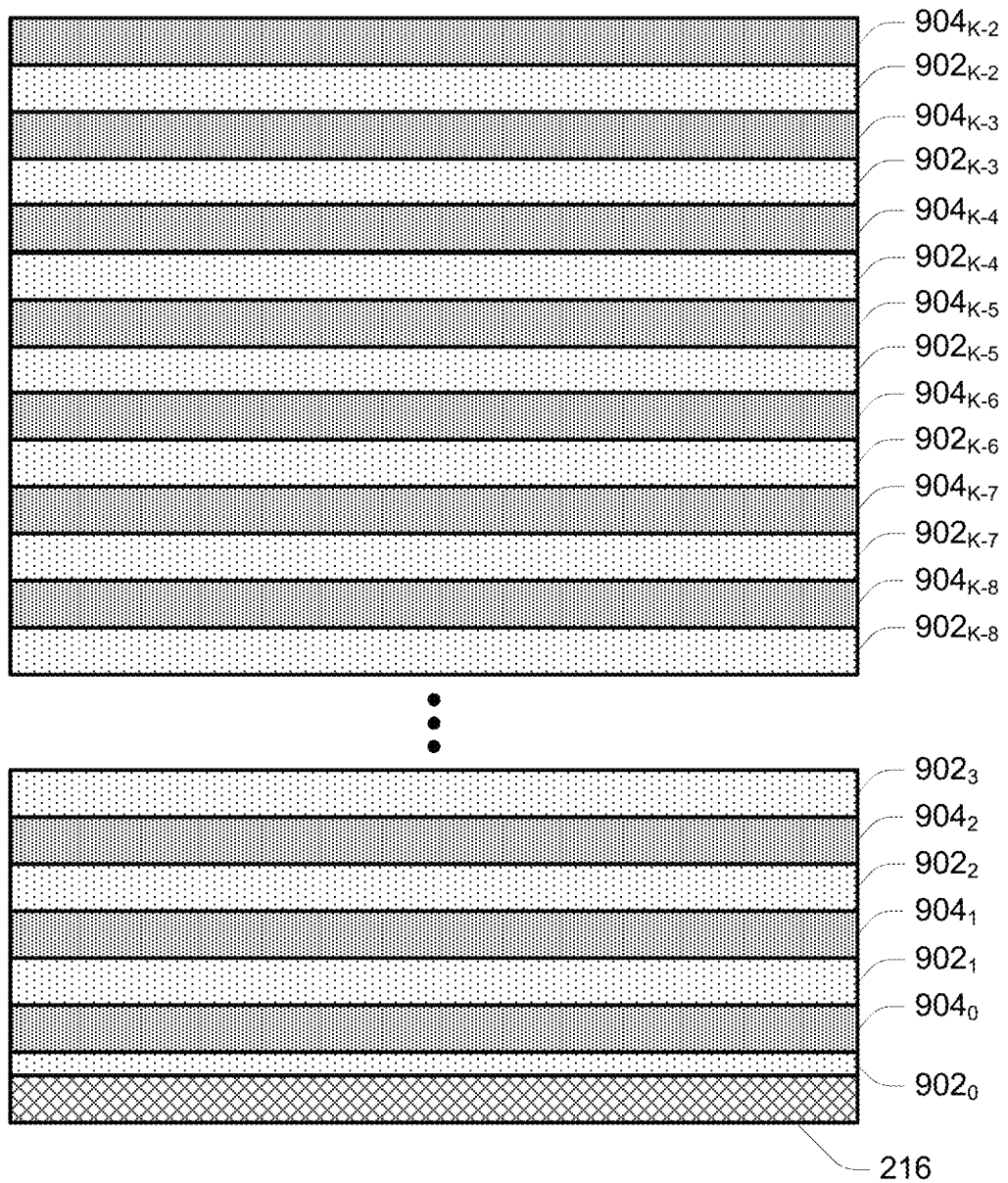
FIGS. 21A-21I depict cross-sectional views of a memory array structure during various stages of fabrication in accordance with embodiments.

In FIG. 21A, K−1 instances of a dielectric 902 (e.g., $902_0$ to $902_{K-2}$) and K−1 instances of a sacrificial material 904 (e.g., $904_0$ to $904_{K-2}$) might be formed in an alternating manner. Although instances of the dielectric $902_4$-$902_{K-9}$, and instances of sacrificial material $904_3$-$904_{K-9}$, are not explicitly depicted in the figures, it will be understood that these instances of the dielectric 902 and of the sacrificial material 904 could also be formed in an alternating manner as depicted in the figures. The instance of the dielectric $902_0$ could be formed overlying a common source 216 or formed on a contact (not shown) to the common source 216.

The value K+1 might represent the number of transistors to be formed around a channel material structure 244 between a connection to a common source 216 and a conductive element 324. The instances of the dielectric 902 might each contain one or more dielectric materials. The instances of dielectric 902 might comprise, consist of, or consist essentially of an oxide, e.g., silicon dioxide ($SiO_2$), and/or might comprise, consist of, or consist essentially of a high-K dielectric material, such as aluminum oxides ($AlO_x$), hafnium oxides ($HfO_x$), hafnium aluminum oxides ($HfAlO_x$), hafnium silicon oxides ($HfSiO_x$), lanthanum oxides ($LaO_x$), tantalum oxides ($TaO_x$), zirconium oxides ($ZrO_x$), zirconium aluminum oxides ($ZrAlO_x$), or yttrium oxide ($Y_2O_3$), as well as any other dielectric material. High-K dielectrics as used herein means a material having a dielectric constant greater than that of silicon dioxide. The instances of dielectric 902 might further comprise, consist of, or consist essentially of a spin-on dielectric material, e.g., hydrogen silsesquioxane (HSQ), hexamethyldisiloxane, octamethyltrisiloxane, etc., or a high-density-plasma (HDP) oxide. The instances of dielectric 902 might further comprise, consist of, or consist essentially of any other dielectric material. As one example, the instances of the dielectric 902 might contain silicon dioxide.

The instances of the sacrificial material 904 might contain a material that can be subjected to removal without significantly affecting the material(s) of the dielectric 902. As one example, the instances of the sacrificial material 904 might contain silicon nitride for instances of the dielectric 902 containing silicon dioxide. Additional instances of the dielectric 902 and instances of the sacrificial material 904 might be formed, depending upon the number of transistors intended to be formed, e.g., memory cells, dummy memory cells, GIDL generator gates, select gates and pre-configured select gates.

Figure 21B:
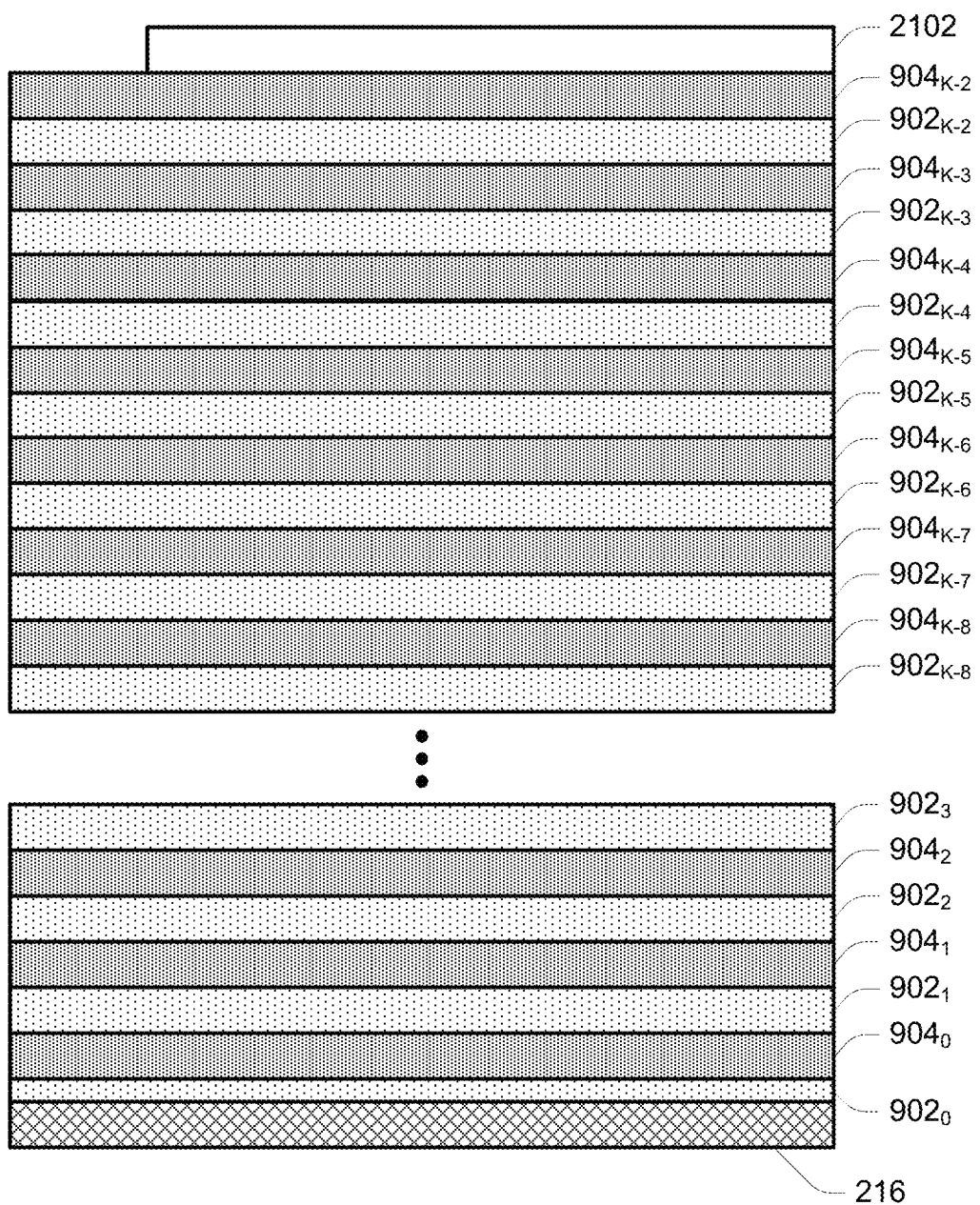
Figure 21C:
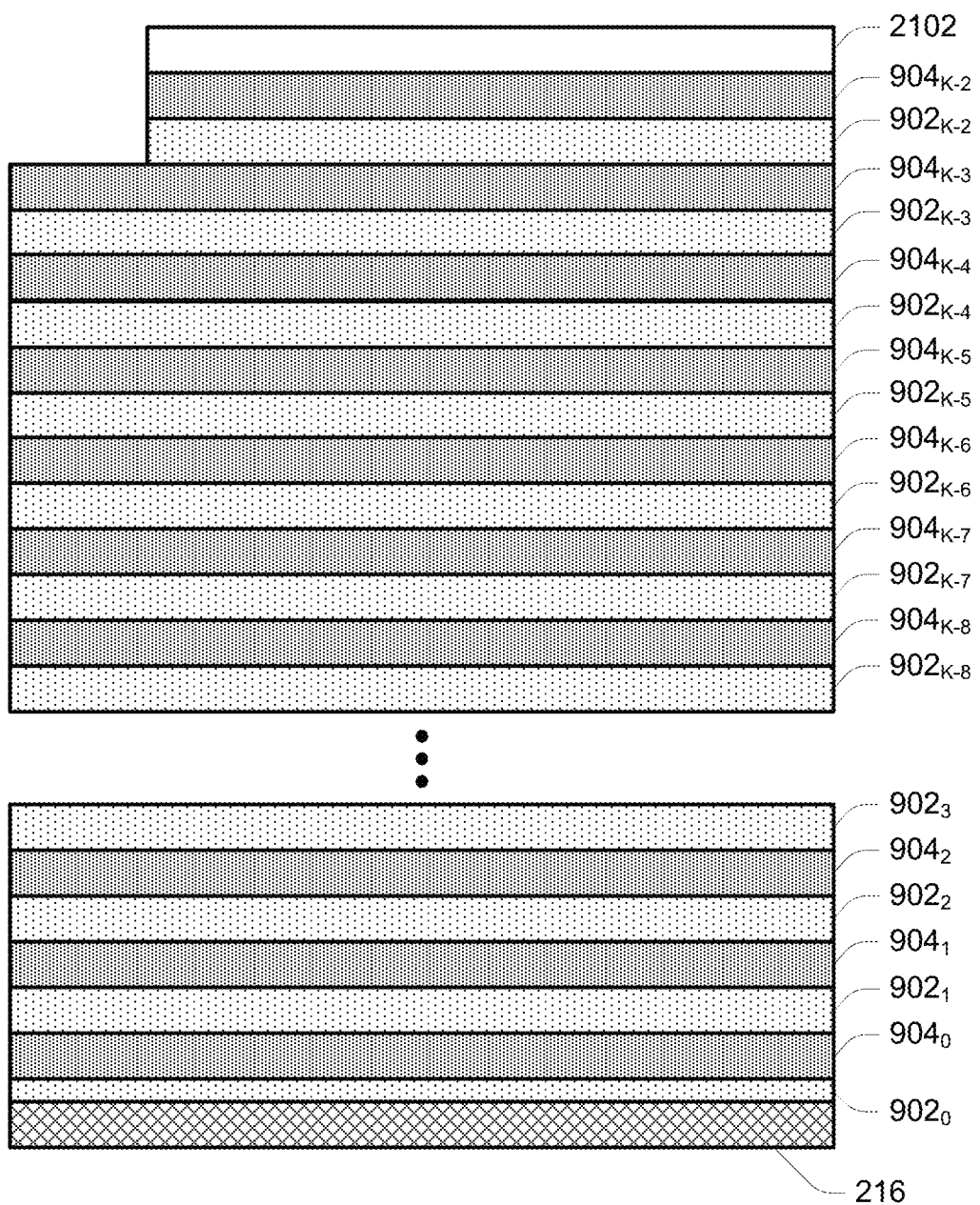

In FIG. 21B, a patterned mask 2102 might be formed overlying the instance of sacrificial material $904_{K-2}$ to expose a portion of the sacrificial material $904_{K-2}$. The patterned mask 2102 might represent a mask formed using a photolithographic process. In FIG. 21C, a portion of the instance of sacrificial material $904_{K-2}$, and a portion of the instance of dielectric $902_{K-2}$ might be removed. For example, an anisotropic removal process, e.g., reactive ion etching (RIE), might be used for a time expected to remove the portion of the instance of sacrificial material $904_{K-2}$. Note that while FIG. 21C depicts the portion of the instance of dielectric $902_{K-2}$ to be completely removed, exposing a portion of the instance of sacrificial material $904_{K-3}$, some of the instance of dielectric $902_{K-2}$ might remain overlying the portion of the instance of sacrificial material $904_{K-3}$ not underlying the instance of sacrificial material $904_{K-2}$.

Figure 21D:
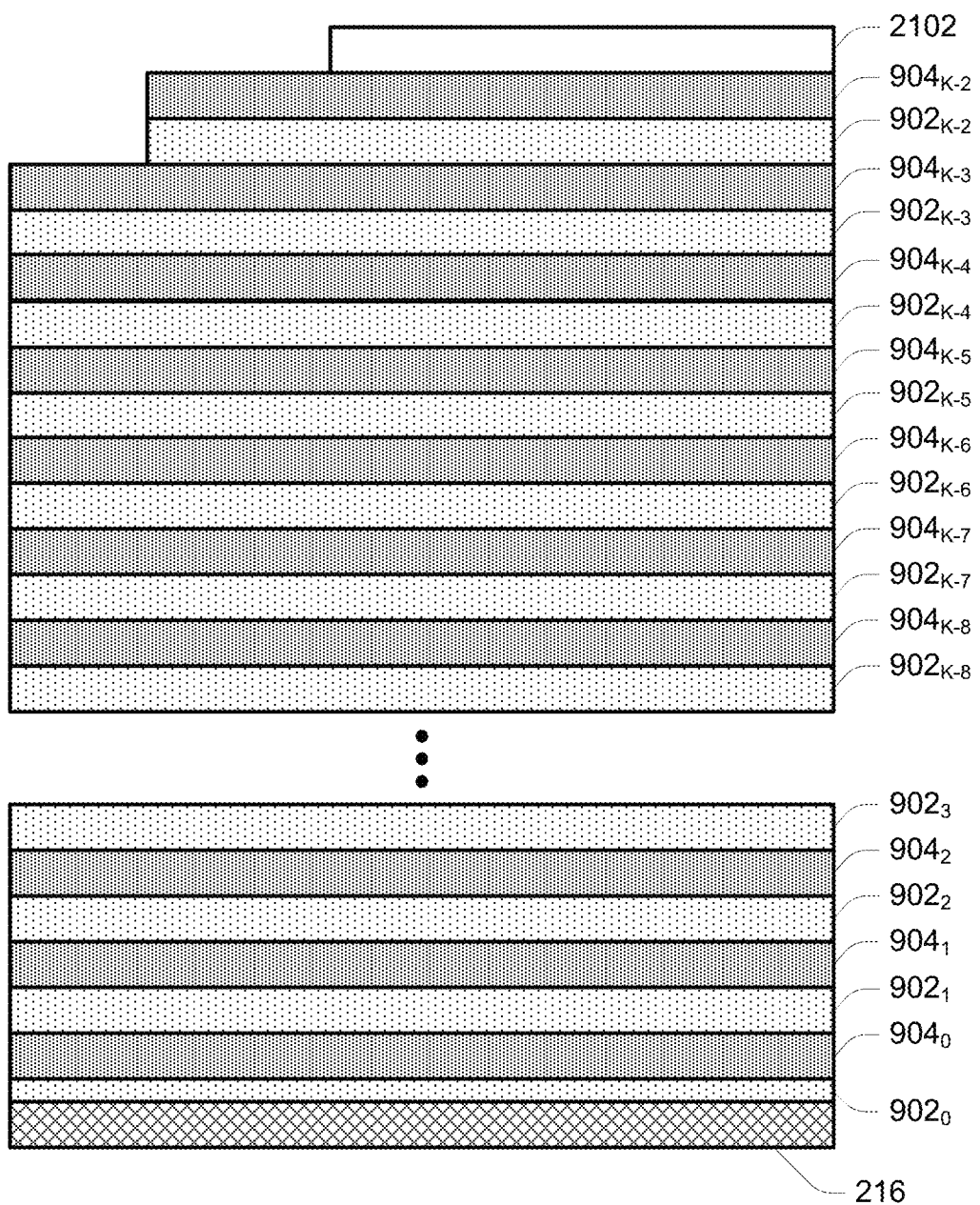
Figure 21E:
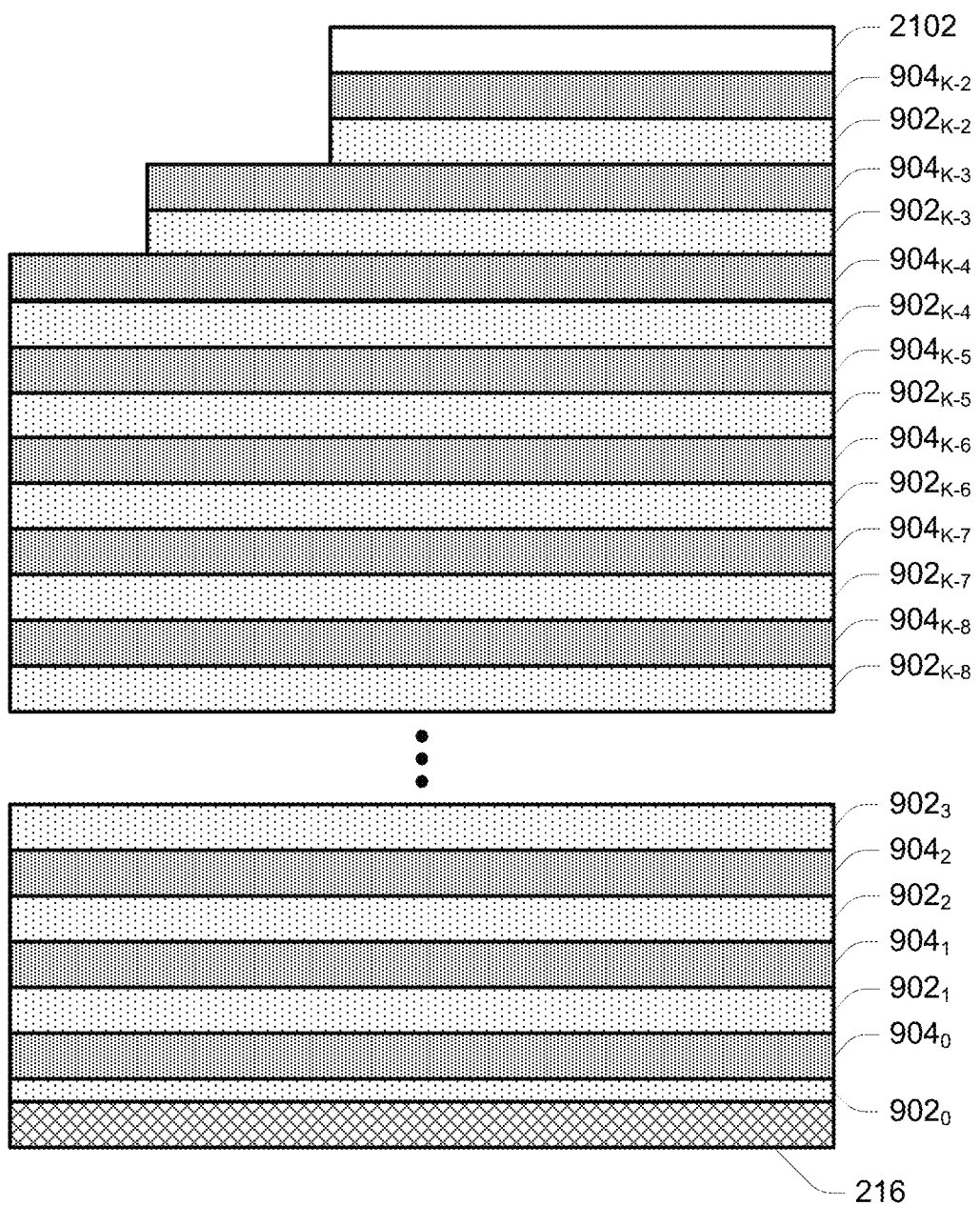

In FIG. 21D, the patterned mask 2102 might be recessed to expose an additional portion of the sacrificial material $904_{K-2}$. In FIG. 21E, the additional portion of the instance of sacrificial material $904_{K-2}$, and an additional portion of the instance of dielectric $902_{K-2}$ might be removed. In addition, a portion of the instance of sacrificial material $904_{K-3}$, and a portion of the instance of dielectric $902_{K-3}$ might be removed. For example, an anisotropic removal process, e.g., reactive ion etching (RIE), might be used for a time expected to remove these portions of sacrificial material 904 and dielectric 902. Note that while FIG. 21E depicts portions of the instances of dielectric $902_{K-2}$ and $902_{K-3}$ to be completely removed, exposing corresponding portions of the instances of sacrificial material $904_{K-3}$ and $904_{K-4}$, some of the instance of dielectric $902_{K-2}$ might remain overlying the portion of the instance of sacrificial material $904_{K-3}$ not underlying the instance of sacrificial material $904_{K-2}$, and some of the instance of dielectric $902_{K-3}$ might remain overlying the portion of the instance of sacrificial material $904_{K-4}$ not underlying the instance of sacrificial material $904_{K-3}$.

Figure 21F:
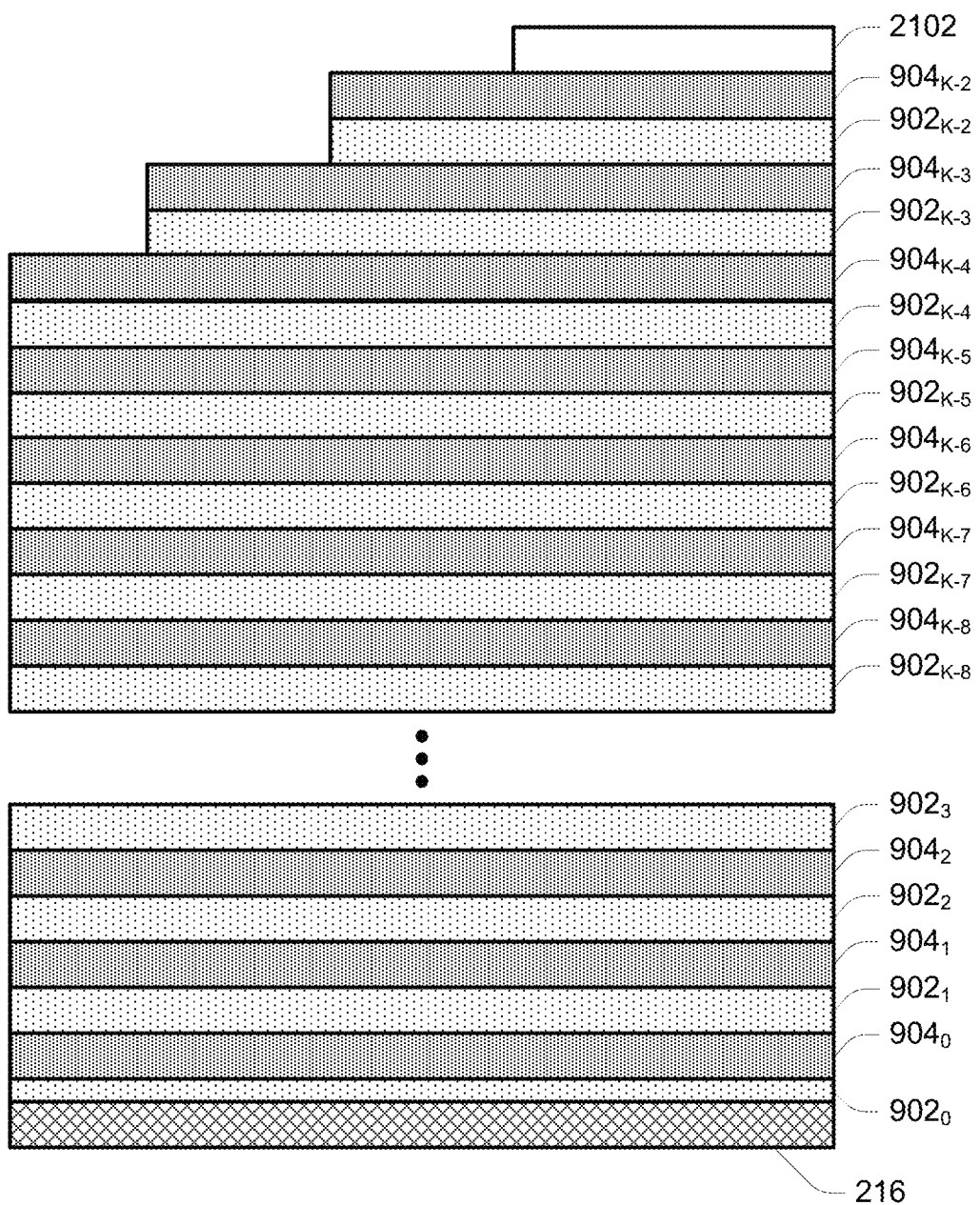
Figure 21G:
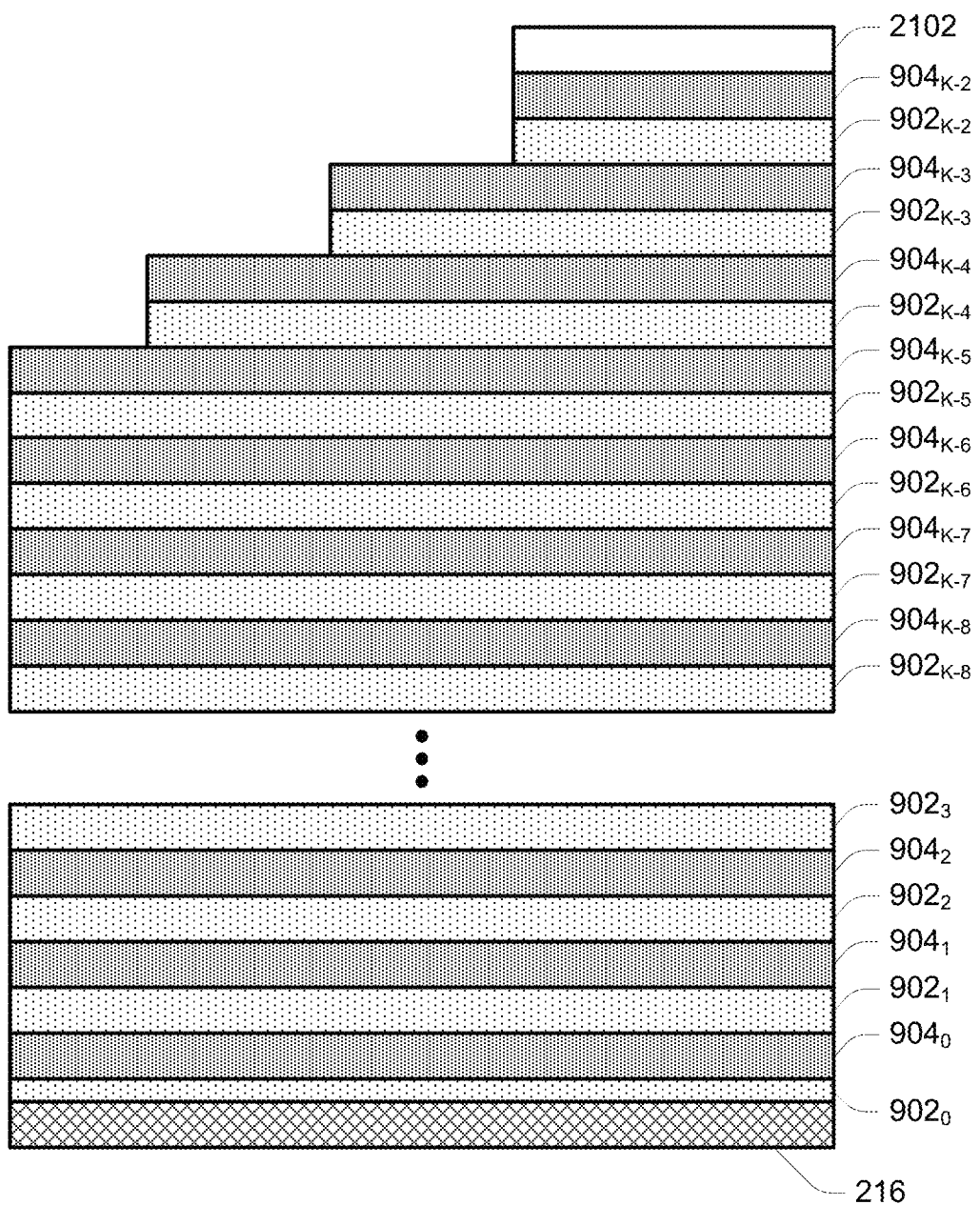
Figure 21H:
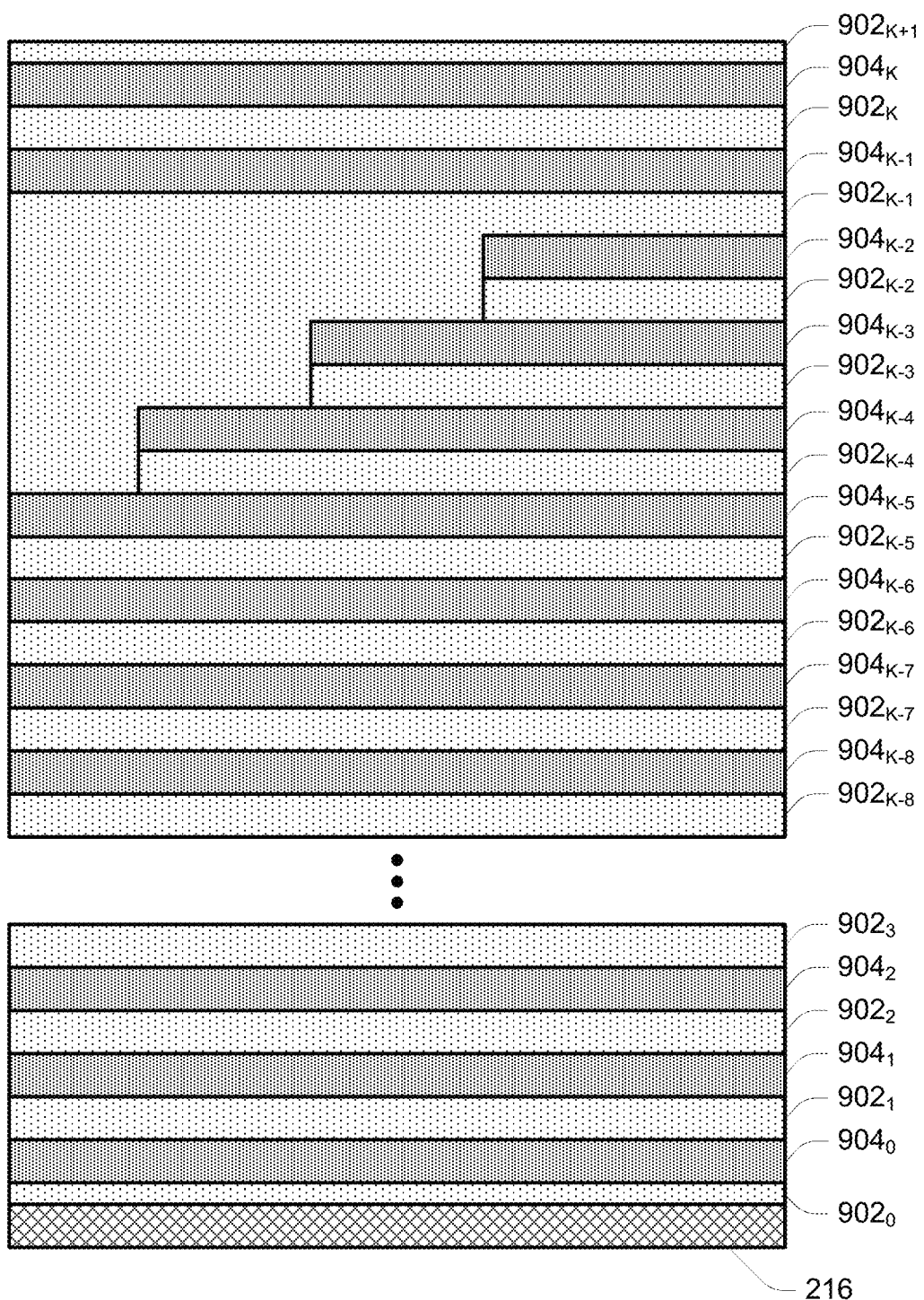

In FIG. 21F, the patterned mask 2102 might be recessed further to expose an additional portion of the sacrificial material $904_{K-2}$. In FIG. 21G, the additional portion of the instance of sacrificial material $904_{K-2}$, and an additional portion of the instance of dielectric $902_{K-2}$ might be removed. In addition, an additional portion of the instance of sacrificial material $904_{K-3}$, and an additional portion of the instance of dielectric $902_{K-3}$ might be removed. In addition, a portion of the instance of sacrificial material $904_{K-4}$, and a portion of the instance of dielectric $902_{K-4}$ might be removed. For example, an anisotropic removal process, e.g., reactive ion etching (RIE), might be used for a time expected to remove these portions of sacrificial material 904 and dielectric 902. Note that while FIG. 21G depicts portions of the instances of dielectric $902_{K-2}$, $902_{K-3}$, and $902_{K-4}$ to be completely removed, exposing corresponding portions of the instances of sacrificial material $904_{K-3}$, $904_{K-4}$, and $904_{K-5}$, some of the instance of dielectric $902_{K-2}$ might remain overlying the portion of the instance of sacrificial material $904_{K-3}$ not underlying the instance of sacrificial material $904_{K-2}$, some of the instance of dielectric $902_{K-3}$ might remain overlying the portion of the instance of sacrificial material $904_{K-4}$ not underlying the instance of sacrificial material $904_{K-3}$, and some of the instance of dielectric $902_{K-4}$ might remain overlying the portion of the instance of sacrificial material $904_{K-5}$ not underlying the instance of sacrificial material $904_{K-4}$.

In FIG. 21G, the mask 2102 might be removed, an instance of dielectric $902_{K-1}$ might be formed overlying the instances of sacrificial material $904_{K-2}$, $904_{K-3}$, $904_{K-4}$, and $904_{K-5}$, and instances of sacrificial material $904_{K-1}$ to $904_K$ and instances of dielectric $902_K$ to $902_{K+1}$ might be formed in an alternating fashion overlying the instance of dielectric $902_{K-1}$.

Figure 21I:
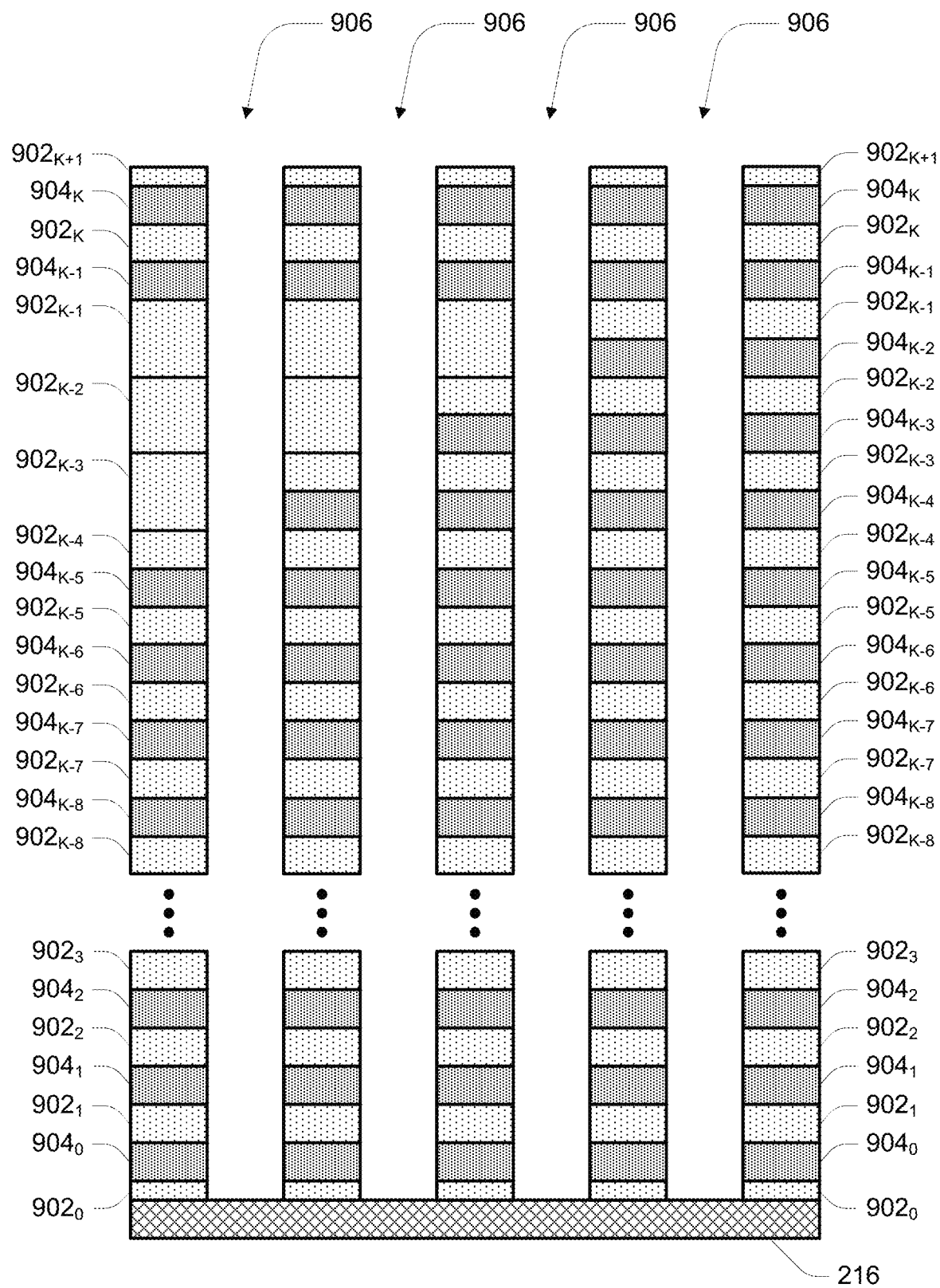

In FIG. 21I, vias 906 might be formed through the instances of the dielectric 902 and the instances of the sacrificial material 904. For example, an anisotropic removal process, e.g., reactive ion etching (RIE), might be used with the common source 216, or a contact (not depicted in FIG. 21I) to the common source 216, acting as an etch stop. As such, the vias 906 might extend through all instances of the dielectric 902 and through all instances of the sacrificial material 904, exposing portions of the common source 216. Further processing might proceed as described with reference to FIGS. 16G-16O.

Figure 22:
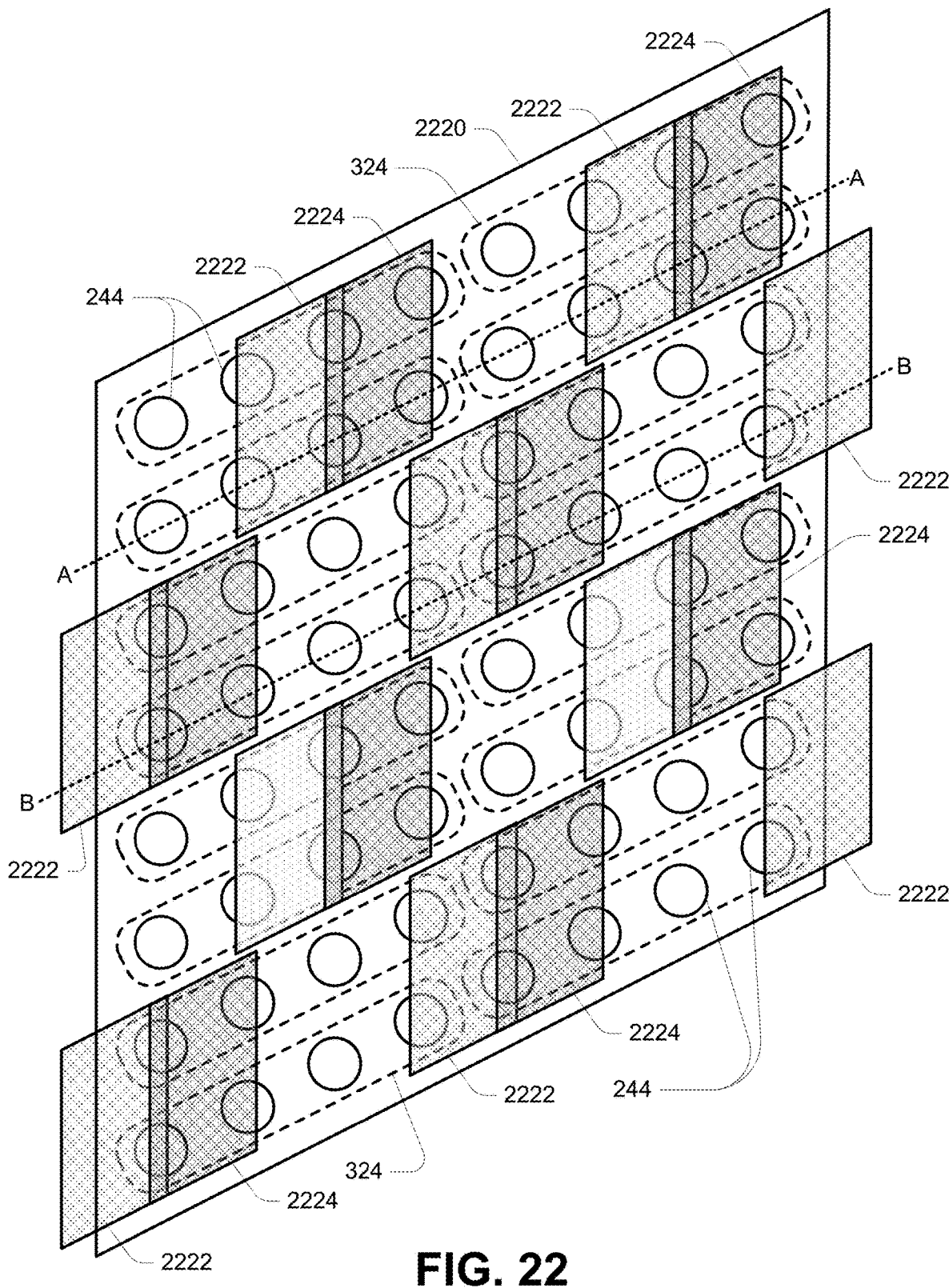
FIG. 22 depicts a conceptualized top view of an array layout in accordance with an embodiment.

FIG. 22 depicts a conceptualized top view of an array layout in accordance with an embodiment. FIG. 22 depicts one possible array layout of clusters of strings of series-connected memory cells containing four NAND strings, regardless of the number of decks of memory cells. FIG. 22 further depicts a placement of areas 2222 for removal of portions of one instance of sacrificial material 904, and a placement of areas 2224 for removal of portions of another instance of sacrificial material 904. Note that the areas 2222 and 2224 could further represent areas for doping portions of instances of sacrificial material 904 as discussed with reference to FIGS. 17A-17D. When replacing the instances of sacrificial material 904 with conductors 924, access for the removal of the instances of sacrificial material 904 might be made from any side of the array layout 2220, which might include access from more than one side of the array layout 2220.

Figure 23:
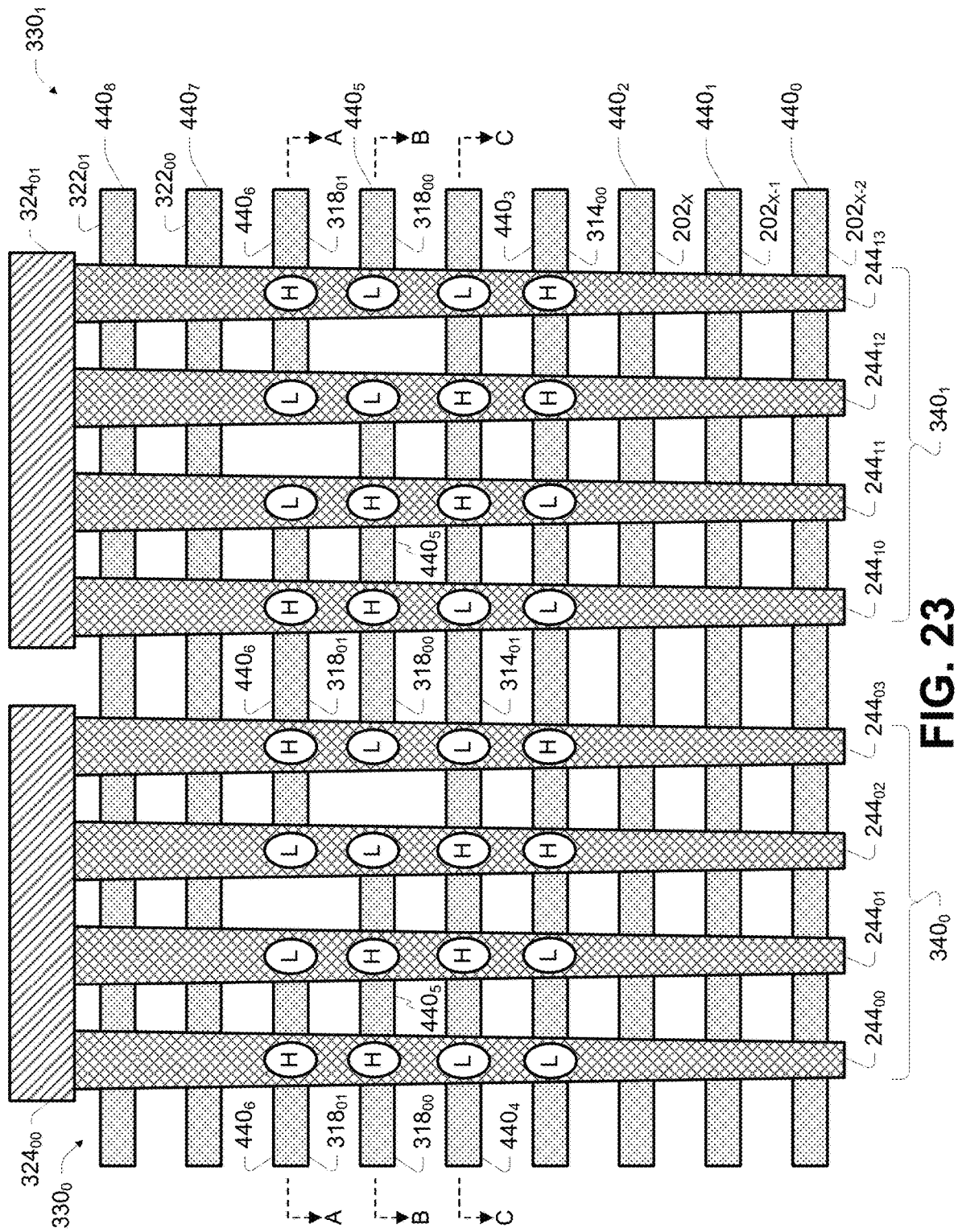
FIG. 23 depicts a conceptualized representation of a cross-sectional view of a portion of an array structure in accordance with another embodiment.

FIG. 23 depicts a conceptualized representation of a cross-sectional view of a portion of an array structure in accordance with the embodiment of FIG. 22 taken along line A-A of FIG. 22. For example, the structure of FIG. 23 might correspond to a portion of two decks of memory cells 330, each having a structure that might result from the placement of areas 2222 and 2224 for removal of portions of instances of sacrificial material 904 depicted in FIG. 22.

The pre-configured select gates 316 associated with the select line $318_{01}$ and corresponding to the channel material structures $244_{01}$, $244_{02}$, $244_{11}$, and $244_{12}$ (e.g., having channels in one of those channel material structures 244) might be fabricated to have the first (low) threshold voltage, e.g., indicated by the "L" designation in FIG. 23, and might remain at the first threshold voltage following programming of other pre-configured select gates 316 associated with the select line $318_{01}$. The pre-configured select gates 316 associated with the select line $318_{01}$ and corresponding to the channel material structures $244_{00}$, $244_{03}$, $244_{10}$, and $244_{13}$ might be fabricated to have the first (low) threshold voltage and might be subsequently programmed to have the second (high) threshold voltage, e.g., indicated by the "H" designation in FIG. 23.

The pre-configured select gates 316 associated with the select line $318_{00}$ and corresponding to the channel material structures $244_{02}$, $244_{03}$, $244_{12}$, and $244_{13}$ might be fabricated to have the first (low) threshold voltage, e.g., indicated by the "L" designation in FIG. 23, and might remain at the first threshold voltage following programming of other pre-configured select gates 316 associated with the select line $318_{00}$. The pre-configured select gates 316 associated with the select line $318_{00}$ and corresponding to the channel material structures $244_{00}$, $244_{01}$, $244_{10}$, and $244_{11}$ might be fabricated to have the first (low) threshold voltage and might be subsequently programmed to have the second (high) threshold voltage, e.g., indicated by the "H" designation in FIG. 23.

Following programming of the pre-configured select gates 316, the select gates 312 might be programmed in a manner similar to that described with reference to FIG. 5, where the channel material structures $244_{00}$, $244_{01}$, $244_{02}$, $244_{03}$, $244_{10}$, $244_{11}$, $244_{12}$, and $244_{13}$ of FIG. 23 might correspond to the channel material structures $244_{03}$, $244_{00}$, $244_{01}$, $244_{02}$, $244_{10}$, $244_{13}$, $244_{12}$, and $244_{11}$, respectively, of FIG. 5 regarding their order of programming.

Figure 24A:
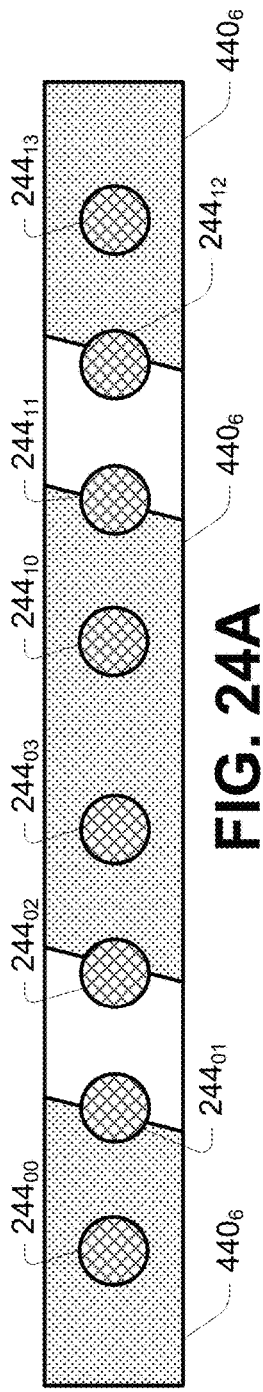
FIGS. 24A-24C depict representations of top views of sections of the array structure depicted in FIG. 23.
Figure 24B:
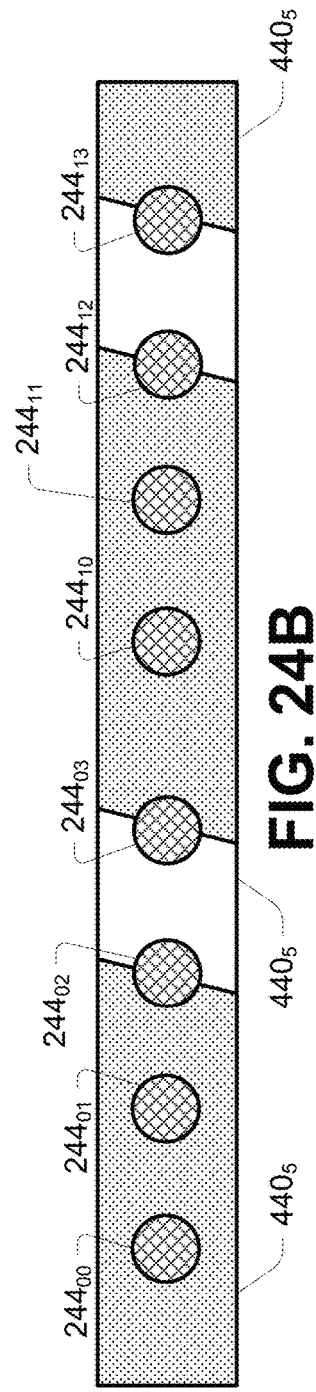
Figure 24C:
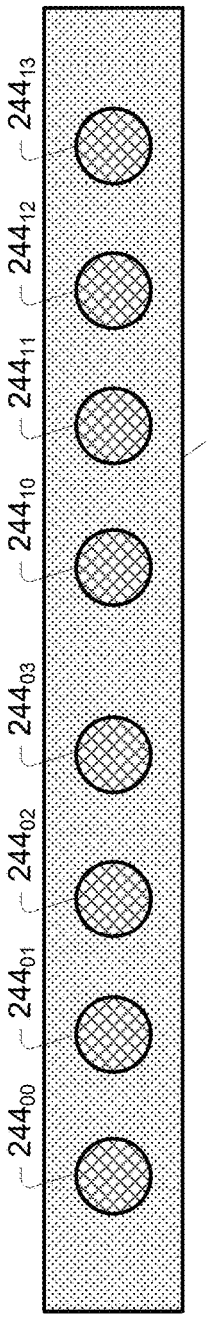

FIGS. 24A-24C depict representations of top views of sections of the array structure depicted in FIG. 23. FIG. 24A is taken at the line A-A of FIG. 23, FIG. 24B is taken at the line B-B of FIG. 23, and FIG. 24C is taken at the line C-C of FIG. 23.

As can be seen in FIG. 24A, the conductor $440_6$, e.g., the select line $318_{01}$, might sufficiently (e.g., fully) surround the channel material structures $244_{00}$ and $244_{03}$ of the cluster of strings of series-connected memory cells $340_0$ and might sufficiently (e.g., fully) surround the channel material structures $244_{10}$ and $244_{13}$ of the cluster of strings of series-connected memory cells $340_1$. However, the conductor $440_6$ might not sufficiently surround the channel material structures $244_{01}$ and $244_{02}$ of the cluster of strings of series-connected memory cells $340_0$ or the channel material structures $244_{11}$ and $244_{12}$ of the cluster of strings of series-connected memory cells $340_1$. That is, under normal operating conditions for a programming operation, such as would be used in the programming of any of the memory cells 208, a conductor 440 does not sufficiently surround a channel material structure 244 if it is not expected to be capable of increasing a threshold voltage of a corresponding pre-configured select gate 316 to the second threshold voltage during a programming operation on its associated select line 318. As such, the pre-configured select gates 316 corresponding to the channel material structures $244_{00}$, $244_{03}$, $244_{10}$, and $244_{13}$ at the level of the conductor $440_6$ might have programmable threshold voltages, while the pre-configured select gates 316 corresponding to the channel material structures $244_{01}$, $244_{02}$, $244_{11}$, and $244_{12}$ at the level of the conductor $440_6$ might have non-programmable threshold voltages under normal operating conditions.

As can be seen in FIG. 24B, the conductor $440_5$, e.g., the select line $318_{00}$, might sufficiently (e.g., fully) surround the channel material structures $244_{00}$ and $244_{01}$ of the cluster of strings of series-connected memory cells $340_0$ and might sufficiently (e.g., fully) surround the channel material structures $244_{10}$ and $244_{11}$ of the cluster of strings of series-connected memory cells $340_1$. However, the conductor $440_5$ might not sufficiently surround the channel material structures $244_{02}$ or $244_{03}$ of the cluster of strings of series-connected memory cells $340_0$ or the channel material structures $244_{12}$ or $244_{13}$ of the cluster of strings of series-connected memory cells $340_1$. As such, the pre-configured select gates 316 corresponding to the channel material structures $244_{00}$, $244_{01}$, $244_{10}$, and $244_{11}$ at the level of the conductor $440_5$ might have programmable threshold voltages, while the pre-configured select gates 316 corresponding to the channel material structures $244_{02}$, $244_{03}$, $244_{12}$, and $244_{13}$ at the level of the conductor $440_5$ might have non-programmable threshold voltages under normal operating conditions.

As can be seen in FIG. 24C, the conductor $440_4$, e.g., the select line $314_{01}$, might sufficiently (e.g., fully) surround the channel material structures $244_{00}$, $244_{01}$, $244_{02}$, and $244_{03}$ of the cluster of strings of series-connected memory cells $340_0$ and might sufficiently (e.g., fully) surround the channel material structures $244_{10}$, $244_{11}$, $244_{12}$, and $244_{13}$ of the cluster of strings of series-connected memory cells $340_1$. As such, the select gates 312 corresponding to the channel material structures $244_{00}$, $244_{01}$, $244_{02}$, $244_{03}$, $244_{10}$, $244_{11}$, $244_{12}$, and $244_{13}$ at the level of the conductor $440_4$ might have programmable threshold voltages under normal operating conditions. The structure of FIG. 24C might further represent the structure for other levels, such as other select lines 314, access lines 202, and select lines 322.

Figure 25:
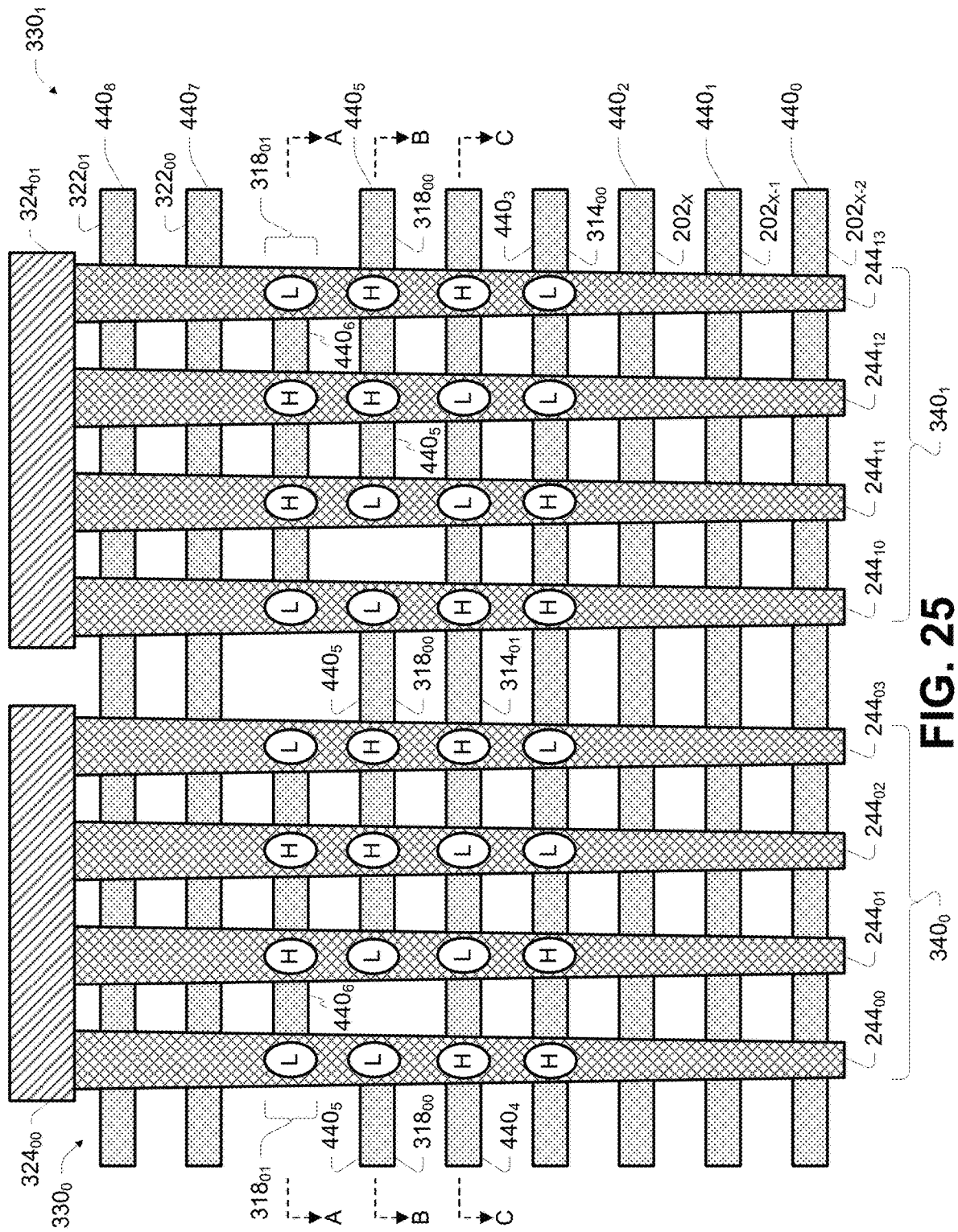
FIG. 25 depicts a conceptualized representation of a cross-sectional view of a portion of an array structure in accordance with another embodiment.

FIG. 25 depicts a conceptualized representation of a cross-sectional view of a portion of an array structure in accordance with the embodiment of FIG. 22 taken along line B-B of FIG. 22. For example, the structure of FIG. 25 might correspond to a portion of two decks of memory cells 330, each having a structure that might result from the placement of areas 2222 and 2224 for removal of portions of instances of sacrificial material 904 depicted in FIG. 22.

The pre-configured select gates 316 associated with the select line $318_{01}$ and corresponding to the channel material structures $244_{00}$, $244_{03}$, $244_{10}$, and $244_{13}$ (e.g., having channels in one of those channel material structures 244) might be fabricated to have the first (low) threshold voltage, e.g., indicated by the "L" designation in FIG. 25, and might remain at the first threshold voltage following programming of other pre-configured select gates 316 associated with the select line $318_{01}$. The pre-configured select gates 316 associated with the select line $318_{01}$ and corresponding to the channel material structures $244_{01}$, $244_{02}$, $244_{11}$, and $244_{12}$ might be fabricated to have the first (low) threshold voltage and might be subsequently programmed to have the second (high) threshold voltage, e.g., indicated by the "H" designation in FIG. 25.

The pre-configured select gates 316 associated with the select line $318_{00}$ and corresponding to the channel material structures $244_{00}$, $244_{01}$, $244_{10}$, and $244_{11}$ might be fabricated to have the first (low) threshold voltage, e.g., indicated by the "L" designation in FIG. 25, and might remain at the first threshold voltage following programming of other pre-configured select gates 316 associated with the select line $318_{00}$. The pre-configured select gates 316 associated with the select line $318_{00}$ and corresponding to the channel material structures $244_{02}$, $244_{03}$, $244_{12}$, and $244_{13}$ might be fabricated to have the first (low) threshold voltage and might be subsequently programmed to have the second (high) threshold voltage, e.g., indicated by the "H" designation in FIG. 25.

Following programming of the pre-configured select gates 316, the select gates 312 might be programmed in a manner similar to that described with reference to FIG. 5, where the channel material structures $244_{00}$, $244_{01}$, $244_{02}$, $244_{03}$, $244_{10}$, $244_{11}$, $244_{12}$, and $244_{13}$ of FIG. 25 might correspond to the channel material structures $244_{01}$, $244_{02}$, $244_{03}$, $244_{00}$, $244_{12}$, $244_{11}$, $244_{00}$, and $244_{13}$, respectively, of FIG. 5 regarding their order of programming.

Figure 26A:
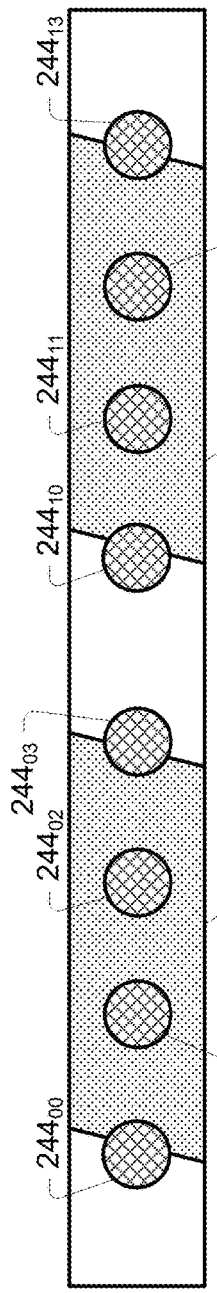
FIGS. 26A-26C depict representations of top views of sections of the array structure depicted in FIG. 25.
Figure 26B:
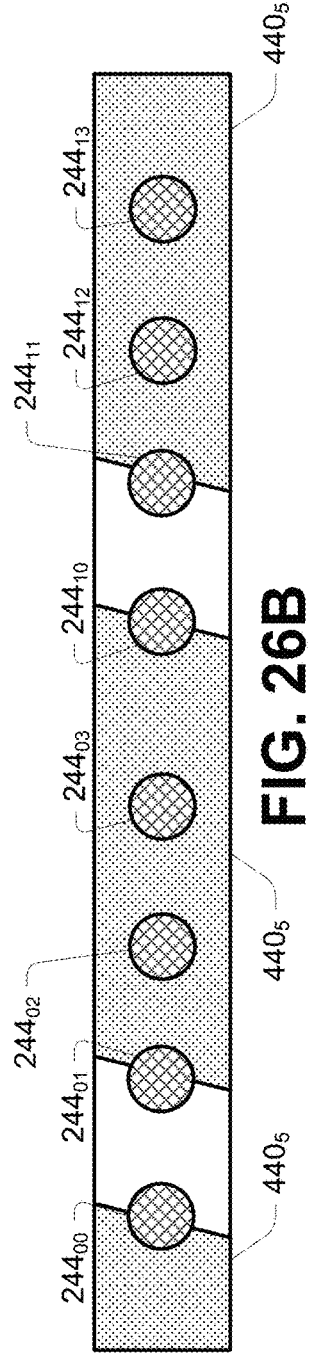
Figure 26C:
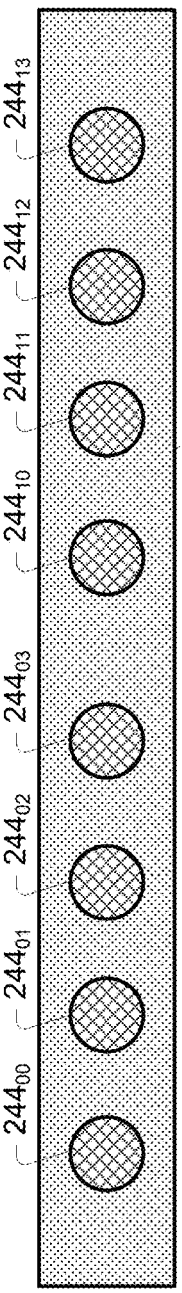

FIGS. 26A-26C depict representations of top views of sections of the array structure depicted in FIG. 25. FIG. 26A is taken at the line A-A of FIG. 25, FIG. 26B is taken at the line B-B of FIG. 25, and FIG. 26C is taken at the line C-C of FIG. 25.

As can be seen in FIG. 26A, the conductor $440_6$, e.g., the select line $318_{01}$, might sufficiently (e.g., fully) surround the channel material structures $244_{01}$ and $244_{02}$ of the cluster of strings of series-connected memory cells $340_0$ and might sufficiently (e.g., fully) surround the channel material structures $244_{11}$ and $244_{12}$ of the cluster of strings of series-connected memory cells $340_1$. However, the conductor $440_6$ might not sufficiently surround the channel material structures $244_{00}$ and $244_{03}$ of the cluster of strings of series-connected memory cells $340_0$ or the channel material structures $244_{10}$ and $244_{13}$ of the cluster of strings of series-connected memory cells $340_1$. That is, under normal operating conditions for a programming operation, such as would be used in the programming of any of the memory cells 208, a conductor 440 does not sufficiently surround a channel material structure 244 if it is not expected to be capable of increasing a threshold voltage of a corresponding pre-configured select gate 316 to the second threshold voltage during a programming operation on its associated select line 318. As such, the pre-configured select gates 316 corresponding to the channel material structures $244_{01}$, $244_{02}$, $244_{11}$, and $244_{12}$ at the level of the conductor $440_6$ might have programmable threshold voltages, while the pre-configured select gates 316 corresponding to the channel material structures $244_{00}$, $244_{03}$, $244_{10}$, and $244_{13}$ at the level of the conductor $440_6$ might have non-programmable threshold voltages under normal operating conditions.

As can be seen in FIG. 26B, the conductor $440_5$, e.g., the select line $318_{00}$, might sufficiently (e.g., fully) surround the channel material structures $244_{02}$ and $244_{03}$ of the cluster of strings of series-connected memory cells $340_0$ and might sufficiently (e.g., fully) surround the channel material structures $244_{12}$ and $244_{13}$ of the cluster of strings of series-connected memory cells $340_1$. However, the conductor $440_5$ might not sufficiently surround the channel material structures $244_{00}$ or $244_{01}$ of the cluster of strings of series-connected memory cells $340_0$ or the channel material structures $244_{10}$ or $244_{11}$ of the cluster of strings of series-connected memory cells $340_1$. As such, the pre-configured select gates 316 corresponding to the channel material structures $244_{02}$, $244_{03}$, $244_{12}$, and $244_{13}$ at the level of the conductor $440_5$ might have programmable threshold voltages, while the pre-configured select gates 316 corresponding to the channel material structures $244_{00}$, $244_{01}$, $244_{10}$, and $244_{11}$ at the level of the conductor $440_5$ might have non-programmable threshold voltages under normal operating conditions.

As can be seen in FIG. 26C, the conductor $440_4$, e.g., the select line $314_{01}$, might sufficiently (e.g., fully) surround the channel material structures $244_{00}$, $244_{01}$, $244_{02}$, and $244_{03}$ of the cluster of strings of series-connected memory cells $340_0$ and might sufficiently (e.g., fully) surround the channel material structures $244_{10}$, $244_{11}$, $244_{12}$, and $244_{13}$ of the cluster of strings of series-connected memory cells $340_1$. As such, the select gates 312 corresponding to the channel material structures $244_{00}$, $244_{01}$, $244_{02}$, $244_{03}$, $244_{10}$, $244_{11}$, $244_{12}$, and $244_{13}$ at the level of the conductor $440_4$ might have programmable threshold voltages under normal operating conditions. The structure of FIG. 26C might further represent the structure for other levels, such as other select lines 314, access lines 202, and select lines 322.

Figure 27A:
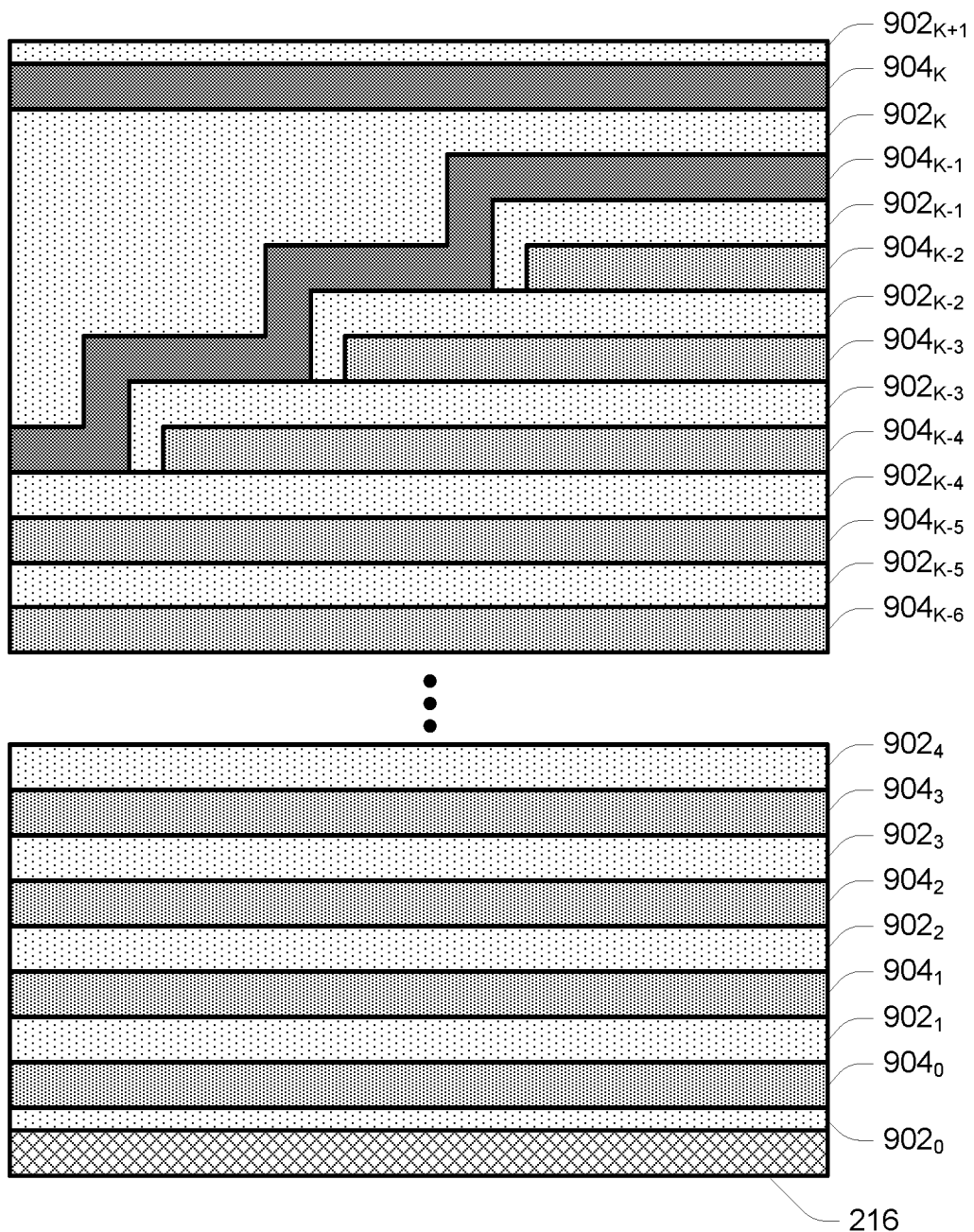
FIGS. 27A-27B depict cross-sectional views of a memory array structure during various stages of fabrication in accordance with embodiments.
Figure 27B:
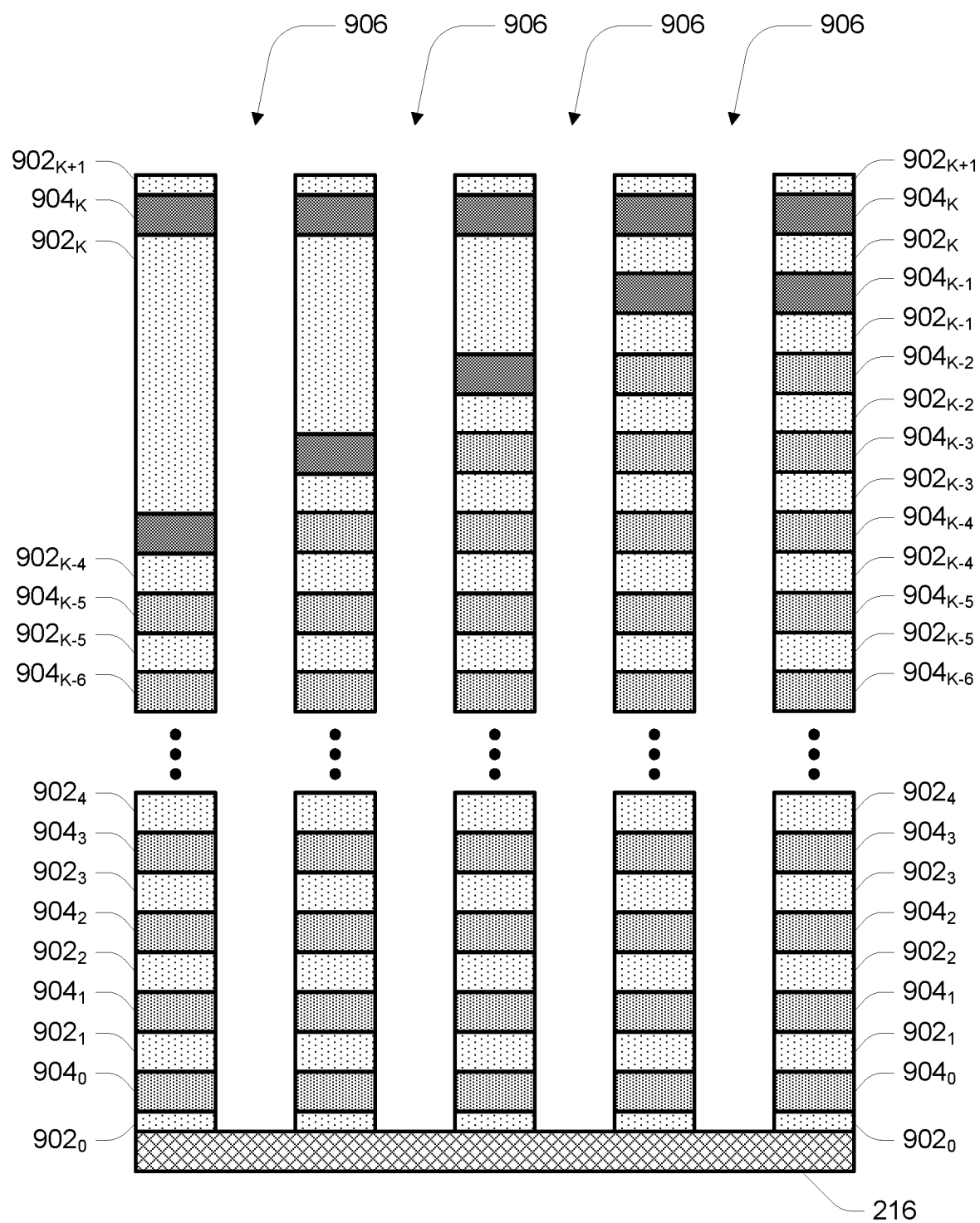

FIGS. 27A-27B depict cross-sectional views of a memory array structure during various stages of fabrication in accordance with embodiments. FIGS. 27A-27N might depict a portion of formation of a deck of memory cells having its channel material structures connected to the common source such as described with reference to FIGS. 16A-16O. Like numbered elements in FIGS. 27A-27B correspond to the description as provided with respect to FIGS. 16A-16O. Note that instances of sacrificial material $904_{K-1}$ and $904_K$, utilize different shading from other instances of sacrificial material 904 for clarity in discussing subsequent figures.

The structure of FIG. 27A might be formed by forming the structure described with reference to FIGS. 21A-21F along with forming of the instance of dielectric $902_{K-1}$ as described in FIG. 21G. The instances of dielectric $902_{K-1}$, $902_{K-2}$, and $902_{K-3}$ might then be patterned in sequence to define remaining portions of the instances of dielectric $902_{K-1}$, $902_{K-2}$, and $902_{K-3}$ that extend beyond ends of their corresponding instances of sacrificial material $904_{K-2}$, $904_{K-3}$, and $904_{K-4}$, respectively. This might include timed anisotropic removal processes such that a portion of the instance of dielectric $902_{K-1}$ is removed to a level of the bottom of its corresponding instance of sacrificial material $904_{K-2}$ to expose a portion of the instance of dielectric $902_{K-2}$, then a portion of the instance of dielectric $902_{K-2}$ is removed to a level of the bottom of its corresponding instance of sacrificial material $904_{K-3}$ to expose a portion of the instance of dielectric $902_{K-3}$, then a portion of the instance of dielectric $902_{K-3}$ is removed to a level of the bottom of its corresponding instance of sacrificial material $904_{K-4}$ to expose a portion of the instance of dielectric $902_{K-4}$. The instance of sacrificial material $904_{K-1}$ might then be formed overlying the exposed portions of the instances of dielectric $902_{K-4}$, $902_{K-3}$, $902_{K-2}$, and $902_{K-1}$. Instances of dielectric $902_K$ to $902_{K+1}$ and an instance of sacrificial material $904_K$ might be formed in an alternating fashion overlying the instance of sacrificial material $904_{K-1}$.

In FIG. 27B, vias 906 might be formed through the instances of the dielectric 902 and the instances of the sacrificial material 904. For example, an anisotropic removal process, e.g., reactive ion etching (ME), might be used with the common source 216, or a contact (not depicted in FIG. 27F) to the common source 216, acting as an etch stop. As such, the vias 906 might extend through all instances of the dielectric 902 and through all instances of the sacrificial material 904, exposing portions of the common source 216. Further processing might proceed as described with reference to FIGS. 16G-16O. By forming the instance of sacrificial material $904_{K-1}$ to have a staircase profile, the dummy access lines subsequently formed by replacing the instances of sacrificial material $904_{K-1}$ and $904_K$ with conductive material might provide improved conductivity of this portion of the channel material structures 244 over the structure of FIG. 21I where the instance of sacrificial material $904_{K-1}$ is depicted to have a flat profile.

Figure 28:
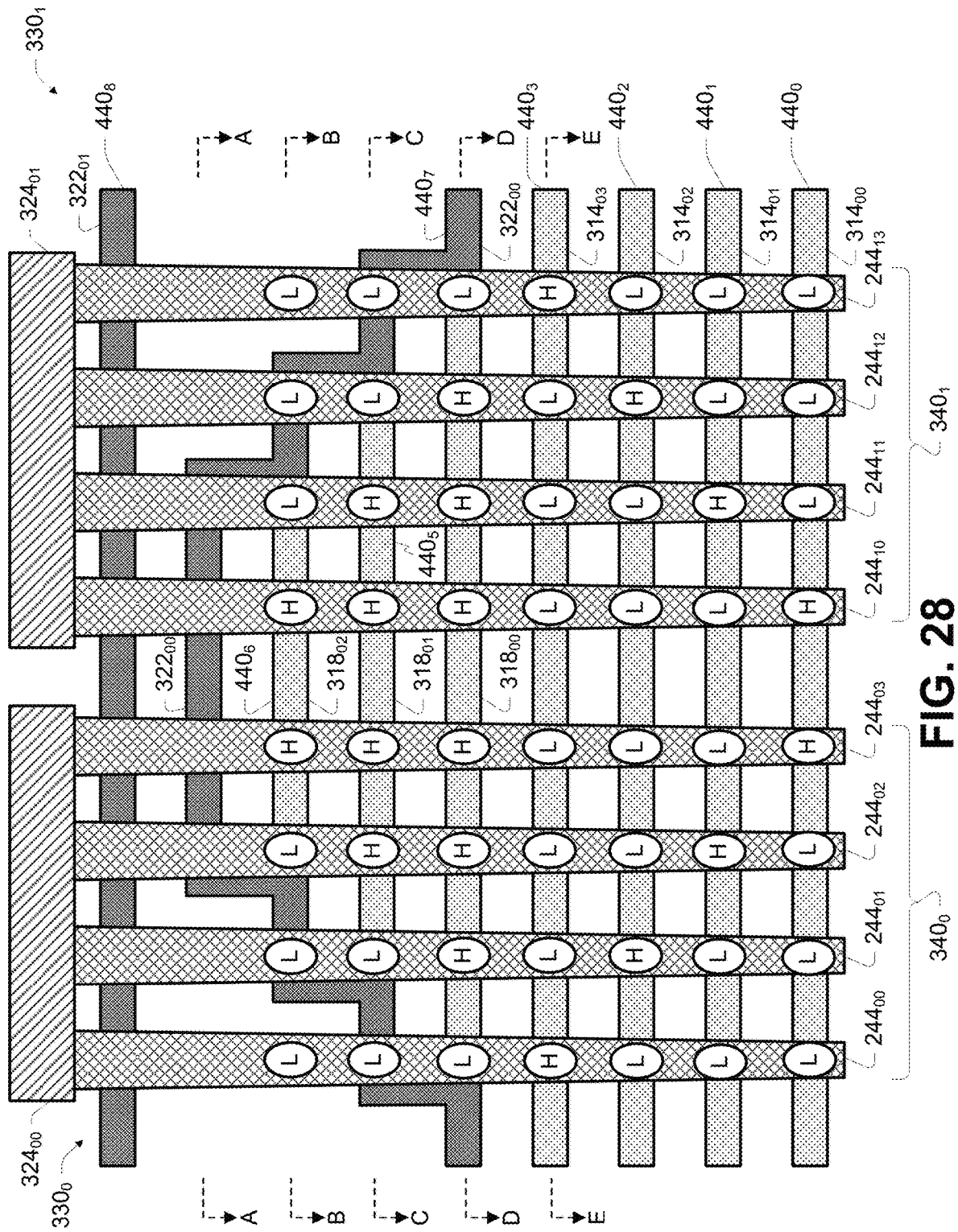
FIG. 28 depicts a conceptualized representation of a cross-sectional view of a portion of an array structure in accordance with another embodiment.

FIG. 28 depicts a conceptualized representation of a cross-sectional view of a portion of an array structure in accordance with another embodiment. Like numbered elements in FIG. 28 correspond to the description as provided with respect to FIG. 4. For example, the structure of FIG. 28 might correspond to a portion of two decks of memory cells 330. FIG. 28 depicts a staircase profile of the conductor $440_7$, and further depicts a staircase configuration of the conductors 440 corresponding to the select lines 318, e.g., select lines $318_{00}$-$318_{02}$, that might result from the structure of FIGS. 27A-27B.

Programming of the pre-configured select gates 316 and select gates 314 might occur as described with reference to FIG. 18. Although the conductor $440_7$ might surround certain channel material structures 244, this transistors might not be programmed to have the second threshold voltage.

Figure 29A:
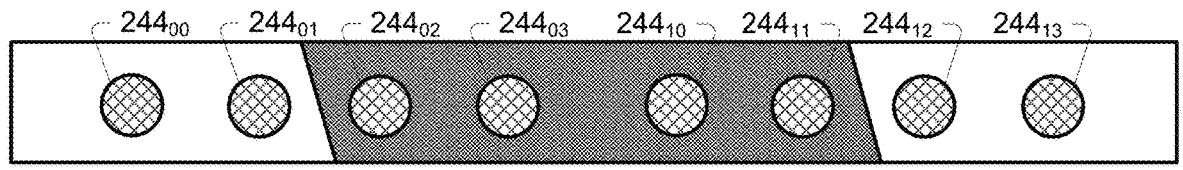
FIGS. 29A-29E depict representations of top views of sections of the array structure depicted in FIG. 28.
Figure 29B:
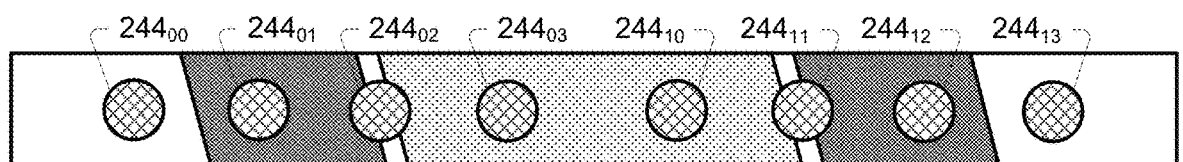
Figure 29C:
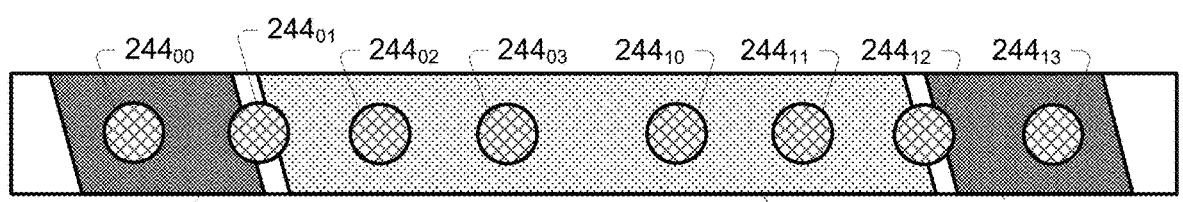
Figure 29D:
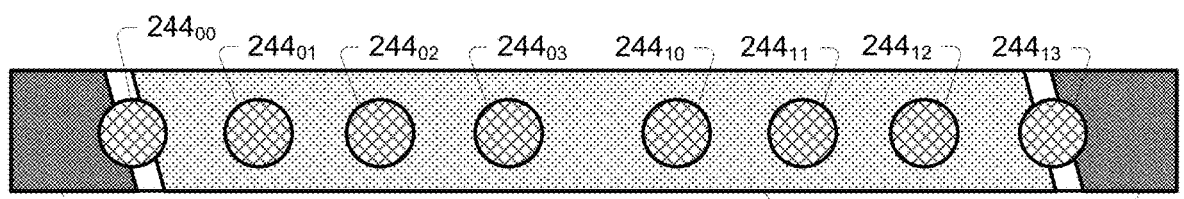
Figure 29E:
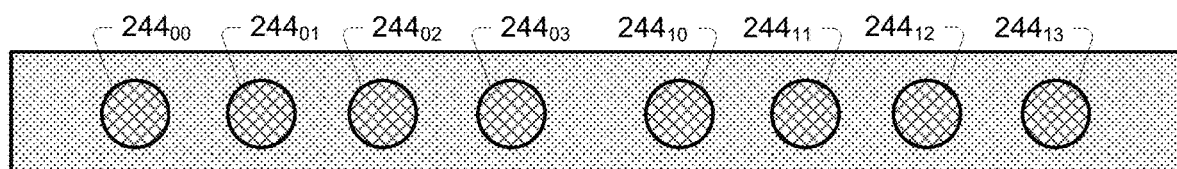

FIGS. 29A-29D depict representations of top views of sections of the array structure depicted in FIG. 28. FIG. 29A is taken at the line A-A of FIG. 28, FIG. 29B is taken at the line B-B of FIG. 28, FIG. 29C is taken at the line C-C of FIG. 28, FIG. 29D is taken at the line D-D of FIG. 28, and FIG. 29E is taken at the line E-E of FIG. 28.

As can be seen in FIG. 29A, the conductor $440_6$, e.g., the select line $318_{02}$, might sufficiently (e.g., fully) surround the channel material structure $244_{03}$ of the cluster of strings of series-connected memory cells $340_0$ and might sufficiently (e.g., fully) surround the channel material structure $244_{10}$ of the cluster of strings of series-connected memory cells $340_1$. However, the conductor $440_6$ might not sufficiently surround the channel material structure $244_{02}$ of the cluster of strings of series-connected memory cells $340_0$ or the channel material structure $244_{11}$ of the cluster of strings of series-connected memory cells $340_1$. That is, under normal operating conditions for a programming operation, such as would be used in the programming of any of the memory cells 208, a conductor 440 does not sufficiently surround a channel material structure 244 if it is not expected to be capable of increasing a threshold voltage of a corresponding pre-configured select gate 316 to the second threshold voltage during a programming operation on its associated select line 318.

As can be seen in FIG. 29A, the conductor $440_7$, e.g., the dummy access line $322_{00}$, might sufficiently (e.g., fully) surround the channel material structures $244_{02}$ and $244_{03}$ of the cluster of strings of series-connected memory cells $340_0$ and might sufficiently (e.g., fully) surround the channel material structures $244_{10}$ and $244_{11}$ of the cluster of strings of series-connected memory cells $340_1$. However, the conductor $440_7$ might have no contact with the channel material structures $244_{00}$ and $244_{01}$ of the cluster of strings of series-connected memory cells $340_0$ or the channel material structures $244_{12}$ and $244_{13}$ of the cluster of strings of series-connected memory cells $340_1$. That is, under normal operating conditions for a programming operation, such as would be used in the programming of any of the memory cells 208, a conductor 440 does not sufficiently surround a channel material structure 244 if it is not expected to be capable of increasing a threshold voltage of a corresponding pre-configured select gate 316 to the second threshold voltage during a programming operation on its associated select line 318.

As can be seen in FIG. 29B, the conductor $440_6$, e.g., the select line $318_{02}$, might sufficiently (e.g., fully) surround the channel material structure $244_{03}$ of the cluster of strings of series-connected memory cells $340_0$ and might sufficiently (e.g., fully) surround the channel material structure $244_{10}$ of the cluster of strings of series-connected memory cells $340_1$. However, the conductor $440_6$ might not sufficiently surround the channel material structure $244_{02}$ of the cluster of strings of series-connected memory cells $340_0$ or the channel material structure $244_{11}$ of the cluster of strings of series-connected memory cells $340_1$.

Similarly, the conductor $440_6$ might not make any connection to the channel material structures $244_{00}$ and $244_{01}$ of the cluster of strings of series-connected memory cells $340_0$ or the channel material structures $244_{12}$ and $244_{13}$ of the cluster of strings of series-connected memory cells $340_1$, such that it also might not sufficiently surround these channel material structures 244. As such, the pre-configured select gates 316 corresponding to the channel material structures $244_{03}$ and $244_{10}$ at the level of the conductor $440_6$ might have programmable threshold voltages, while the pre-configured select gates 316 corresponding to the channel material structures $244_{00}$, $244_{01}$, $244_{02}$, $244_{11}$, $244_{12}$ and $244_{13}$ at the level of the conductor $440_6$ might have non-programmable threshold voltages under normal operating conditions. Although the conductor $440_7$ is depicted to fully surround the channel material structure $244_{01}$ of the cluster of strings of series-connected memory cells $340_0$ and the channel material structure $244_{12}$ of the cluster of strings of series-connected memory cells $340_1$, it might not be used to program their corresponding transistors to a higher threshold voltage.

As can be seen in FIG. 29C, the conductor $440_5$, e.g., the select line $318_{01}$, might sufficiently (e.g., fully) surround the channel material structures $244_{02}$ and $244_{03}$ of the cluster of strings of series-connected memory cells $340_0$ and might sufficiently (e.g., fully) surround the channel material structures $244_{10}$ and $244_{11}$ of the cluster of strings of series-connected memory cells $340_1$. However, the conductor $440_5$ might not sufficiently surround the channel material structure $244_{01}$ of the cluster of strings of series-connected memory cells $340_0$ or the channel material structure $244_{12}$ of the cluster of strings of series-connected memory cells $340_1$. As such, the pre-configured select gates 316 corresponding to the channel material structures $244_{02}$, $244_{03}$, $244_{10}$, and $244_{11}$ at the level of the conductor $440_5$ might have programmable threshold voltages, while the pre-configured select gates 316 corresponding to the channel material structures $244_{00}$, $244_{01}$, $244_{12}$, and $244_{13}$ at the level of the conductor $440_5$ might have non-programmable threshold voltages under normal operating conditions. Although the conductor $440_7$ is depicted to fully surround the channel material structure $244_{00}$ of the cluster of strings of series-connected memory cells $340_0$ and the channel material structure $244_{13}$ of the cluster of strings of series-connected memory cells $340_1$, it might not be used to program their corresponding transistors to a higher threshold voltage.

As can be seen in FIG. 29D, the conductor $440_4$, e.g., the select line $318_{00}$, might sufficiently (e.g., fully) surround the channel material structures $244_{01}$, $244_{02}$, and $244_{03}$ of the cluster of strings of series-connected memory cells $340_0$ and might sufficiently (e.g., fully) surround the channel material structures $244_{10}$, $244_{11}$, and $244_{12}$ of the cluster of strings of series-connected memory cells $340_1$. As such, the select gates 316 corresponding to the channel material structures $244_{01}$, $244_{02}$, $244_{03}$, $244_{10}$, $244_{11}$, and $244_{12}$ at the level of the conductor $440_4$ might have programmable threshold voltages, while the pre-configured select gates 316 corresponding to the channel material structures $244_{00}$ and $244_{13}$ at the level of the conductor $440_5$ might have non-programmable threshold voltages under normal operating conditions.

As can be seen in FIG. 29E, the conductor $440_3$, e.g., the select line 31403, might sufficiently (e.g., fully) surround the channel material structures $244_{00}$, $244_{01}$, $244_{02}$, and $244_{03}$ of the cluster of strings of series-connected memory cells $340_0$ and might sufficiently (e.g., fully) surround the channel material structures $244_{10}$, $244_{11}$, $244_{12}$, and $244_{13}$ of the cluster of strings of series-connected memory cells $340_1$. As such, the select gates 312 corresponding to the channel material structures $244_{00}$, $244_{01}$, $244_{02}$, $244_{03}$, $244_{10}$, $244_{11}$, $244_{12}$, and $244_{13}$ at the level of the conductor $440_3$ might have programmable threshold voltages under normal operating conditions. The structure of FIG. 29D might further represent the structure for other levels, such as other select lines 314, access lines 202, and select lines 322.

CONCLUSION

Although specific embodiments have been illustrated and described herein, it will be appreciated by those of ordinary skill in the art that any arrangement that is calculated to achieve the same purpose might be substituted for the specific embodiments shown. Many adaptations of the embodiments will be apparent to those of ordinary skill in the art. Accordingly, this application is intended to cover any adaptations or variations of the embodiments.

What is claimed is:

1. An array of memory cells, comprising:
   a data line;
   a common source;
   a conductive element between the data line and the common source;
   a first string of series-connected memory cells selectively connected to the common source and selectively connected to the data line, wherein the first string of series-connected memory cells comprises a first segment of series-connected memory cells selectively connected to the conductive element, and a second segment of series-connected memory cells selectively connected to the first segment of series-connected memory cells of the first string of series-connected memory cells through the conductive element; and
   a second string of series-connected memory cells selectively connected to the common source and selectively connected to the data line, wherein the second string of series-connected memory cells comprises a first segment of series-connected memory cells selectively connected to the conductive element, and a second segment of series-connected memory cells selectively connected to the first segment of series-connected memory cells of the second string of series-connected memory cells through the conductive element.

2. The array of memory cells of claim 1, wherein the first segment of series-connected memory cells of the first string of series-connected memory cells is selectively connected in parallel with the first segment of series-connected memory cells of the second string of series-connected memory cells through the conductive element, and wherein the second segment of series-connected memory cells of the first string of series-connected memory cells is selectively connected in parallel with the second segment of series-connected memory cells of the second string of series-connected memory cells through the conductive element.

3. The array of memory cells of claim 1, further comprising:
   a third string of series-connected memory cells comprising a first segment of series-connected memory cells selectively connected to the conductive element, and a second segment of series-connected memory cells selectively connected to the first segment of series-connected memory cells of the third string of series-connected memory cells through the conductive element.

4. The array of memory cells of claim 1, further comprising:
   one or more additional strings of series-connected memory cells each comprising a respective first segment of series-connected memory cells selectively connected to the conductive element, and a respective second segment of series-connected memory cells;
   wherein, for each additional string of series-connected memory cells of the one or more additional strings of series-connected memory cells, the respective second segment of series-connected memory cells of that additional string of series-connected memory cells is selectively connected to the respective first segment of series-connected memory cells of that additional string of series-connected memory cells through the conductive element.

5. The array of memory cells of claim 1, wherein the conductive element is a first conductive element, and wherein the array of memory cells further comprises:
   a second conductive element between the first conductive element and the data line;
   wherein the second segment of series-connected memory cells of the first string of series-connected memory cells is selectively connected to the second conductive element:
   wherein the second segment of series-connected memory cells of the second string of series-connected memory cells is selectively connected to the second conductive element:
   wherein the first string of series-connected memory cells further comprises a third segment of series-connected memory cells selectively connected to the second segment of series-connected memory cells of the first string of series-connected memory cells through the second conductive element; and
   wherein the second string of series-connected memory cells further comprises a third segment of series-connected memory cells selectively connected to the second segment of series-connected memory cells of the second string of series-connected memory cells through the second conductive element.

6. The array of memory cells of claim 1, wherein a channel material structure of the second segment of series-connected memory cells of the first string of series-connected memory cells is connected to the data line, and wherein a channel material structure of the second segment of series-connected memory cells of the second string of series-connected memory cells is connected to the data line.

7. The array of memory cells of claim 1, further comprising:
   a first set of series-connected transistors connected in series between the first segment of series-connected memory cells of the first string of series-connected memory cells and the conductive element; and a second set of series-connected transistors connected in series between the first segment of series-connected memory cells of the second string of series-connected memory cells and the conductive element;

wherein the first set of series-connected transistors and the second set of series-connected transistors are each connected to receive a set of control signals;

wherein the first set of series-connected transistors is configured to enable current flow in response to a first pattern of the set of control signals and to disable current flow in response to a second pattern of the set of control signals different than the first pattern of the set of control signals; and wherein the second set of series-connected transistors is configured to enable current flow in response to the second pattern of the set of control signals and to disable current flow in response to the first pattern of the set of control signals.

8. The array of memory cells of claim 1, further comprising:

a set of control lines;

a first set of series-connected programmable transistors connected in series between the first segment of series-connected memory cells of the first string of series-connected memory cells and the conductive element, wherein each programmable transistor of the first set of series-connected transistors has a control gate connected to a respective control line of the set of control lines; and a second set of series-connected programmable transistors connected in series between the first segment of series-connected memory cells of the second string of series-connected memory cells and the conductive element, wherein each programmable transistor of the second set of series-connected transistors has a control gate connected to a respective control line of the set of control lines;

wherein a number of programmable transistors of the first set of series-connected transistors is greater than a number of programmable transistors of the second set of series-connected transistors.

9. An apparatus, comprising:

a data line;

a common source;

D conductive elements, wherein D is an integer value greater than or equal to two; and an array of memory cells comprising S strings of series-connected memory cells selectively connected to the data line and selectively connected to the common source, wherein S is an integer value greater than or equal to two, and wherein each string of series-connected memory cells of the S strings of series-connected memory cells comprises a respective D segments of series-connected memory cells each selectively connected to a corresponding conductive element of the D conductive elements;

wherein, for a first conductive element of the D conductive elements closest to the common source, one segment of series-connected memory cells of a particular string of series-connected memory cells of the S strings of series-connected memory cells is located between the first conductive element and the common source and D−1 segments of series-connected memory cells of the particular string of series-connected memory cells are located between the first conductive element and the data line; and wherein, for a last conductive element of the D conductive elements closest to the data line, D segments of series-connected memory cells of the particular string of series-connected memory cells are located between the last conductive element and the common source and no segment of series-connected memory cells of the particular string of series-connected memory cells is located between the last conductive element and the data line.

10. The apparatus of claim 9, further comprising:

D sets of control lines;

wherein, for each string of series-connected memory cells of the S strings of series-connected memory cells, and for each integer value of J between 1 and D:

the $J^{th}$ segment of series-connected memory cells of that string of series-connected memory cells comprises a respective set of series-connected transistors connected in series between the $J^{th}$ segment of series-connected memory cells of that string of series-connected memory cells and its corresponding conductive element;

wherein each transistor of the respective set of series-connected transistors for the $J^{th}$ segment of series-connected memory cells of that string of series-connected memory cells has a control gate connected to a respective control line of a respective set of control lines of the D sets of control lines.

11. The apparatus of claim 10, wherein the respective set of series-connected transistors for a first segment of series-connected memory cells of a first string of series-connected memory cells of the S strings of series-connected memory cells comprises a first transistor having a programmable threshold voltage, wherein the respective set of series-connected transistors for a first segment of series-connected memory cells of a second string of series-connected memory cells of the S strings of series-connected memory cells comprises a first transistor having a non-programmable threshold voltage, and wherein the first transistor of the respective set of series-connected transistors for the first segment of series-connected memory cells of the first string of series-connected memory cells and the first transistor of the respective set of series-connected transistors for the first segment of series-connected memory cells of the second string of series-connected memory cells each have their control gates connected to a same control line of the D sets of control lines.

12. The apparatus of claim 10, wherein, for each string of series-connected memory cells of the S strings of series-connected memory cells other than a particular string of series-connected memory cells of the S strings of series-connected memory cells, and for each integer value of J between 1 and D, the respective set of series-connected transistors for the $J^{th}$ segment of series-connected memory cells of that string of series-connected memory cells comprises at least one transistor having a programmable threshold voltage and at least one transistor having a non-programmable threshold voltage.

13. The apparatus of claim 10, wherein, for each string of series-connected memory cells of the S strings of series-connected memory cells other than a particular string of series-connected memory cells of the S strings of series-connected memory cells, and for each integer value of J between 1 and D, the respective set of series-connected transistors for the $J^{th}$ segment of series-connected memory cells of that string of series-connected memory cells comprises a respective configuration of transistors having programmable threshold voltages and transistors having non-programmable threshold voltages.

14. The apparatus of claim 11, wherein, for each integer value of J between 1 and D−1, the $J^{th}$ segment of series-connected memory cells of a particular string of series-connected memory cells of the S strings of series-connected memory cells is selectively connected to the $(J+1)^{th}$ segment of series-connected memory cells of the particular string of series-connected memory cells through the $J^{th}$ conductive element.

15. The apparatus of claim 14, wherein the $J^{th}$ segment of series-connected memory cells of the particular string of series-connected memory cells is further selectively connected to each remaining string of series-connected memory cells of the S strings of series-connected memory cells through the $J^{th}$ conductive element.

16. The apparatus of claim 11, wherein, for each integer value of J between 2 and D, the $J^{th}$ segment of series-connected memory cells of a particular string of series-connected memory cells of the S strings of series-connected memory cells is selectively connected to the $J^{th}$ conductive element and selectively connected to the $(J-1)^{th}$ conductive element.

17. The apparatus of claim 9, wherein, for each string of series-connected memory cells of the S strings of series-connected memory cells, a particular segment of series-connected memory cells of that string of series-connected memory cells is selectively connected to its corresponding conductive element through a respective plurality of series-connected transistors.

18. An apparatus, comprising:
D conductive elements, wherein D is an integer value greater than or equal to two;
an array of memory cells comprising S strings of series-connected memory cells arranged in D decks of memory cells, wherein S is an integer value greater than or equal to two, wherein each deck of memory cells of the D decks of memory cells comprises a respective segment of series-connected memory cells for each string of series-connected memory cells of the S strings of series-connected memory cells, and wherein each deck of memory cells of the D decks of memory cells corresponds to a respective conductive element of the D conductive elements;
a data line selectively connected to each string of series-connected memory cells of the S strings of series-connected memory cells;
a common source selectively connected to each string of series-connected memory cells of the S strings of series-connected memory cells; and
a controller for access of the array of memory cells, wherein the controller, during a sense operation on a selected memory cell of a selected string of series-connected memory cells of the S strings of series-connected memory cells, is configured to cause the apparatus to:
configure each deck of memory cells of the D decks of memory cells to enable parallel current flow through each of its respective segments of series-connected memory cells other than a particular deck of memory cells of the D decks of memory cells containing the selected memory cell;
configure the particular deck of memory cells for selective current flow through its respective segment of series-connected memory cells for the selected string of series-connected memory cells responsive to a data state of the selected memory cell; and
configure the particular deck of memory cells to disable current flow through its respective segments of series-connected memory cells for each unselected string of series-connected memory cells of the S strings of series-connected memory cells.

19. The apparatus of claim 18, wherein the controller being configured to cause the apparatus to configure each deck of memory cells of the D decks of memory cells for parallel current flow through each of its respective segments of series-connected memory cells other than the particular deck of memory cells comprises the controller being configured to cause the apparatus to:
connect the respective segments of series-connected memory cells for each deck of memory cells of the D decks of memory cells other than the particular deck to its respective conductive element.

20. The apparatus of claim 19, wherein the controller being configured to cause the apparatus to configure the particular deck of memory cells for selective current flow through its respective segment of series-connected memory cells for the selected string of series-connected memory cells responsive to the data state of the selected memory cell, and to configure the particular deck of memory cells to disable current flow through its respective segments of series-connected memory cells for each unselected string of series-connected memory cells of the S strings of series-connected memory cells comprises the controller being configured to cause the apparatus to:
connect the respective segment of series-connected memory cells of the selected string of series-connected memory cells for the particular deck of memory cells to its respective conductive element; and
isolate the respective segment of series-connected memory cells of each unselected string of series-connected memory cells for the particular deck of memory cells from its respective conductive element.

* * * * *